United States Patent
Nishimura et al.

[11] Patent Number: 5,889,739
[45] Date of Patent: Mar. 30, 1999

[54] MAGNETOOPTICAL RECORDING MEDIUM AND INFORMATION RECORDING AND REPRODUCING METHODS USING THE RECORDING MEDIUM

[75] Inventors: Naoki Nishimura, Tokyo; Hiroshi Omata, Kawasaki; Kazuoki Honguu, Yokohama, all of Japan

[73] Assignee: Canon Kabushiki Kaisha, Japan

[21] Appl. No.: 774,721

[22] Filed: Jan. 3, 1997

Related U.S. Application Data

[62] Division of Ser. No. 643,833, May 7, 1996, Pat. No. 5,616, 428, which is a continuation of Ser. No. 111,974, Aug. 26, 1993, abandoned.

[30] Foreign Application Priority Data

| Aug. 28, 1992 | [JP] | Japan | ..................................... 4-230265 |
| Aug. 28, 1992 | [JP] | Japan | ..................................... 4-230266 |
| Aug. 28, 1992 | [JP] | Japan | ..................................... 4-230277 |
| Feb. 26, 1993 | [JP] | Japan | ..................................... 5-038137 |
| Feb. 26, 1993 | [JP] | Japan | ..................................... 5-038138 |
| Mar. 4, 1993 | [JP] | Japan | ..................................... 5-043786 |
| Mar. 25, 1993 | [JP] | Japan | ..................................... 5-066656 |
| Apr. 23, 1993 | [JP] | Japan | ..................................... 5-098025 |
| Jul. 29, 1993 | [JP] | Japan | ..................................... 5-188400 |
| Jul. 29, 1993 | [JP] | Japan | ..................................... 5-188438 |

[51] Int. Cl.$^6$ ..................................................... G11B 5/66
[52] U.S. Cl. .......................... 368/13; 368/283; 368/284; 368/286; 428/694 ML; 428/694 MM; 428/694 EC; 428/900
[58] Field of Search ............................ 368/13, 283, 284, 368/286; 423/684 ML, 684 MM, 684 EC, 800

[56] References Cited

U.S. PATENT DOCUMENTS 5,278,810 1/1994 Takahashi et al. ............... 428/684 ML

FOREIGN PATENT DOCUMENTS

| 0352548 | 1/1990 | European Pat. Off. . |
| 0437308 | 7/1991 | European Pat. Off. . |
| 0492581 | 7/1992 | European Pat. Off. . |
| 0498440 | 8/1992 | European Pat. Off. . |
| 0509836 | 10/1992 | European Pat. Off. . |
| 3-93058 | 4/1991 | Japan . |

*Primary Examiner*—Leszek Kiliman
*Attorney, Agent, or Firm*—Fitzpatrick, Cella, Harper & Scinto

[57] ABSTRACT

A method of recording information on and reproducing information from a magnetooptical recording medium which includes first and second magnetic layers. The method includes the step of projecting a light spot onto the medium. When reproducing information, the light spot is projected onto the medium from the side of the magnetic layer. In this method only a high temperature region of the second magnetic layer within a light spot projection portion is changed to a perpendicular magnetization film so that information recorded in the first magnetic layer is transferred to the perpendicular magnetization film of the second magnetic layer. In addition, information which is transferred to the second magnetic layer is detected by using reflected light from the medium which is subjected to the magneto-optic effect from the perpendicular magnetization film of the second magnetic layer. When recording information, a magnetic field is applied, whose magnetization direction is modulated according to information, to a light spot projection portion of the medium so the magnetization of the second magnetic layer is oriented to the direction of the applied magnetic field, and the magnetization of the second magnetic layer is transferred to the first magnetic layer to form a record bit.

4 Claims, 42 Drawing Sheets

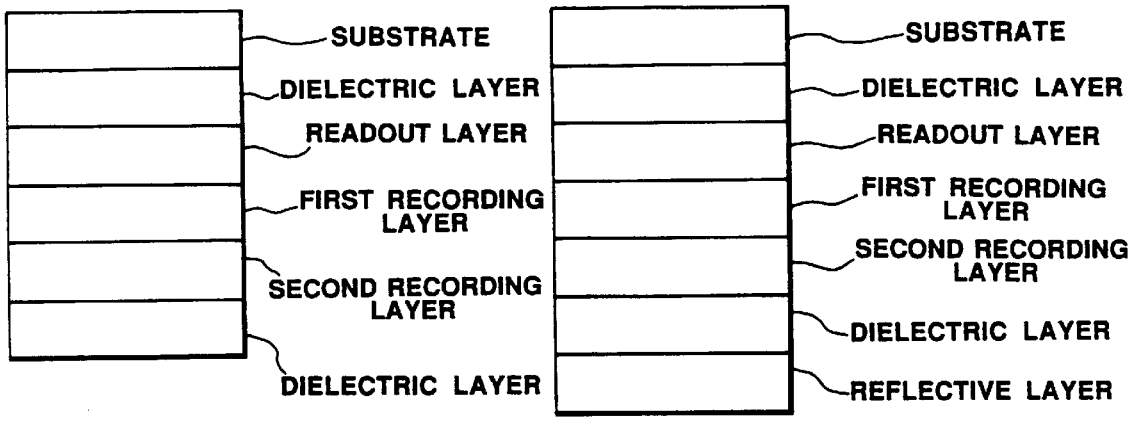
FIG.32 A       FIG.32 B
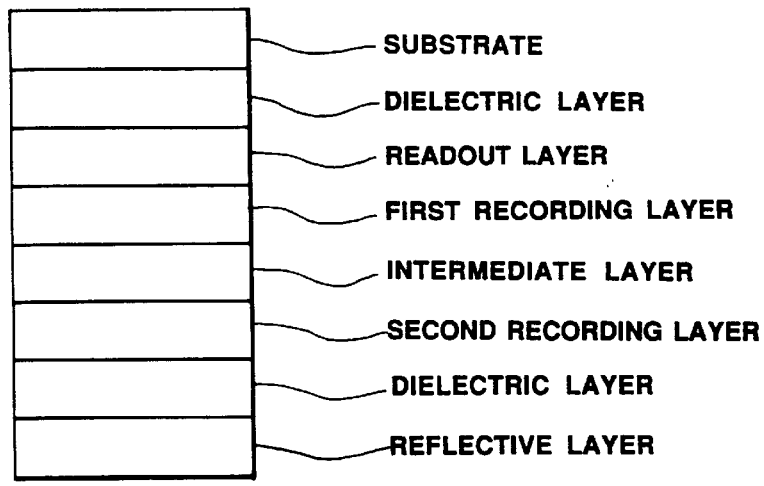
FIG.32 C

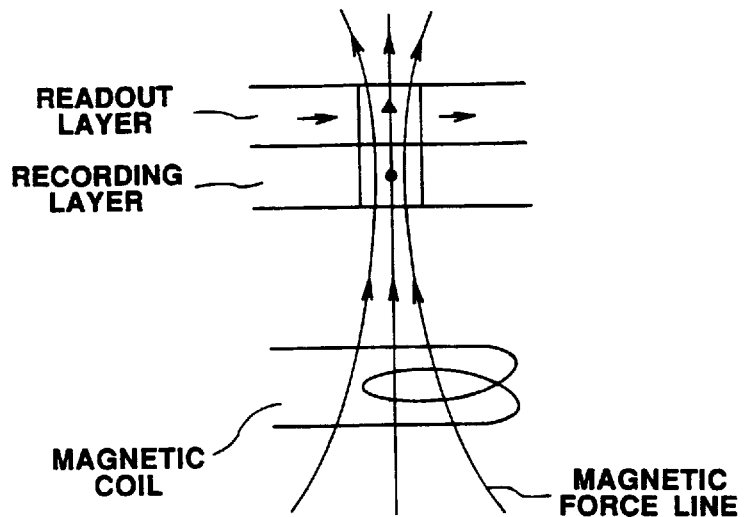
FIG.44
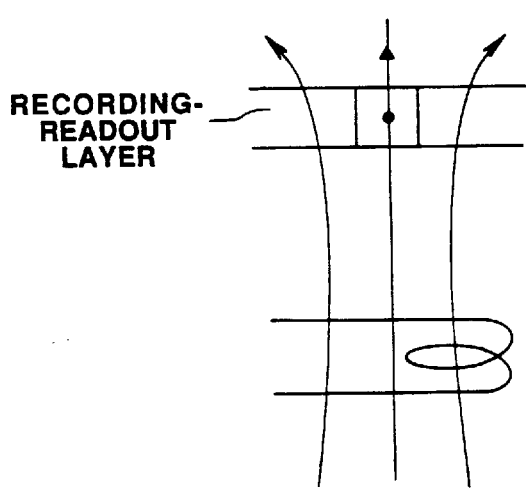 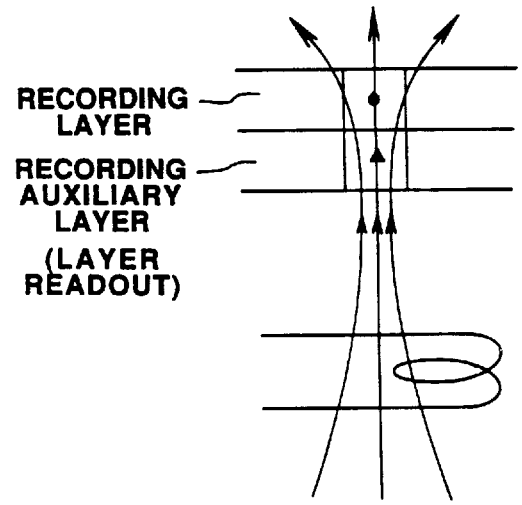
FIG.45A  FIG.45B

MAGNETOOPTICAL RECORDING MEDIUM AND INFORMATION RECORDING AND REPRODUCING METHODS USING THE RECORDING MEDIUM

This application is a division of application Ser. No. 08/643,833, filed May 7, 1996, now U.S. Pat. No. 5,616,428, which is a continuation of application Ser. No. 08/111,974, filed Aug. 26, 1993, now abandoned.

BACKGROUND OF THE INVENTION

Field of the Invention

The present invention relates to a magnetooptical recording medium allowing information recording and reproduction by irradiation with a laser beam, utilizing a magneto-optic effect, and methods for information recording and reproduction using the magnetooptical recording medium.

Related Background Art

In recent years, a magnetooptical recording medium has become a subject of attention in the field of a rewritable recording method of high recording density. In such a recording method, information or data is recorded in the recording medium by forming a magnetic domain in a magnetic film of the medium by means of thermal energy of a laser beam from a semiconductor laser, and information is read out from the medium, utilizing magneto-optic effect. The above-noted trend is based on need for a larger amount of recording capacity to be achieved by higher recording density of such a recording medium.

By the way, linear density of an optical disc, such as a magnetooptical recording medium, is largely dependent on the wavelength of a laser beam and the numerical aperture of an objective lens used in an optical system for reproducing information. When the wavelength λ of a laser beam used in a reproducing optical system and the numerical aperture NA of an objective lens are determined, a bit or pit periodicity or pitch is defined as λ/2NA which is a minimum scale or limit of detection.

Track density of the optical disc is, on the other hand, chiefly limited by crosstalk. The crosstalk is largely dependent on a laser beam distribution or profile on a medium surface and is expressed as a function of λ/2NA, similar to the bit periodicity mentioned above. Thus, the wavelength of a laser beam must be shortened and the numerical aperture of an objective must be enlarged in order to increase recording density of the conventional optical disc.

However, there are limitations to improvement of the wavelength of a laser light and the numerical aperture of an objective. Techniques therefor have been developed, which improve the structure of a recording medium and a method of reading out data bits so that the linear recording density can be improved.

For example, Japanese Patent Laid-open No. 3-93058 discloses a method for improving the recording density of an optical disc. The process is performed in the following sequence. First, a recording medium, which comprises a readout layer and a recording layer, is prepared. After the direction of magnetization in the readout layer is oriented in a single direction prior to information reproduction, then information held in the recording layer is transferred to the readout layer. Thus, it becomes possible to reduce interference between codes at the time of information reproduction and to reproduce information recorded at a pitch below the diffraction limit of light.

However, the magnetooptical reproducing method of Japanese Patent Laid-open No. 3-93058 requires a step of aligning the magnetization direction of the readout layer in a predetermined direction, which is conducted before projection of a laser beam onto the readout layer. Thus, it is necessary to add a magnet for initializing the readout layer to a conventional apparatus. Due to such addition, problems arise, such as more complicated structure of a magnetooptical recording apparatus, difficulty of down-sizing, and higher cost of an apparatus.

SUMMARY OF THE INVENTION

It is an object of the present invention to provide a magnetooptical recording medium which enables realization of a compact apparatus and a high S/N reproduction of information recorded at a pitch below the diffraction limit of light and methods for recording information on the magnetooptical recording medium and reproducing information therefrom.

The object is attained by a magnetooptical recording medium comprising a first magnetic layer which is composed of a perpendicularly magnetizable film at both room temperature and a raised temperature and in which information is to be stored, and a second magnetic layer which is an in-plane magnetizable film at room temperature and becomes a perpendicularly magnetizable film at the raised temperature.

Further, the object is attained by a magnetooptical recording medium comprising a first magnetic layer which is a perpendicularly magnetizable film at both room temperature and a raised temperature and in which information is to be stored, and a second magnetic layer which is a perpendicularly magnetizable film at room temperature and becomes an in-plane magnetizable film at the raised temperature.

Further, the object is attained by a method of reproducing information from a magnetooptical recording medium comprising a first magnetic layer which is a perpendicularly magnetizable film at both room temperature and a raised temperature and in which information is to be stored, and a second magnetic layer which is a perpendicularly magnetizable film at room temperature and becomes an in-plane magnetizable film at the raised temperature. The method comprises a step of projecting a light spot on the recording medium from the side of the second magnetic layer, a step of changing only a high-temperature area within a light spot projection portion of the second magnetic layer to an in-plane magnetization film, and a step of detecting information stored in the first magnetic layer by detecting a reflective light from the recording medium, which is influenced by magneto-optic effect of the perpendicular magnetization film portion in an area other than the high-temperature area of the light spot projection portion.

Further, the object is attained by a method of reproducing information from a magnetooptical recording medium comprising a first magnetic later which is a perpendicular magnetization film at both room temperature and raised temperatures and in which information is to be stored, and a second magnetic layer which is an in-plane magnetization film at room temperature and changed to a perpendicular magnetization film at raised temperatures. The method comprises a step of projecting a light spot on the recording medium from the side of the second magnetic layer, a step of changing only a high-temperature area within a light spot projection portion of the second magnetic layer to a perpendicular magnetization film and transferring information stored in the first magnetic layer to a perpendicular magnetization film portion of the second magnetic layer, and a step of detecting information transferred to the second magnetic layer by a reflective light from the recording medium, which is influenced by magneto-optic effect of the perpendicular magnetization film portion of the second magnetic layer.

Further, the object is attained by a method of reproducing information from a magnetooptical recording medium comprising a first magnetic layer which is a perpendicular magnetization film at both room temperature and raised temperatures and in which information is to be stored, and a second magnetic layer which is an in-plane magnetization film at room temperature and changed to a perpendicular magnetization film at raised temperatures. The method comprises a step of projecting a light spot on the recording medium, a step of applying a magnetic field, whose direction is modulated in accordance with information, to a light spot projection portion of the recording medium and orienting the magnetization direction of the second magnetic layer to the direction of the applied magnetic field, and a step of transferring the magnetization of the second magnetic layer to the first magnetic layer to form record bits.

These advantages and others will be more readily understood in connection with the following detailed description of the preferred embodiments taken in conjunction with the drawings.

BRIEF DESCRIPTION OF THE DRAWINGS

FIGS. 32A–32C are conceptual views showing other layer structures of magnetooptical recording media of the fifth embodiment.

FIG. 44 is a view showing lines of magnetic force of a recording magnetic field when information is recorded on the recording medium of the first embodiment.

FIGS. 45A and 45B are views showing lines of magnetic force of a recording magnetic field at the time of recording, when a magnetic coil is disposed on the side of the readout layer of the recording medium of the first embodiment.

DESCRIPTION OF THE PREFERRED EMBODIMENTS

FIRST EMBODIMENT

Figure 1:
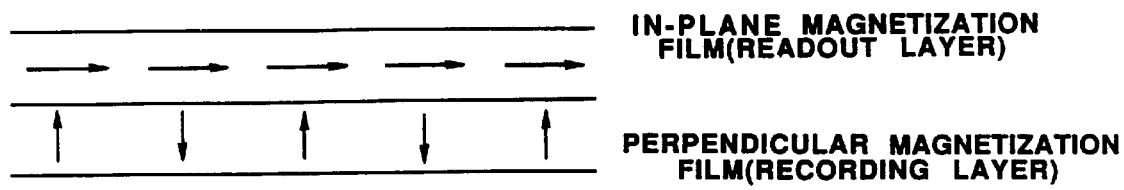
FIG. 1 is a schematic view showing the film structure of a magnetooptical recording medium of a first embodiment of the present invention.
Figure 2:
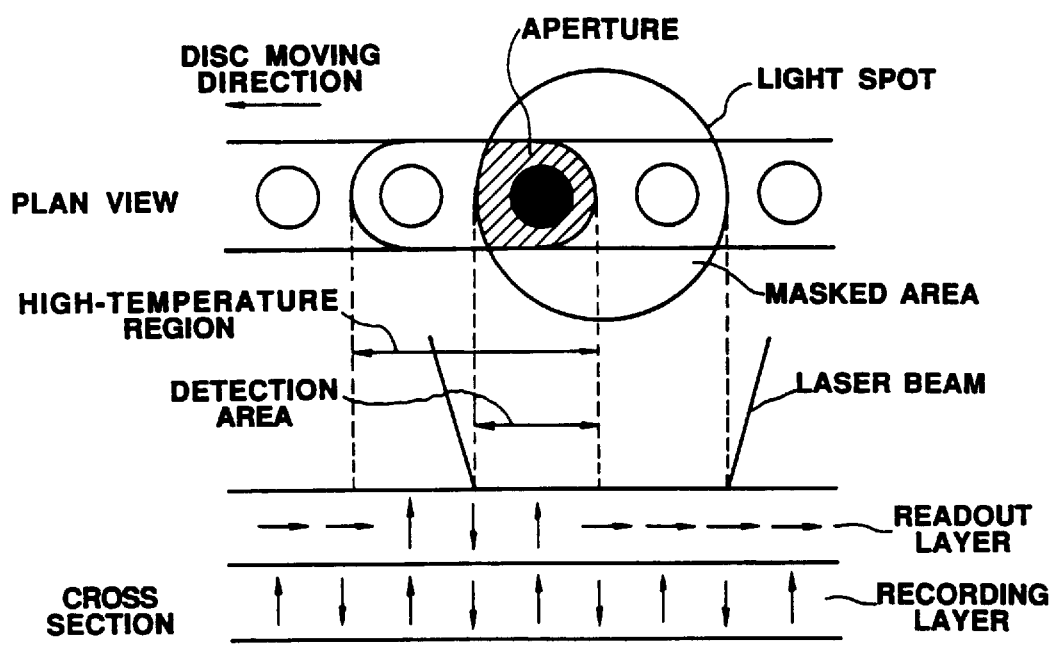
FIG. 2 is a schematic view showing the principle of a reproducing method of the first embodiment.
Figure 3:
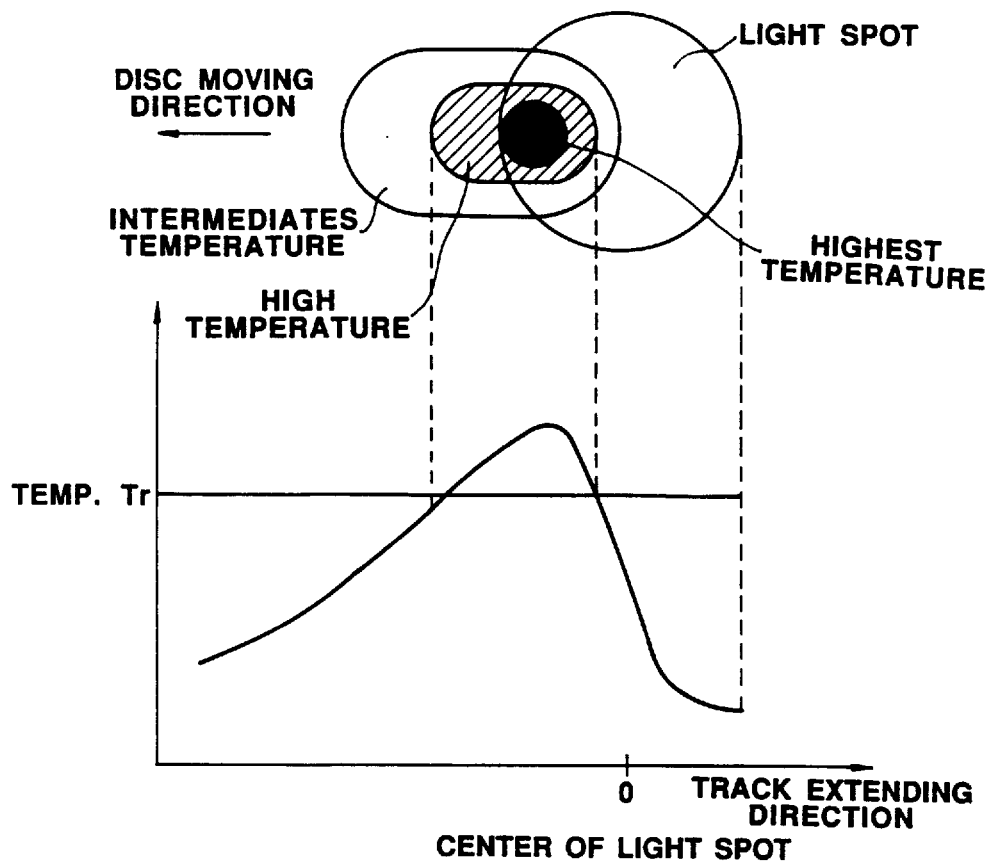
FIG. 3 is a view illustrating the temperature distribution of a magnetooptical recording medium around a light spot when the recording medium is moving.
Figure 4:
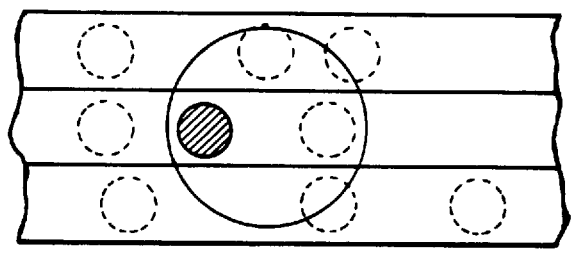
FIG. 4 is a schematic view illustrating the situation in which a transferred magnetization appears in a magnetic layer.
Figure 5:
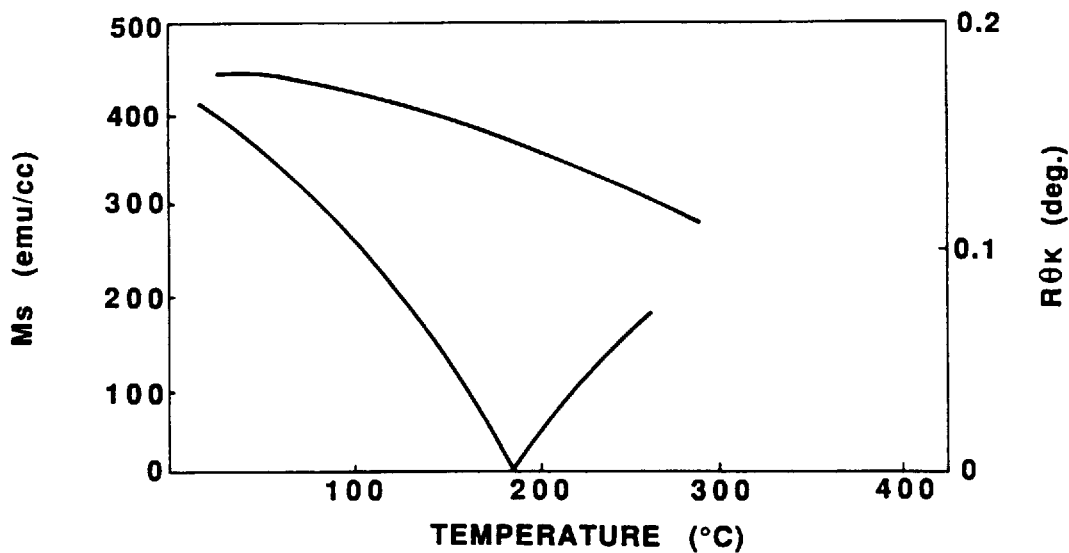
FIG. 5 is a graph illustrating the temperature dependencies of magnetization Ms and performance index $R\theta_k$ of a readout layer.
Figure 6:
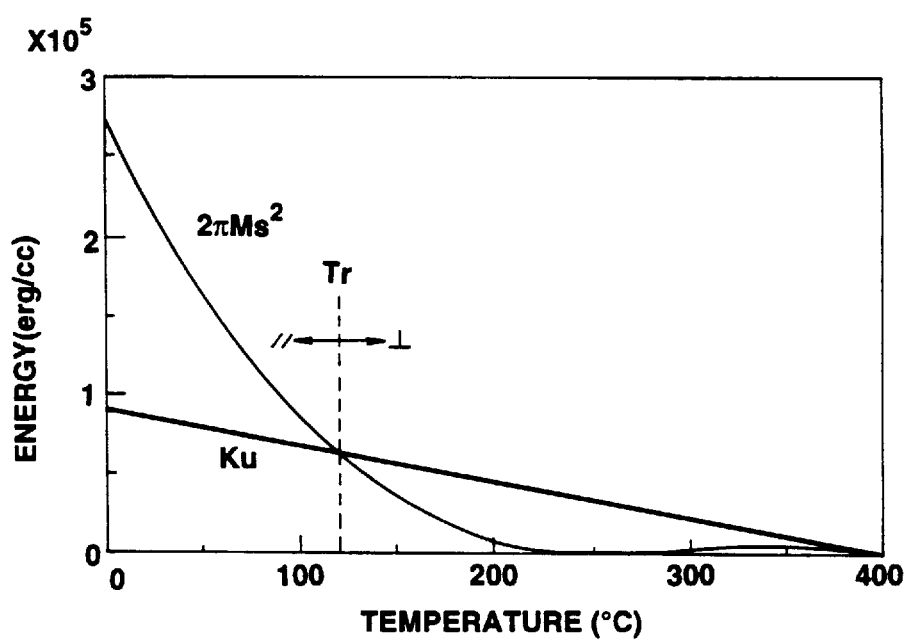
FIG. 6 is a graph illustrating the temperature dependencies of $2\pi Ms^2$ and perpendicular magnetic anisotropy constant Ku of a readout layer.

In this specification, a recording layer stands for a second magnetic layer, and a readout layer stands for a first magnetic layer A preferred first embodiment according to the present invention will be described with reference to FIGS. 1–9. FIG. 1 conceptually shows the film structure of a magnetooptical recording medium. FIG. 2 schematically shows the principle of an information recording-reproducing method. FIG. 3 is a graph illustrating the temperature distribution of the magnetooptical recording medium. FIG. 4 illustrates the situation in which transferred magnetization appears in a readout layer. FIGS. 5 and 6 are graphs illustrating temperature dependencies.

A magnetooptical recording medium of the first embodiment is composed of at least two layers: a readout layer and a recording layer. The readout layer remains an in-plane magnetizable film or layer at room temperature and becomes a perpendicularly magnetizable film when the temperature is raised. The recording layer, in which information is to be stored, is exchange-coupled to the readout layer and remains a perpendicularly magnetizable film not only at room temperature but also at raised temperatures.

The recording layer may be a perpendicularly magnetizable film which can stably store a minute record bit. The recording layer is desirably composed of material, such as rare-earth and iron group metal amorphous alloy (e.g., TbFeCo, DyFeCo and TbDyFeCo). The recording layer may also be composed of garnet, Pt/Co, Pd/Co and so forth, each of which is a perpendicular magnetization film and can magnetically transfer data to the readout layer.

The readout layer is desirably composed of material, such as rare-earth and iron group metal amorphous alloy (e.g., GdCo, GdFeCo, TbFeCo, DyFeCo, GdTbFeCo, GdDyFeCo, TbDyFeCo and so forth). In order to increase a Kerr rotation angle at short wavelengths and for other purposes, light rare-earth metal, such as Nd, Pr and Sm, may be added to the material mentioned immediately above. The readout layer may also be composed of platinum group and iron group periodical structure film, such as Pt/Co, Pd/Co, or platinum group and iron group alloy, such as PtCo and PdCo.

At a high-temperature domain of the readout layer within a laser beam spot for reproducing information, the direction of magnetization needs to shift from an in-plane direction to a direction perpendicular to the layer surface. Magnetic material, which is able to vary between an in-plane magnetizable film and a perpendicularly magnetizable film, may be adopted as a magnetic layer to be used for the readout layer. For example, such material originally has perpendicular magnetic anisotropy (Ku>0), becomes an in-plane magnetizable film due to effect of its own demagnetizing field since its saturation magnetization Ms is large at room temperature, and becomes a perpendicularly magnetizable film at the time of information reproduction since the saturation magnetization Ms decreases as temperature rises. An example of such magnetic material is a magnetic thin film whose compensation temperature does not necessarily exist but whose compensation temperature is, if it exists, preferably between room temperature and Curie temperature. Particularly, the compensation temperature of the readout layer is desirably over 100° C., more desirably over 200° C. and most desirably higher than 240° C.

The saturation magnetization of the readout layer is desirably equal to over 150 emu/cc at room temperature, and more desirably equal to over 200 emu/cc at room temperature. Further, Curie temperature of the readout layer is desirably as high as possible since Kerr rotation angle will not be small during readout and sufficiently large readout signal can be obtained, and is desirably higher than at least Curie temperature of the recording layer. More particularly, Curie temperature of the readout layer is desirably higher than 250° C., and more desirably higher than 300° C.

When the readout layer is composed of magnetic material whose principal component is GdFeCo, its Curie temperature rises as the Co content increase. However, if too much Co is added, desirable signal cannot be obtained because Ku decreases and becomes negative (i.e., an in-plane anisotropy appears) and thus a complete perpendicularly magnetizable film cannot be established even if temperature is raised so that saturation magnetization becomes sufficiently small. When the deposition is performed, even the GdCo layer can have perpendicular magnetic anisotropy if reverse sputtering, in which a negative potential bias is applied to the substrate side, is conducted or if annealing process or the like is conducted after deposition. Therefore, the GdCo layer cannot always be used. However, such process is slightly disadvantageous in productivity. Consequently, when the main element composition of the readout layer is $Gd_x(Fe_{100-y}Co_y)_{100-x}$, y is desirably in a range of 10 at%–60 at%, and more preferably in a range of 20 at%–50 at%.

The thickness of the readout layer cannot be too small since an incident light enters the recording layer or magnetic domain walls created between readout layer and recording layer invade the readout layer if such thickness is too small. Due to such entrance and invasion, data recorded in the recording layer is read out, and hence the masking portion of light spot becomes incomplete. On the other hand, if the readout layer is too thick, laser power needed during readout increases. Therefore, the readout layer should not also be too thick. The thickness of readout layer is desirably in a range of 150 Å–1000 Å, and more desirably in a range of 300 Å–900 Å.

Further, elements for improving corrosion resistance, such as Cr, Al, Ti, Pt, Nb and the like, may be added to the readout and recording layers, respectively.

An intermediate layer for adjusting exchange coupling force, or other magnetic layer may be formed.

In addition to the readout and recording layers, dielectric, such as SiN, $AlO_x$ and $TaO_x$, or metal layer for controlling thermal conductivity, such as Al, AlTi, AlCr, AlTa and Cu, may be formed in the recording medium. A protecting film may be used as a protective coat which is composed of the above-mentioned dielectric or polymer resin.

The Applicant earnestly studied the magnetization transfer process from recording layer to readout layer, and found the following fact. When using a magnetic layer which is an in-plane magnetizable film at room temperature and becomes a perpendicularly magnetizable film as the temperature rises, magnetization in the recording layer is transferred only to a high-temperature portion of the readout layer within a laser spot. According to such transfer method, it becomes unnecessary to conduct any preceding operation, such as alignment of magnetization direction of the readout layer to a single direction, and it is possible to reproduce signal having a periodicity or pitch below the diffraction limit of light.

The following description deals with the principle of recording-reproducing process of the first embodiment. Referring to FIG. 1, data signal is recorded in the recording layer of the magnetooptical recording medium. One ay of recording data signal in the recording layer is to modulate an external magnetic field while projecting a laser beam powerful enough to raise the temperature of the recording layer close to Curie temperature. The other way is to modulate a laser power while applying a magnetic field in a recording direction, after initializing magnetization of the recording layer toward a single direction.

When the intensity of the laser beam is determined so that the temperature of a predetermined region within a beam spot can be raised close to Curie temperature, considering the linear velocity of the recording medium, a record magnetic domain, which is less than the diameter of the laser beam spot, can be formed. As a result, it is possible to record signal having a periodicity less than the diffraction limit of light.

When reproducing the data signal, a readout laser beam is continuously projected onto the recording medium from the side of the readout layer and the data signal can be reproduced by detecting a light reflected from or transmitted through the recording medium. At this time, the temperature in the region irradiated with the beam spot rises and the temperature distribution on the recording medium has a shape extending along the moving direction of the recording medium as shown in FIG. 3. In the temperature distribution, a part of the illuminated portion within the beam spot is a high-temperature area.

With regard to the direction of magnetization, it is known that a chief magnetization direction is determined by an effective perpendicular magnetic anisotropy constant $K\perp$ that is defined by the following equation:

$$K\perp = Ku - 2\pi Ms^2$$

where Ms is the saturation magnetization of a magnetic thin film and Ku is the perpendicular magnetic anisotropy constant. Here, $2\pi Ms^2$ is energy of demagnetizing field.

As shown in FIG. 5, Ms of the readout layer decreases during information reproduction since the temperature increases. Thus, $2\pi Ms^2$ is rapidly reduced and becomes smaller than the perpendicular magnetic anisotropy constant Ku at temperature Tr. As a result, $K\perp$ becomes more than zero:

$$K\perp > 0.$$

When the readout layer and the recording layer are layered directly or with an intermediate layer therebetween, the temperature of a perpendicular magnetization region shifts toward a lower value, compared to a case where the readout layer and the recording layer are not layered, since exchange coupling force, magnetostatic coupling force or the like acts from the perpendicular magnetization film and thus Ku increases in appearance. However, if presetting the perpendicular magnetization temperature range in a single layer structure at a slightly higher value, it is possible that the readout layer is an in-plane magnetization film at room temperature and shifts into a perpendicular magnetization film at high temperature even when the readout layer is layered along with the perpendicular magnetization layer.

The highest-temperature region in the readout layer shifts into a perpendicular magnetization film. The temperature, at which $2\pi Ms^2 = Ku$, is referred to as Tr, as shown in FIG. 6. Although Ku also slightly decreases as-the temperature rises, the rate of its decrease is smaller than that of $2\pi Ms^2$.

Ms is large in the other portion where temperature is lower than Tr, so that the portion, where $K\perp < 0$, remains an in-plane magetization film.

In brief, only if the intensity of a laser beam for information reproduction is adjusted so that the temperature of only the highest-temperature region within the beam spot shown in FIG. 3 is higher than Tr, only the highest-temperature point of the readout layer, which is within the beam spot, becomes a perpendicular magnetization film, as shown in FIG. 2. Almost of the other region, however, remains an in-plane magetization film, as shown in FIG. 2. Since the portion of perpendicular magnetization film in the readout layer is magnetically coupled to the recording layer due to exchange coupling, signal in the recording layer is transferred to the readout layer. The transferred magnetic signal is reproduced by detecting a reflective light of the laser beam influenced by magneto-optic effect (Kerr or Faraday rotation angle) in the perpendicular magnetization film portion.

Therefore, since an area of the highest-temperature light spot shown point within the in FIG. 3 can be determined by the preset intensity of the laser beam, it is possible to transfer signal having a periodicity below the diffraction limit of light, which is recorded in the recording layer, into the readout layer by each record bit unit. Such reproducing method provides the reproduction of the above-mentioned signal without interference between codes.

Further, when the temperature distribution is adjusted so that temperature Tt at a boundary between the reproduced track and adjacent track is lower than Tr (i.e., Tt<Tr), a readout layer in the adjacent track remains an in-plane magetization film. Thus, the method can prevent transfer of signal, recorded in the recording layer of the adjacent track, into the readout layer thereof, and can fully solve the problem of crosstalk, as shown in FIG. 4.

Further, this embodiment is described as the case of magnetic coupling between the readout layer and the recording layer due to exchange coupling action, but it is possible that the recording layer is magnetically coupled to the readout layer by magnetostatic coupling at the time of reproduction.

Experimental examples of the first embodiment will be described hereinafter. They are illustrative and not restrictive.

First Experimental Example

Targets of SiN, Tb, Gd, Fe, Co and Al are installed in a DC magnetron sputtering equipment, and a glass substrate is held on a holder. Thereafter, air is vacuum-exhausted from a chamber to establish a high vacuum level of less than $1 \times 10^{-5}$ Pa by using a cryosorption pump.

Ar gas is introduced into the chamber while vacuum-exhausting air, until the level of 0.3 Pa of Ar gas is reached. Then, a GdTbCo layer (thickness: 800 Å) is deposited on the surface of the glass substrate by respectively applying DC powers to the targets of Gd, Tb and Co. This is followed by deposition of a SiN layer (a protective film and thickness: 800 Å) by applying AC power to the SiN target. The composition of the GdTbCo layer is controlled by adjusting applied powers of targets of Gd, Tb and Co at the time of sputtering. Thus, its compensation and Curie temperatures are adjusted to 180° C. and over 350° C., respectively.

Figure 8:
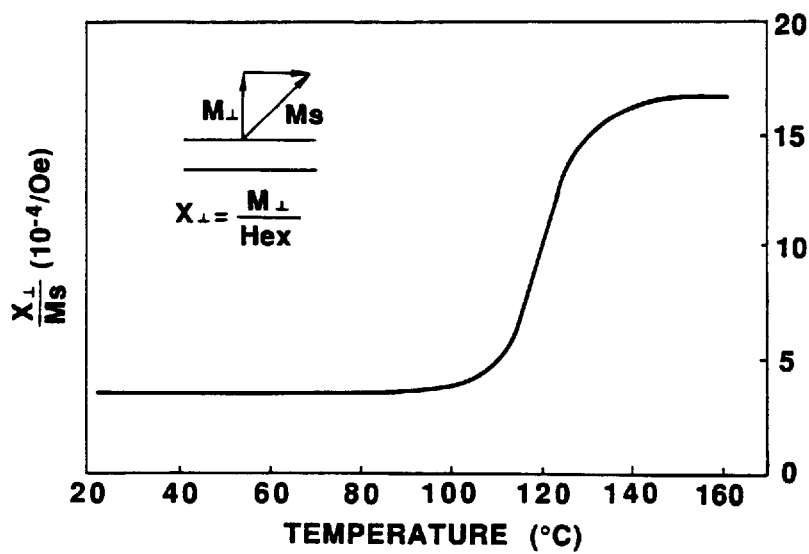
FIG. 8 is a graph illustrating an average rotation ratio of magnetic moment relative to an external magnetic field applied perpendicular to the film surface.

Reduction rate near 150° C. of Kerr rotation angle from its standard value at room temperature is below 10%, since the Curie temperature is high. Further, it has been found, as shown in FIG. 8, that a film magnetized in the direction of a layer surface of the readout layer is changed to a perpendicular magnetization film near 120° C., by measuring the average rotation rate of magnetic moment of perpendicular magnetization in the readout layer relative to an external magnetic field The average rotation rate of magnetization is represented by $M\perp/(Ms.Hex)$, where $M\perp$ is obtained by measuring magnetization of a sample, using a vibrating sample type magnetometer (VSM), under conditions under which the sample is heated by a resistance heating type heater in a vacuum of less than $1 \times 10^{-4}$ Pa and that an external magnetic field (Hex) of 600 Oe is applied in a direction perpendicular to the layer surface, and the saturation magnetization Ms is similarly obtained by applying an external magnetic field of 15 KOe.

Figure 7:
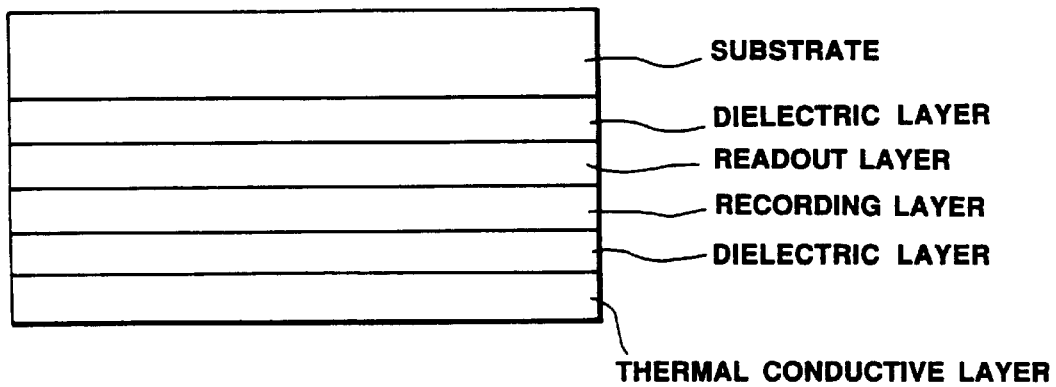
FIG. 7 is a view showing the layer structure of a magnetooptical recording medium of the first embodiment of the present invention.

Next, a polycarbonate substrate with pregooves having a diameter of 130 mm is installed. Other conditions are the same as above. Ar gas is introduced into the chamber, while vacuum-exhausting air, by using a cryosorption pump, until the level of 0.3 Pa of Ar gas is reached. Then, a SiN layer having a thickness of 900 Å is deposited on the substrate for anti-oxidation and interference effect. A GdTbCo layer (thickness: 400 Å) is deposited as a readout layer, and a TbFeCo layer (thickness: 400 Å) is deposited as a recording layer. Then, another SiN of layer (thickness: 300 Å) is deposited thereon for anti-oxidation and interference effect. An Al layer (thickness: 400 Å) is deposited as a thermal conductive layer. These depositions are performed in turn continuously with keeping vacuum. Thus, a five-layer magnetooptical recording medium as shown in FIG. 7, which is an example of the present invention, is formed.

Both SiN layers exhibit about 2.1 of refractive index, and the composition of the TbFeCo layer is set so that ratios of Tb, Fe and Co respectively exhibit 21, 72 and 7 at%.

The composition of GdTbFe layer is preset so that its compensation temperature is approx. 260° C. and Curie temperature is equal to 350° C.

Figure 9:
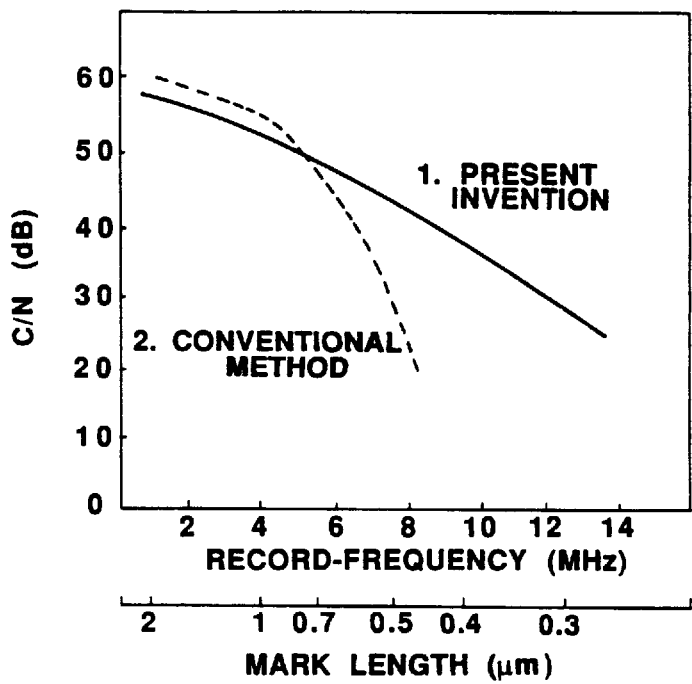
FIG. 9 is a graph illustrating the record frequency dependency of C/N ratio.

Recording-reproducing characteristics of the magnetooptical recording medium are measured. Conditions are described hereinafter. An measuring instrument comprises an objective lens of 0.55 N.A. and a projector for outputting a laser beam of 780 nm wavelength. Power for recording and power for reproduction are respectively preset in ranges of 7 mW–13 mW and 2.5 mW–3.5 mW so that CN becomes highest. The linear velocity is 9 m/sec. Then, 5~15 MHz carrier signal is recorded in the recording layer with intervals of 2 MHz, using a field modulation system. The record-frequency dependency of C/N ratio (ratio of carrier level relative to noise level) has been measured. The result is shown in FIG. 9.

Second to Sixteenth Experimental Examples

Similarly, media having readout and recording layers, which respectively have compositions, layer thicknesses, compensation temperatures (Tcp) and Curie temperatures as indicated in Table 1, are fabricated and evaluated. The layer structure is the same as the first experimental example, except that no thermal conductive layer is formed.

dependency of the conventional method (2). It is apparent from FIG. 9 that the method of the present invention (1) provides a preferable C/N ratio even under the condition of high record-frequency.

SECOND EMBODIMENT

A preferred second embodiment according to the present invention will be described hereinafter.

A magnetooptical recording medium of the second embodiment is composed of at least two layers: a readout layer and a recording layer. The readout layer remains a perpendicular magnetization film at room temperature and shifts into an in-plane magnetization film or layer when the temperature is raised. The recording layer, in which information is to be stored, remains a perpendicular magnetization film not only at room temperature but at raised temperatures. The readout and recording layers are exchange-coupled to each other when both of them are respectively perpendicular magnetization films.

The readout layer is preferably composed of, for example, rare-earth and iron group amorphous alloy, such as GdCo, GdFeCo, GdTbFeCo, GdDyFeCo and NdGdFeCo. Material, whose compensation temperatures is between room temperature and Curie temperature, is preferable.

The recording layer is preferably composed of material having large perpendicular magnetic anisotropy, for example, rare earth and iron group amorphous alloy, such as TbFeCo, DyFeCo and TbDyFeCo; or garnet; or platinum group and iron group periodical structure layer, such as Pt/Co and Pd/Co; or platinum group and iron group alloy, such as PtCo and PdCo.

TABLE 1 experimental exs. 2~16

| | readout layer | | | | recording layer | | | | result | | |
|---|---|---|---|---|---|---|---|---|---|---|---|
| ex. No. | composition | thick. Å | Tcp °C. | Tc °C. | composition | thick. Å | Tcp °C. | Tc °C. | $CN_{76}$ dB | $CN_{46}$ dB | $CN_{30}$ dB |
| 2 | $Gd_{27}(Fe_{72}Co_{28})_{73}$ | 400 | 150 | 330 | $Tb_{18}(Fe_{90}Co_{10})_{82}$ | 400 | non | 190 | 52 | 32 | 20 |
| 3 | $Gd_{28.5}(Fe_{72}Co_{28})_{71.5}$ | 400 | 220 | 300 | $Tb_{18}(Fe_{90}Co_{10})_{82}$ | 400 | non | 190 | 49 | 36 | 20 |
| 4 | $Gd_{30}(Fe_{72}Co_{28})_{70}$ | 400 | non | 275 | $Tb_{18}(Fe_{90}Co_{10})_{82}$ | 400 | non | 190 | 51 | 33 | 20 |
| 5 | $Gd_{28.5}(Fe_{65}Co_{35})_{71.5}$ | 400 | 210 | 350 | $Tb_{18}(Fe_{90}Co_{10})_{82}$ | 400 | non | 190 | 50 | 30 | 20 |
| 6 | $Gd_{30}(Fe_{65}Co_{35})_{70}$ | 400 | 265 | 320 | $Tb_{18}(Fe_{90}Co_{10})_{82}$ | 400 | non | 190 | 51 | 34 | 20 |
| 7 | $Gd_{31}(Fe_{65}Co_{35})_{69}$ | 400 | 280 | 300 | $Tb_{23}(Fe_{80}Co_{20})_{77}$ | 400 | non | 240 | 52 | 36 | 23 |
| 8 | $Gd_{28}(Fe_{60}Co_{40})_{72}$ | 400 | 190 | 400< | $Tb_{19}(Fe_{80}Co_{20})_{81}$ | 400 | non | 265 | 52 | 37 | 20 |
| 9 | $Gd_{30}(Fe_{65}Co_{35})_{70}$ | 400 | 240 | 320 | $Tb_{19}(Fe_{80}Co_{20})_{81}$ | 400 | non | 265 | 48 | 38 | 22 |
| 10 | $Gd_{28.5}(Fe_{72}Co_{28})_{71.5}$ | 400 | 220 | 300 | $Tb_{19}(Fe_{80}Co_{20})_{81}$ | 400 | non | 265 | 49 | 36 | 20 |
| 11 | $Gd_{28}(Fe_{60}Co_{40})_{72}$ | 600 | 190 | 400< | $Tb_{19}(Fe_{80}Co_{20})_{81}$ | 400 | non | 265 | 52 | 41 | 24 |
| 12 | $Gd_{28}(Fe_{60}Co_{40})_{72}$ | 800 | 190 | 400< | $Tb_{19}(Fe_{80}Co_{20})_{81}$ | 400 | non | 265 | 50 | 41 | 27 |
| 13 | $Gd_{28}(Fe_{60}Co_{40})_{72}$ | 1000 | 190 | 400< | $Tb_{19}(Fe_{80}Co_{20})_{81}$ | 400 | non | 265 | 50 | 41 | 28 |
| 14 | $(Nd_8Gd_{92})_{30}(Fe_{60}Co_{40})_{70}$ | 350 | * | * | $Dy_{15}(Fe_{80}Co_{20})_{85}$ | 300 | * | * | 52 | 36 | 26 |
| 15 | $(Gd_{96}Dy_4)_{28}(Fe_{58}Co_{42})_{72}$ | 450 | * | * | $(Tb_{80}Dy_{20})_{12}(Fe_{77}Co_{23})_{88}$ | 350 | * | * | 50 | 36 | 24 |
| 16 | $(Nd_{15}Gd_{85})_{32}(Fe_{65}Co_{35})_{68}$ | 600 | * | * | $Tb_{17}(Fe_{83}Co_{17})_{83}$ | 480 | * | * | 49 | 37 | 23 |

Tcp; compensation temp.,
Tc; Curie temp.,
CN76; C/N at mark length of 0.76 μm
CN46; C/N at mark length of 0.46 μm,
CN30; C/N at mark length of 0.30 μm,
*; not measured First Comparative Experimental Example Conditions of the first comparative experimental example of a magnetooptical recording medium are the same as the first experimental example, except that the readout layer is removed, a four-layer structure is adopted and the thickness of the recording layer is set to 800 Å. The record-frequency dependency of C/N ratio has similarly been measured. The result is shown in FIG. 9 where dotted curve expresses the Further, elements for improving corrosion resistance, such as Cr, Al, Ti, Pt, Nb and the like, may be added to the readout and recording layers, respectively.

Dielectrics, such as SiN, $AlO_x$, $TaO_x$, $SiO_x$, at. el, may be formed in addition to the readout and recording layers in order to improve interference effect. Materials for improving thermal conductivity, such as Al, $AlN_x$, AlTi, AlCr, AlTa, Cu and the like, may be formed.

An intermediate layer for adjusting exchange coupling force, or an auxiliary layer for assistance of recording or reproduction may be formed. A protecting coating, which is composed of the above-discussed dielectric or polymer resin, may be used as a protective film.

The following description deals with the principle of recording-reproducing process of the second embodiment. Referring to the FIG. 10A, data signal is recorded in the recording layer of the magnetooptical recording medium. One way of recording data signal in the recording layer is to modulate an external magnetic field while projecting a laser beam powerful enough to raise the temperature of the recording layer to over Curie temperature. Another way is to modulate a laser power while applying a magnetic field in a recording direction, after eliminating data in the recording layer. The other way is to modulate a laser power while applying an external magnetic field.

When the intensity of the laser beam is determined so that the temperature of a predetermined region within a beam spot is raised close to Curie temperature, considering the linear velocity of the recording medium, a record magnetic domain, which is less than the diameter of the laser beam spot, is formed. As a result, it is possible to record signal having a periodicity less than the diffraction limit of light.

Figure 12:
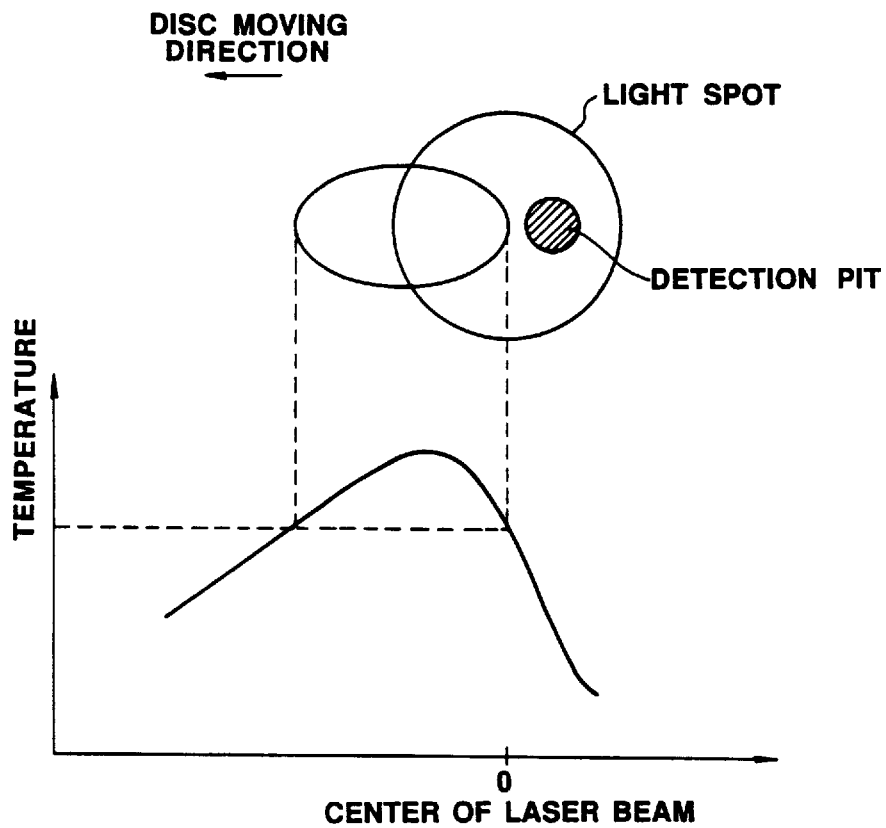
FIG. 12 is a schematic view illustrating the temperature distribution of the magnetooptical recording medium around a light spot when the recording medium is moving.

When reproducing the data signal, a readout laser beam is projected onto the recording medium. At this time, the temperature in the region, irradiated ith the beam spot, rises. Since the medium moves at a constant speed, the temperature distribution on the recording medium has a shape extending along the moving direction of the recording medium, as shown in FIG. 12. In the temperature distribution, a part (i.e., a trailing edge portion in the moving direction of the light spot) of the illuminated portion within the beam spot is a high-temperature area.

With regard to the direction of magnetization, it is known that a chief magnetization direction is determined by an effective perpendicular magnetic anisotropy constant $K\perp$ that is defined by the following equation:

$$K\perp = Ku - 2\pi Ms^2$$

where Ms is the saturation magnetization of a single magnetic thin film and Ku is the perpendicular magnetic anisotropy constant. Here, $2\pi Ms^2$ is energy of demagnetizing field.

Figure 14:
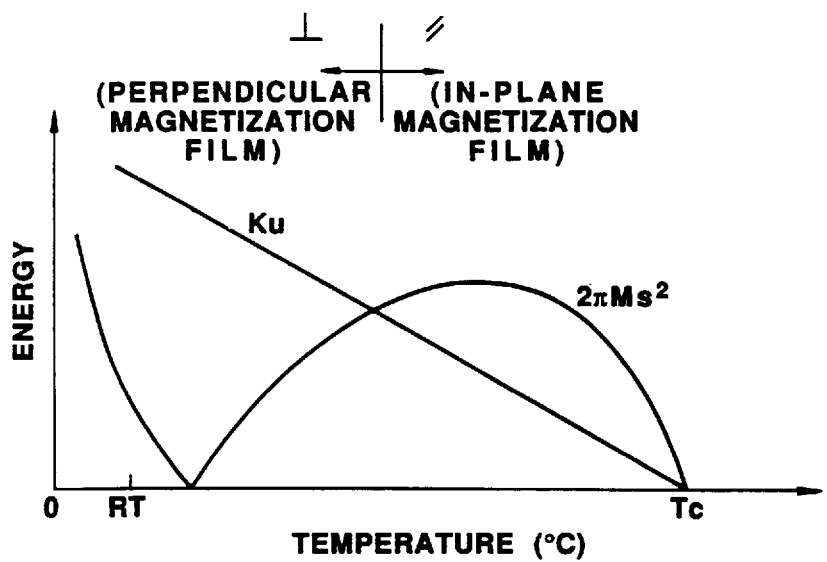
FIG. 14 is a graph illustrating examples of the temperature dependencies of $2\pi Ms^2$ and perpendicular magnetic anisotropy constant Ku of a readout layer.

For example, when the readout layer has the temperature dependency of Ms and Ku as shown in FIG. 14, Ms of the readout layer increases at the time of information reproduction since the temperature increases. Thus, $2\pi Ms^2$ rapidly increases and becomes larger than the perpendicular magnetic anisotropy constant Ku. As a result, $K\perp$ becomes less than zero ($K\perp < 0$), and the readout layer becomes an in-plane magnetization film.

Figure 11:
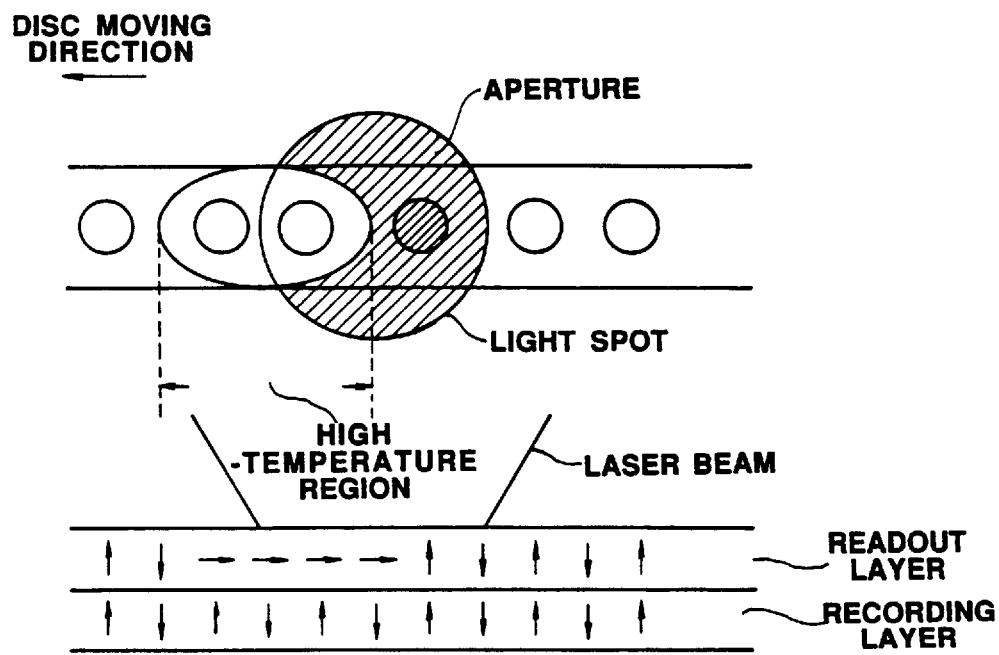
FIG. 11 is a schematic view illustrating a method of reproducing information by using the magnetooptical recording medium shown in FIG. 10A.

When the saturation magnetization Ms and perpendicular magnetic anisotropy constant Ku of the readout layer are set, considering the intensity and linear velocity of the laser light during data reproduction, so that the magnetization of the readout layer is an in-plane magetization film in the high-temperature point within the light spot as shown in FIG. 11, only the high-temperature region within the laser beam spot becomes an in-plane magetization film. The other potion, however, is a perpendicular magnetization film as shown in FIG. 11. Since the readout layer, which is a perpendicular magnetization film, is magnetically coupled to the recording layer due to exchange coupling therebetween, the direction of magnetization in the readout layer is aligned along a stable direction for the magnetization direction of information recorded in the recording layer. Thus, the recorded information in the recording layer is transferred into the readout layer. The transferred information is converted into an optical signal by magneto-optic effect (magneto-optic effect of a laser beam reflected from the readout layer) and detected. In this case, the magneto-optic effect would not occur in a portion within the laser beam spot where the readout layer is an in-plane magetization film.

Further, this embodiment is described as the case of magnetic coupling due to exchange coupling between the readout layer and the recording layer, but it is possible that the recording layer is magnetically coupled to the readout layer at the time of reproduction by magnetostatic coupling.

When the readout layer and the recording layer are layered directly or with an intermediate layer therebetween, the temperature of an in-plane magnetization region shifts toward a higher value, compared to a case where the readout layer and the recording layer are not layered, since exchange coupling force, magnetostatic coupling force or the like acts from the perpendicular magnetization film and thus Ku increases in appearance. However, if presetting the in-plane magnetization temperature range in a single layer structure at a slightly lower value, it is possible that the readout layer is a perpendicular magnetization film at room temperature and shifts into an in-plane magnetization film at the high temperature even when the readout layer is layered along with the perpendicular magnetization layer.

As described above, in an information reproducing method using the magnetooptical recording medium of the present invention, it is possible to reduce interference between codes and reproduce information at high C/N ratio without utilizing a magnetic field for initialization, even in the case of a bit periodicity smaller than the diameter of a laser beam spot.

Figure 10:
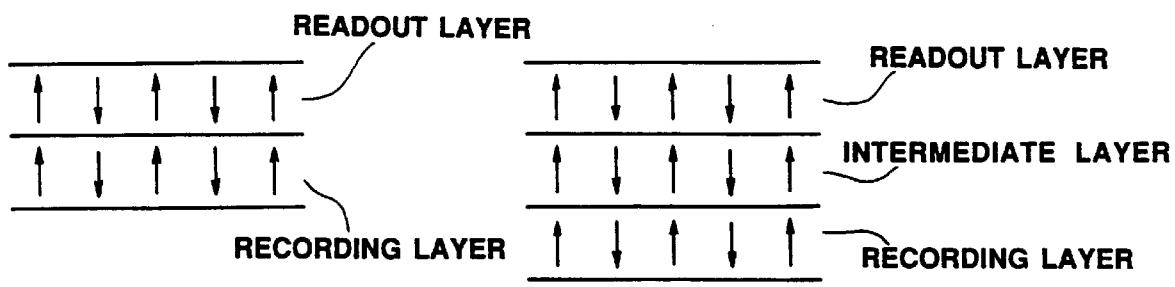
FIG. 10A is a schematic view showing the film structure of a magnetooptical recording medium of a second embodiment of the present invention.
FIG. 10B is a schematic view showing the improved film structure of a magnetooptical recording medium of the second embodiment of the present invention.

The following is an example of an improved recording medium which contains an intermediate layer between a readout layer and a recording layer as shown in FIG. 10B. An intermediate layer is formed between a readout layer and a recording layer. Curie temperature of the intermediate layer is higher than room temperature and lower than those of the readout layer and the recording layer. Material of the intermediate layer may be rare-earth and iron group amorphous alloy, such as TbFe, GdFe, TbFeCo and GdFeCo, or these alloys to which non-magnetic element such as Al, Cu and Cr is added.

Figure 13:
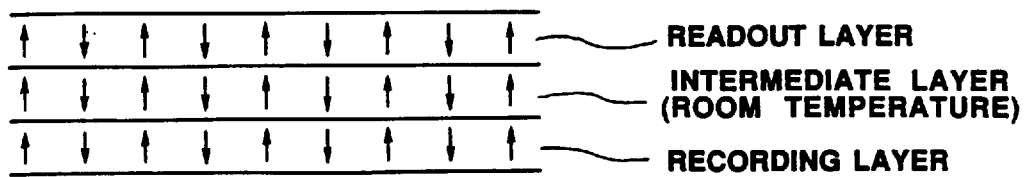
FIGS. 13A and 13B are schematic views illustrating a method of reproducing information by using the magnetooptical recording medium shown in FIG. 10B.
Figure 13:
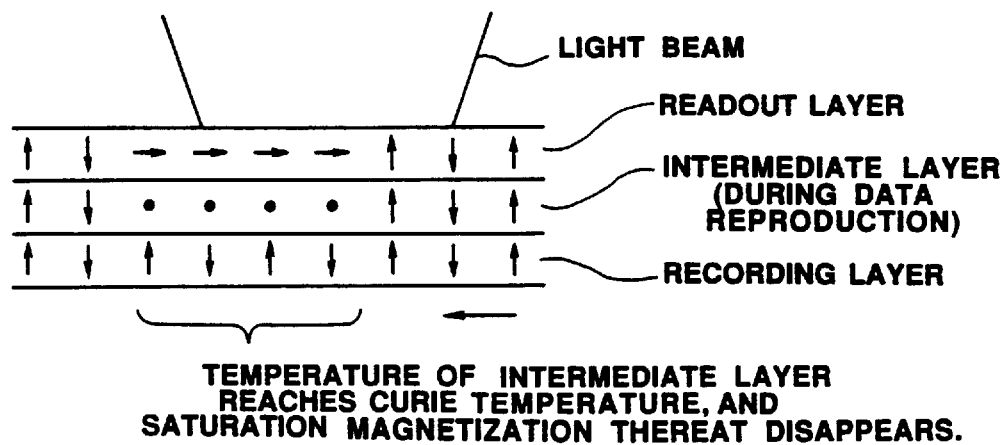

The intermediate layer functions as a mediator of exchange coupling force from the recording layer to the readout layer until the temperature reaches Curie temperature, and information of the recording layer is transferred to the readout layer as shown FIG. 13A.

However, the exchange coupling between the readout and recording layers is interrupted at a high-temperature portion of the intermediate layer where its temperature reaches Curie temperature. Perpendicular magnetic anisotropy constant, in appearance, of the readout layer thereat becomes smaller than the other portion due to loss of exchange coupling force from the recording layer. Energy level relation between perpendicular magnetic anisotropy constant in appearance and demagnetizing field energy is inverted, and accordingly the magnetization direction of the readout layer is aligned to an in-plane direction.

In such a case where the intermediate layer is formed, which has a low Curie temperature, the readout layer is a perpendicular magnetization film at room temperature and can shift into an in-plane magnetization film at raised temperature with the intermediate layer being formed with the recording layer, even when the readout layer has no characteristic that the readout layer in a single-layer state varies from a perpendicular magnetization film to an in-plane magnetization film as temperature increases (in other words, even if the readout layer in a single-layer state remains a perpendicular magnetization film from room temperature to Curie temperature. Thus, the recording medium comprising the intermediate layer is advantageous in that material can be selected from a wider range.

Since a portion of the laser beam spot in the readout layer (a portion in which the readout layer is not an in-plane magnetization film, that is, a low-temperature portion) is a perpendicular magnetization film, the readout layer and the recording layer are exchange-coupled to each other and thus information in the recording layer is transferred to the readout layer. The transferred information is converted into an optical signal by magneto-optic effect (i.e., magneto-optic effect of a laser beam reflected from the readout layer) and thus the transferred information can be detected. In this case, since the magneto-optic effect would not occur in the other portion where an in-plane magnetization film is established, preferable information reproduction with high resolution is possible even when a higher density recording is conducted.

The following is the description concerning experimental examples of the second embodiment.

Seventeenth Experimental Example

Targets of Si, Tb, Gd, Fe and Co are installed in a DC magnetron sputtering equipment, and a glass substrate is held on a holder. Thereafter, air is vacuum-exhausted from a chamber to establish a high vacuum level of less than $1\times10^{-5}$ Pa by using a cryosorption pump.

Ar gas is introduced into the chamber while vacuum-exhausting air, until the level of 0.4 Pa of Ar gas is reached. Then, a SiN layer is deposited to a thickness of 800 Å on the surface of the substrate. A GdFeCo layer (thickness: 400 Å) is deposited as a readout layer, and a TbFeCo layer (thickness: 400 Å) is deposited as a recording layer. Then, another SiN layer (thickness: 700 Å) is deposited as a protective film.

When the SiN layer is formed, $N_2$ gas is introduced in addition to the Ar gas and the deposition is performed by DC reactive sputtering. The GdFeCo and TbFeCo layers are formed with applying DC powers to targets of Gd, Fe, Co and Tb respectively and utilizing spontaneous sputtering. The compositions of those layers are controlled by adjusting applied DC powers to the respective targets.

The composition of the GdFeCo layer is set so that its compensation and Curie temperatures are respectively 120° C. and over 400° C. The composition of the TbFeCo layer is adjusted so that its compensation and Curie temperatures are respectively less than room temperature and 200° C.

Figure 15:
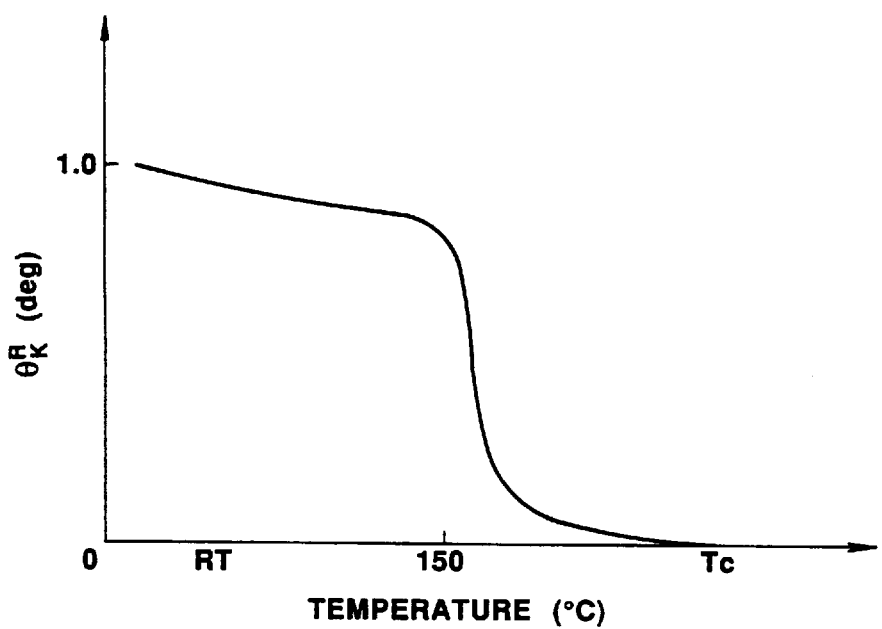
FIG. 15 is a graph illustrating an example of the temperature dependency of a residual $\theta_k$ (when a magnetic field=0) of the magnetooptical recording medium of the second embodiment.

It has been found that residual Kerr rotation angle disappeares at about 150° C. and an in-plane magnetization film is established as shown in FIG. 15, by measuring the residual $\theta_k$ at the time of magnetic field=zero with the temperature of the layered films being raised.

Eighteenth Experimental Example

The following is the description concerning the 18th experimental example. A magnetooptical recording medium is fabricated, which has the same layer structure as the 17th experimental example. Conditions of the 18th experimental example are the same as the second one except that a polycarbonate substrate having a diameter of 130 mm with pregrooves is installed.

Result of measurement of recording-reproducing characteristics of this magnetooptical recording medium is as follows. A measuring instrument comprises an objective of 0.55 N.A. and a projector for outputting a laser beam of 780 nm wavelength. Power for recording is preset at 8 mW and linear velocity is 9 m/sec. Then, 5.8–13 MHz carrier signal is recorded in the recording layer by using a field modulation system (record magnetic field: ±300 Oe). The record-frequency dependency of C/N ratio is measured. The reproducing power is set so that C/N ratio is maximized. The result is shown in Table 2.

Nineteenth Experimental Example

Targets of Si, Tb, Gd, Fe and Co are installed in a DC magnetron sputtering equipment, and a polycarbonate resin substrate is held on a holder. Thereafter, air is vacuum-exhausted from a chamber to establish a high vacuum level of less than $1\times10^{-5}$ Pa by using a cryosorption pump.

Ar gas is introduced into the chamber while vacuum-exhausting air, until the level of 0.4 Pa of Ar gas is reached. Then, a SiN layer is deposited to a thickness of 820 Å on the surface of the substrate. A GdFeCo layer (thickness: 400 Å) is deposited as a readout layer, and a TbFeCo layer (thickness: 300 Å) is deposited as a recording layer. Then, a SiN layer as a protective film (thickness: 700 Å) is deposited. Thus, a magnetooptical recording medium of the present invention is fabricated.

When the SiN layer is formed, $N_2$ gas is introduced in addition to the Ar gas and the deposition is performed by DC reactive sputtering. The GdFeCo and TbFeCo layers are formed by applying DC powers to targets of Gd, Fe, Co and Tb respectively and utilizing spontaneous sputtering. The compositions of those layers are controlled by adjusting the DC powers applied to the respective targets.

The composition of the GdFeCo readout layer is set so that its compensation and Curie temperatures are respectively 130° C. and over 350° C. The composition of the TbFeCoAl intermediate layer is adjusted so that its compensation and Curie temperatures are respectively less than room temperature and 150° C. The composition of the TbFeCo recording layer is adjusted so that its compensation and Curie temperatures are respectively less than room temperature and 200° C.

Result of measurement of recording-reproducing characteristics of this magnetooptical recording medium is as follows. A measuring instrument comprises an objective of 0.55 N.A. and a projector for outputting a laser beam of 780 nm wavelength. Power for recording is preset at 8 mW and linear velocity is 9 m/sec. Then, 5.8–13 MHz carrier signal is recorded in the recording layer by using a field modulation system (record magnetic field: ±300 Oe). The record-frequency dependency of C/N ratio is measured. The reproducing power is set so that C/N ratio is maximized. The result is shown in Table 2.

Second Comparative Experimental Example.

Conditions of the second comparative experimental example of a magnetooptical recording medium are the same as the 18th experimental example, except that the readout layer is removed and the thickness of the TbFeCo recording layer is set to 800 Å. The record-frequency dependency of C/N ratio has similarly been inspected. The result is shown in Table 2. It is apparent from Table 2 that the method of the present invention provides a preferable C/N ratio even under the condition of high record-frequency.

Twentieth Experimental Example

A magnetooptical recording medium is fabricated, which has the following layer thicknesses and compositions, by the same method as the 19th experimental example.

A SiN layer is deposited to a thickness of 780 Å on the surface of the substrate. A GdFeCo layer (thickness: 400 Å) is deposited as a readout layer, a TbFeCoSi layer (thickness: 100 Å) is deposited as an intermediate layer and a TbFeCo layer (thickness: 300 Å) is deposited as a recording layer. Then, a SiN layer (thickness: 700 Å) is deposited as a protective film. Thus, a magnetooptical recording medium of the present invention is fabricated.

The composition of the GdFeCo readout layer is set so that its compensation and Curie temperatures are respectively 110° C. and 320° C. The composition of the TbFeCoSi intermediate layer is adjusted so that its compensation and Curie temperatures are respectively less than room temperature and 110° C. The composition of the TbFeCo recording layer is adjusted so that its compensation and Curie temperatures are respectively less than room temperature and 200° C.

After the fabrication of the recording medium, recording-reproducing characteristics are evaluated in the same manner as the 18th and 19th experimental examples and the result of measurement is shown in Table 2.

TABLE 2

| f (MHz) | pit length (μm) | value of C/N ratio (dB) | | | |
|---|---|---|---|---|---|
| | | exp. example 18 | exp. example 19 | exp. example 20 | com. example 2 |
| 13 | 0.35 | 29 | 32 | 31 | 2 |
| 10 | 0.45 | 37 | 38 | 34 | 18 |
| 8.0 | 0.57 | 44 | 44 | 45 | 42 |
| 5.8 | 0.78 | 48 | 48 | 48 | 48 |

THIRD EMBODIMENT

A preferred third embodiment according to the present invention will be described hereinafter.

A magnetooptical recording medium of the third embodiment is composed of at least two layers: a readout layer and a recording layer. The readout layer remains an in-plane magnetization film at room temperature, shifts into a perpendicular magnetization film or layer when the temperature is raised, and returns to an in-plane magnetization film or its magnetization disappears when the temperature is further raised. The recording layer, in which information is to be stored, remains a perpendicular magnetization film not only at room temperature but at raised temperatures.

The readout layer is preferably composed of, for example, rare-earth and iron group amorphous alloy, such as GdCo, GdFeCo, GdTbFeCo, GdDyFeCo and NdGdFeCo. Material, whose compensation temperature is between room temperature and Curie temperature, is preferable.

The recording layer is preferably composed of material which has large perpendicular magnetic anisotropy and whose magnetized state is stably held, for example, rare earth and iron group amorphous alloy, such as TbFeCo, DyFeCo and TbDyFeCo; or garnet; or platinum group and iron group periodical structure layer, such as Pt/Co and Pd/Co; or platinum group and iron group alloy, such as PtCo and PdCo.

Further, elements for improving corrosion resistance, such as Cr, Al, Ti, Pt, Nb and the like, may be added to magnetic layers such as the readout and recording layers, respectively.

Dielectrics, such as $SiN_x$, $AlN_x$, $TaO_x$, $SiO_x$, at. el, may be formed in addition to the readout and recording layers in order to improve interference effect. Materials for improving thermal conductivity, such as Al, AlTa, AlTi, AlCr, Cu and the like, may be formed.

An intermediate layer for adjusting exchange coupling force or magnetostatic coupling force, or an auxiliary layer for assistance of recording or reproduction may be formed. A protecting coating, which is composed of the above-discussed dielectric or polymer resin, may be used as protective film.

Figure 16:
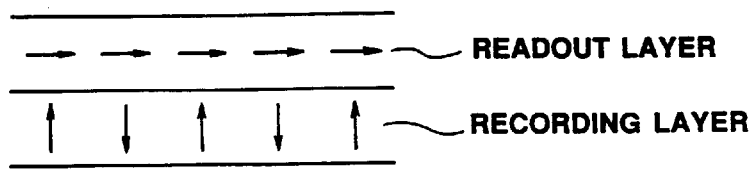
FIG. 16 is a schematic view illustrating a magnetized situation of a magnetooptical recording medium of a third embodiment.

The following description deals with the principle of recording-reproducing process of the third embodiment. Referring to the FIG. 16, data signal is recorded in the recording layer of the magnetooptical recording medium. One way of recording data signal in the recording layer is to modulate an external magnetic field while projecting a laser beam powerful enough to raise the temperature of the recording layer to over Curie temperature. Another way is to modulate a laser power while applying a magnetic field in a recording direction, after eliminating data. The other way is to modulate a laser power while applying an external magnetic field.

When the intensity of the laser beam is determined so that the temperature of only a predetermined region within a beamspot is raised close to Curie temperature, considering the linear velocity of the recording medium, a record magnetic domain is formed, which is less than the diameter of the laser beam spot. As a result, it is possible to record signal having a periodicity less than the diffraction limit of light.

Figure 19:
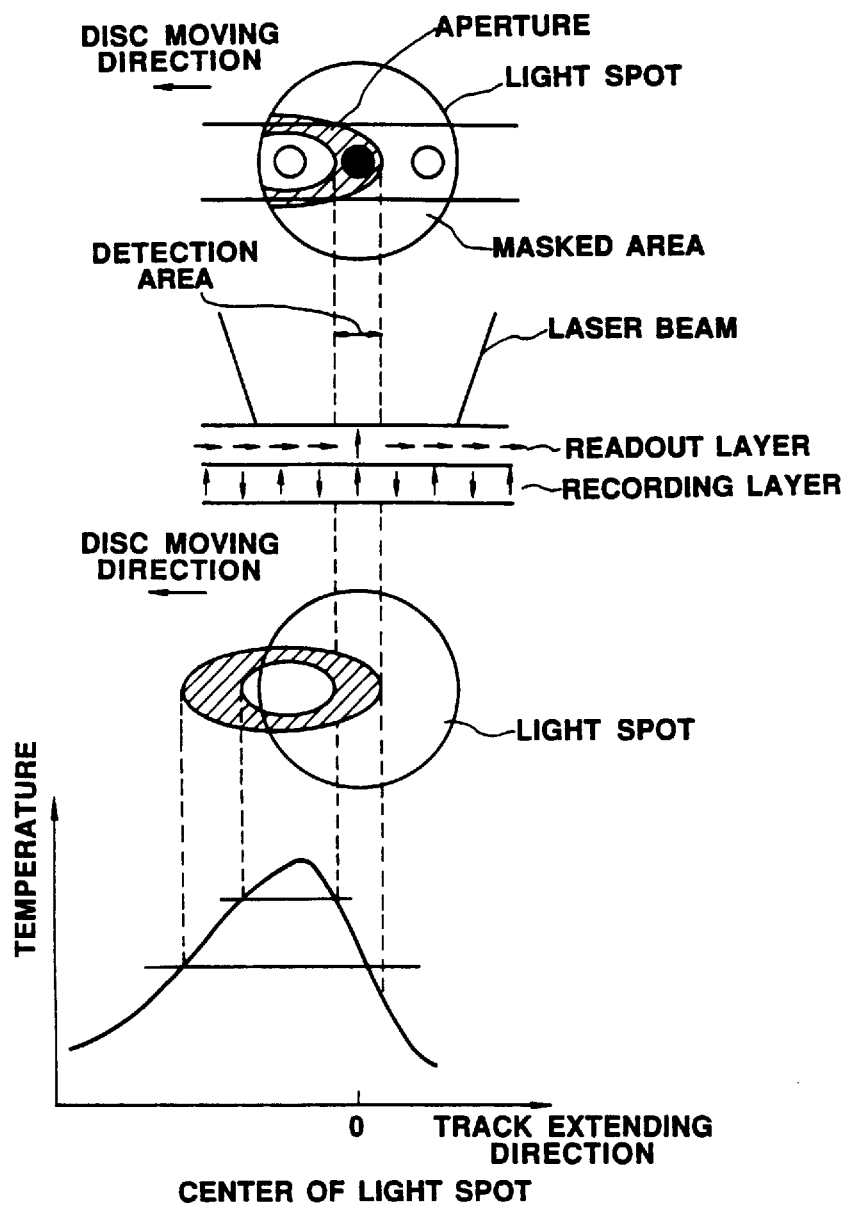
FIG. 19 is a schematic view illustrating a method of reproducing information by using the magnetooptical recording medium shown in FIG. 16.
Figure 20:
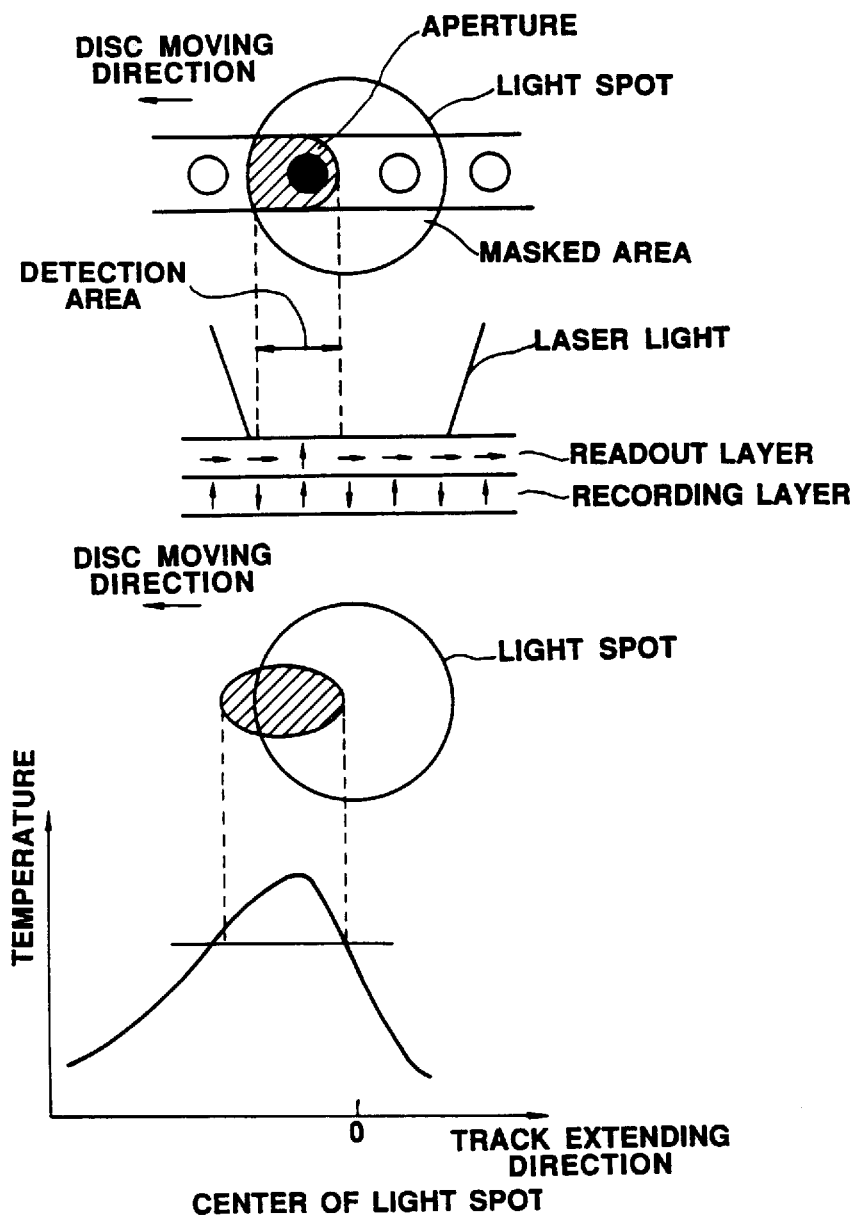
FIG. 20 is a schematic view illustrating a method of reproducing information by using a magnetooptical recording medium different from the third embodiment.

When reproducing the data signal, a readout laser beam is projected onto the recording medium. At this time, the temperature in the region, irradiated with the beam spot rises. Since the medium moves at a constant speed, the temperature distribution on the recording medium has a shape extending along the moving direction of the recording medium as shown in FIG. 19 or 20. In the temperature distribution, a portion within the beam spot is a high-temperature area.

As regards a single magnetic thin film, it is well known that a chief magnetization direction is determined by an effective perpendicular magnetic anisotropy constant $K\perp$ that is defined by the following equation:

$$K\perp = Ku - 2\pi Ms^2$$

where Ms is the saturation magnetization of a single magnetic thin film and Ku is the perpendicular magnetic anisotropy constant. A perpendicular magnetization film appears when $K\perp$ is positive, and an in-plane magnetization film appears when $K\perp$ is negative. Here, $2\pi Ms^2$ is energy of demagnetizing field.

Figure 23:
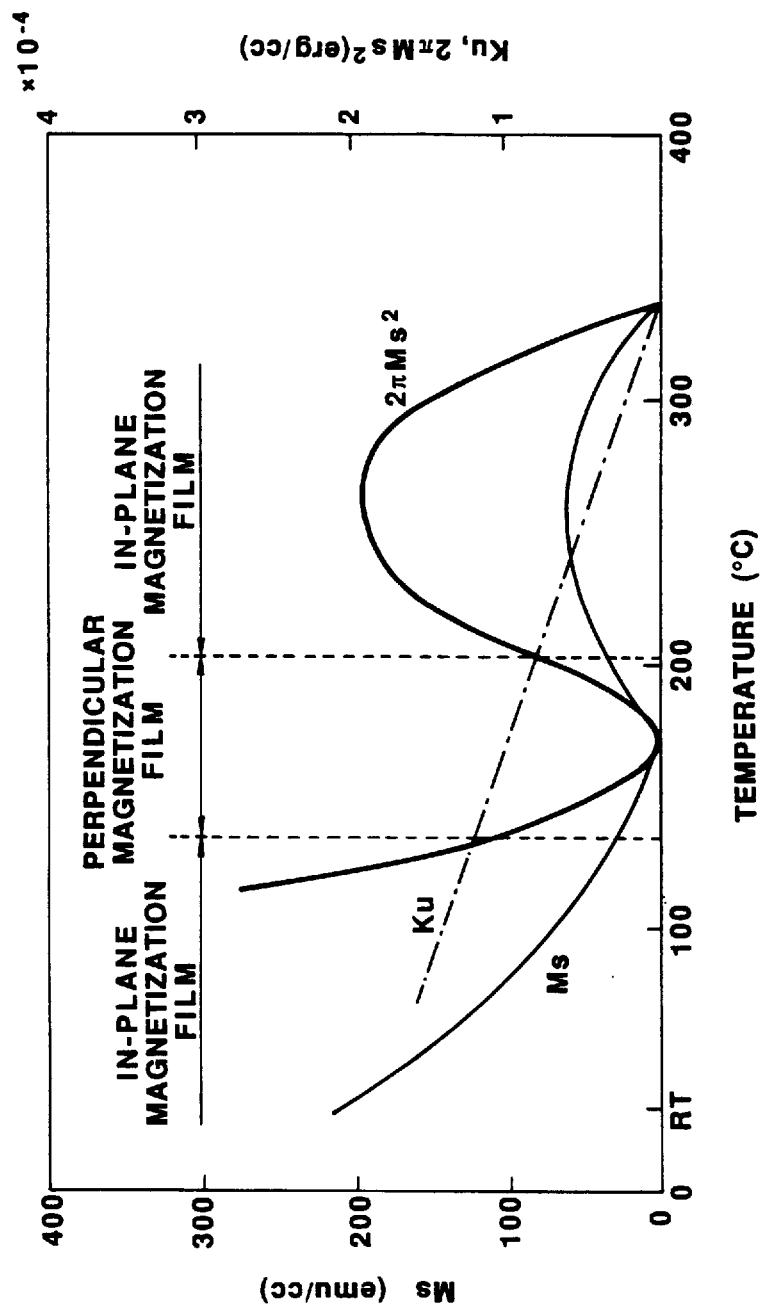
FIG. 23 is a graph illustrating examples of the temperature dependencies of $2\pi Ms^2$ and perpendicular magnetic anisotropy constant Ku of a readout layer of the magnetooptical recording medium of the third embodiment.
Figure 24:
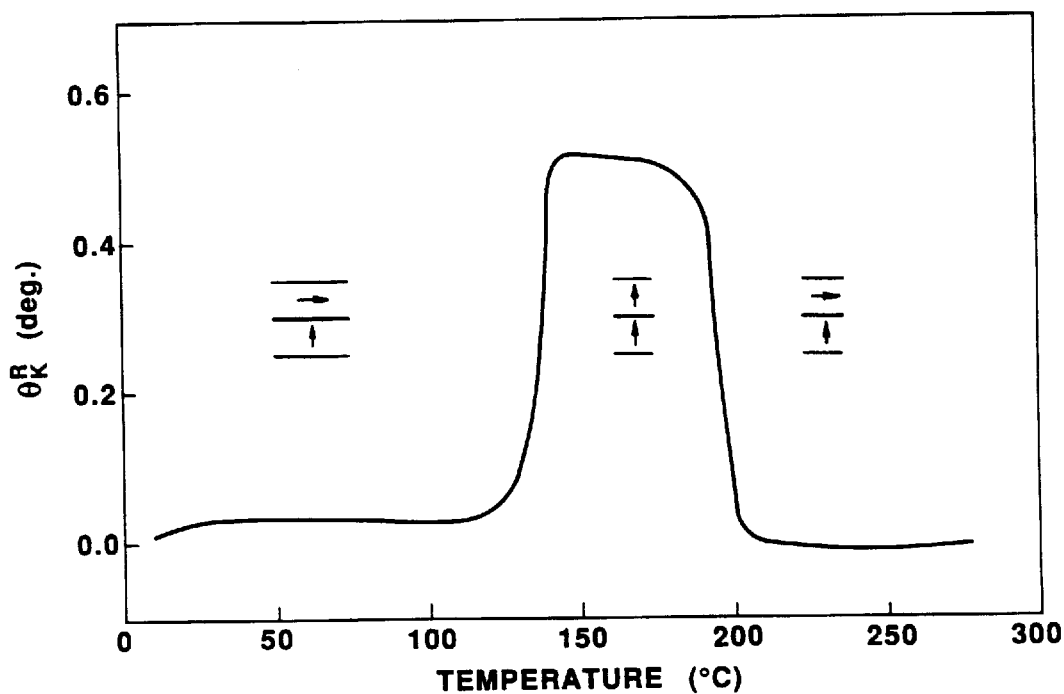
FIG. 24 is a graph illustrating an example of the temperature dependency of a residual $\theta_k$ (when a magnetic field=0) of the magnetooptical recording medium of the third embodiment.

For example, when Ms and Ku have the temperature dependencies as shown in FIG. 23, the in-plane magnetization film appears at room temperature since $Ku < 2\pi Ms^2$ and $K\perp < 0$. Ms of the readout layer decreases at the time of information reproduction since the temperature increases. Thus, $2\pi Ms^2$ rapidly decreases and becomes smaller than the perpendicular magnetic anisotropy constant Ku. As a result, $Ku > 2\pi Ms^2$ and $K\perp > 0$, and the readout layer becomes the perpendicular magnetization film.

When the saturation magnetization Ms and perpendicular magnetic anisotropy constant Ku of the readout layer are set, considering the intensity and linear velocity of the laser light at the time of data reproduction, so that the magnetization of the readout layer is an in-plane magetization film (which functions as a mask) in the highest-temperature and low-temperature (near room temperature) points within the light spot and is a perpendicular magnetization film (which functions as a detection area or aperture) in an intermediate-temperature portion thereof, as shown in FIG. 19, only the highest-temperature and low-temperature points within the laser beam spot become an in-plane magetization film. The other portion (the intermediate-temperature portion), however, is a perpendicular magnetization film.

Since the readout layer, which is a perpendicular magnetization film, is magnetically coupled to the recording layer due to exchange coupling, the direction of magnetization in the readout layer is aligned along a stable direction for the magnetization direction of information recorded in the recording layer. Thus, the recorded information in the recording layer is transferred into the readout layer. The transferred information is converted into an optical signal by magneto-optic effect (i.e., magneto-optic effect of a laser beam reflected from the readout layer) and detected. In this case, the magneto-optic effect would not occur in a portion within the laser beam spot where the readout layer is an in-plane magetization film.

Further, this embodiment is described as a case of magnetic coupling due to exchange coupling between the readout layer and the recording layer, but it is possible that the recording layer is magnetically coupled to the readout layer at the time of reproduction by magnetostatic coupling. When the readout layer and the recording layer are layered directly or with an intermediate layer therebetween, the temperature of a perpendicular magnetization region shifts toward a lower value, compared to a case where the readout layer and the recording layer are not layered, since exchange coupling force, magnetostatic coupling force or the like acts from the perpendicular magnetization film and thus Ku increases in appearance. However, if presetting the perpendicular magnetization temperature range in a single layer structure at a slightly higher value, it is possible that the readout layer is an in-plane magnetization film at room temperature and raised temperatures and shifts into a perpendicular magnetization film only at the intermediate temperature even when the readout layer is layered along with the perpendicular magnetization layer.

Masking may be achieved at the highest-temperature point or region by disappearance of magnetization in the readout layer thereat. However, signal level in readout might be slightly reduced because Curie temperature Tc of the readout layer needs to be lower than Curie temperature Tc of the recording layer.

Figure 17:
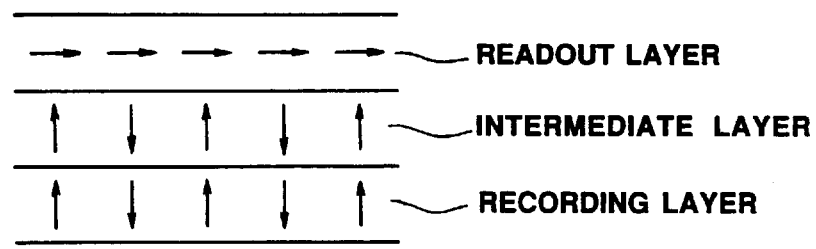
FIG. 17 is a schematic view illustrating another magnetized situation of the magnetooptical recording medium of the third embodiment.

The following is an example of an improved magnetooptical recording medium of the third embodiment, which contains an intermediate layer between a readout layer and a recording layer as shown in FIG. 17.

The intermediate layer is interposed between the readout layer and the recording layer. Curie temperature of the intermediate layer is higher than room temperature and lower than Curie temperatures of the readout and recording layers. Material for the intermediate layer may be rare-earth and iron group amorphous alloy, such as TbFe, GdFe, TbFeCo and GdFeCo, or such alloy into which non-magnetic elements such as Al, Cu and Cr are added.

Figure 21:
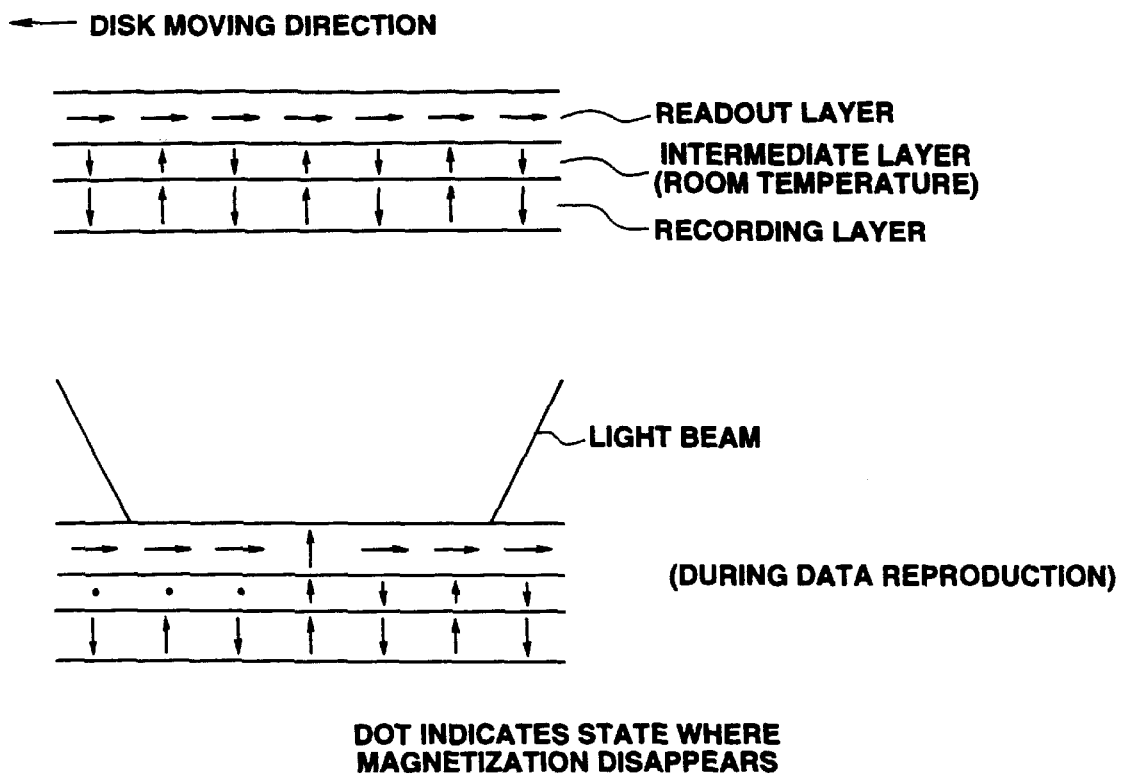
FIG. 21 is a schematic view illustrating a method of reproducing information by using the magnetooptical recording medium shown in FIG. 17.
Figure 22:
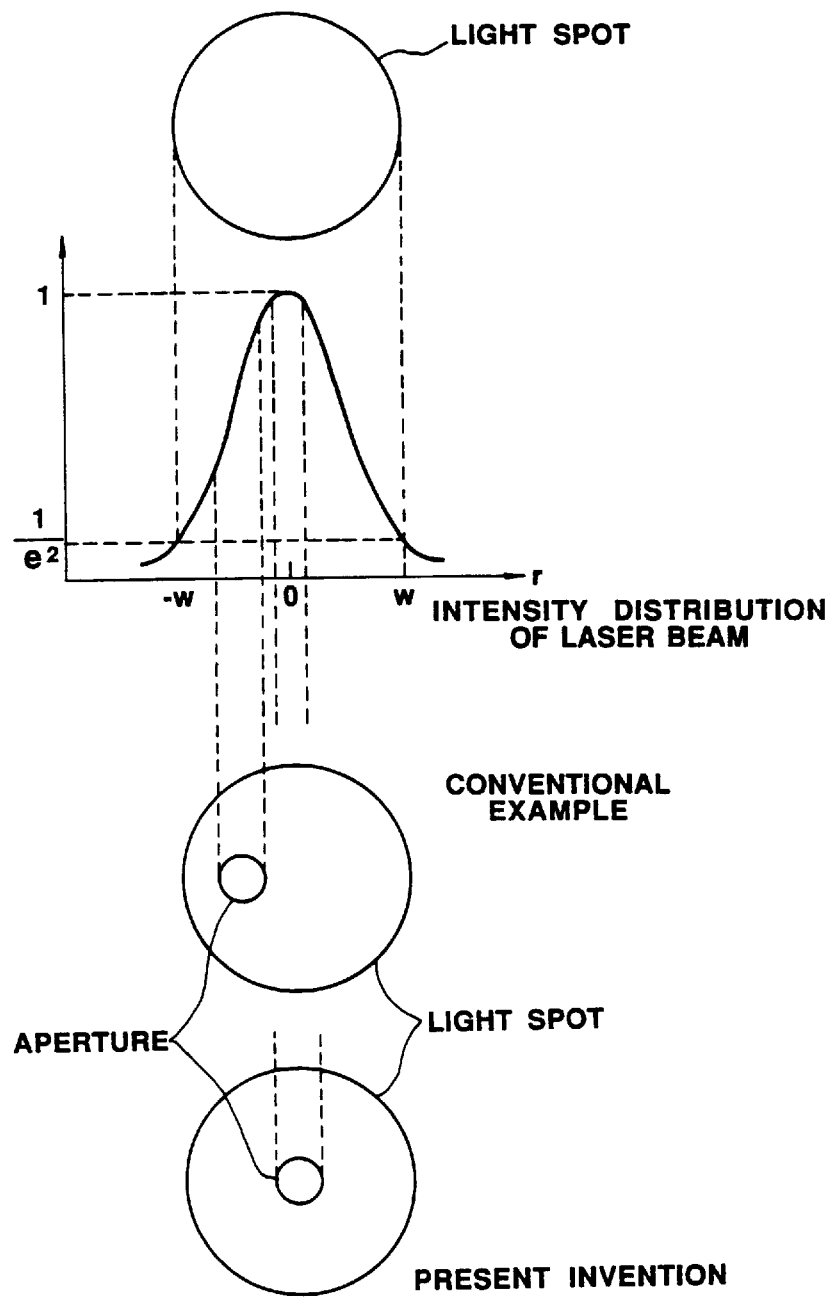
FIG. 22 is a schematic view illustrating the relation between the beam intensity of a light spot and detection region within the light spot.

Refering now to FIG. 21, in a portion where temperature increases due to projection of a readout laser beam, the readout layer is changed from an in-plane magnetization film to a perpendicular magnetization film, similar to the example of the recording medium mentioned above. The intermediate layer can function as a mediator of exchange coupling force from the recording layer to the readout layer, until its Curie temperature is reached, and information in the recording layer is transferred to the readout layer.

However, the exchange coupling between the layers is interrupted in the high-temperature portion of the intermediate layer where its Curie temperature is reached. In this portion, perpendicular magnetic anisotropy constant of the readout layer rapidly decreases in appearance due to such ceasing of exchange coupling force from the recording layer. Therefore, the magnetization direction of the readout layer becomes an in-plane direction again (see FIG. 21).

In such a case where the intermediate layer is formed, which has low Curie temperature, the readout layer can be an in-plane magnetization film at room temperature and raised temperatures and be a perpendicular magnetization film at intermediate temperature therebetween in its layered structure together with the intermediate and recording layers, though the readout layer has no characteristic that the layer structure in its single layer state returns to an in-plane magnetization film at raised temperatures. Thus, the recording medium comprising the intermediate layer is advantageous in that material can be selected from a wider range.

Thus, in the information reproducing method using the magnetooptical recording medium of the third embodiment, since a reproducable portion within the laser beam spot is located in a narrow zone between a high-temperature portion and a low-temperature portion, it is possible to reproduce information with high resolution even if the information is recorded in higher density.

This reproducing method can provide still better C/N ratio because the detecting region is placed in a center of the laser beam spot. The reason therefor is explained hereinafter.

Intesity distribution of the laser beam is of a Gaussian type and the intensity at a center of the laser spot is highest. Thus, the closer to the center of the spot a position, where information is reproduced, is, the better the C/N ratio becomes. Generally, the center of the spot is coincident with the center of temperature distribution of the medium when the recording medium moves. The highest temperature point shifts toward the moving direction of the medium. Therefore, when the highest-temperature point is selected as a detecting area, the detecting area will be deviated from the center of the spot (see FIG. 20).

The third embodiment of the present invention is described in more detail by using the following experimental examples. The experimental examples are illustrative and not restrictive.

Twenty First Experimental Example

Targets of Si, Tb, Gd, Fe, Co and Al are installed in a DC magnetron sputtering equipment, and a glass substrate is held on a holder. Thereafter, air is vacuum-exhausted from a chamber to establish a high vacuum level of less than $1 \times 10^{-5}$ Pa by using a cryosorption pump.

Figure 18:
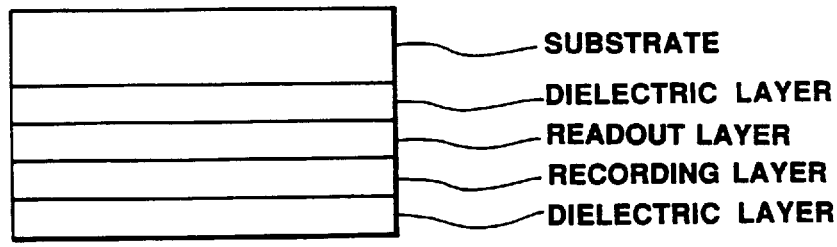
FIG. 18A is a schematic view showing the layer structure of the magnetooptical recording medium of the third embodiment shown in FIG. 16.
FIG. 18B is a schematic view showing the layer structure of the magnetooptical recording medium shown in FIG. 17.
Figure 18:
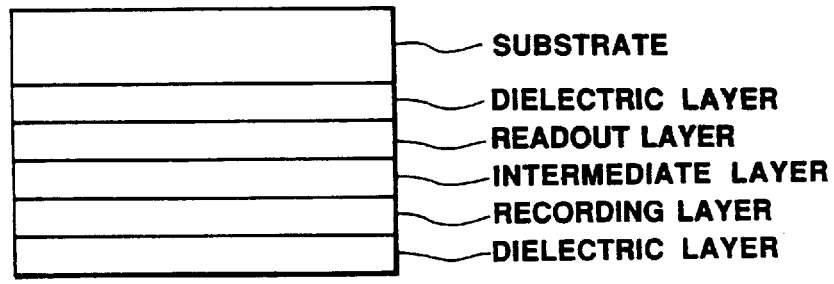

Ar gas is introduced into the chamber while vacuum-exhausting air, until the level of 0.3 Pa of Ar gas is reached. Then, a SiN layer, which functions as an interference film, is deposited to a thickness of 700 Å on the surface of the substrate. A GdFeCo layer (thickness: 400 Å) is deposited as a readout layer, and a TbFeCo layer (thickness: 400 Å) is deposited as a recording layer. Then, another SiN layer (thickness: 800 Å), which functions as a protective film, is deposited. Thus, the layer structure as shown in FIG. 18A is obtained.

When the SiN layer is formed, $N_2$ gas is introduced in addition to the Ar gas and the deposition is performed by DC reactive sputtering. The GdFeCo and TbFeCo layers are formed with applying DC powers to the targets of Gd, Fe, Co and Tb, respectively.

The composition of the GdFeCo layer is adjusted so that its compensation and Curie temperatures are respectively 270° C. and over 400° C. The composition of the TbFeCo layer is adjusted so that its compensation and Curie temperatures are respectively less than room temperature and 230° C.

Figure 25:
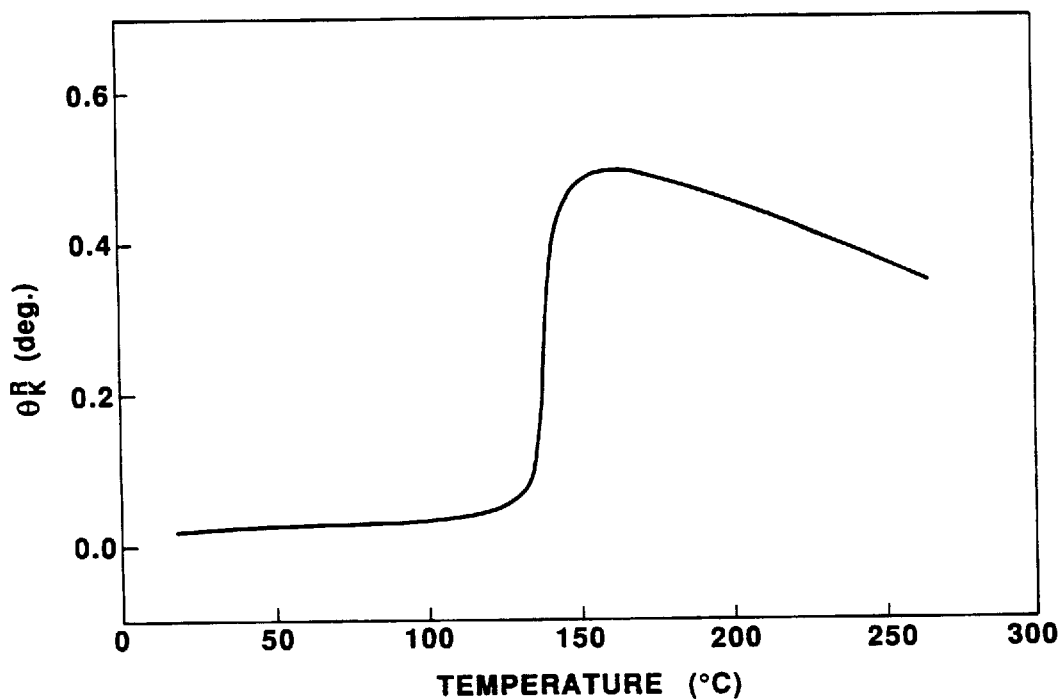
FIG. 25 is a graph illustrating an example of the temperature dependency of a residual $\theta_k$ (when a magnetic field=0) of a magnetooptical recording medium of a comparative experimental example.

It has been found that Kerr effect (residual Kerr rotation angle), when no magnetic field is applied, appeares only in a range from 130° C. to 180° C. and a perpendicular magnetization film is established as shown in FIG. 25, by measuring the residual $\theta_K$ at the time of magnetic field=zero as the temperature of the layered films is raised.

Twenty Second Experimental Example

The following is the description concerning the 22th experimental example. A magnetooptical recording medium is fabricated, which has the same layer structure as the 21th experimental example. Conditions of the 22th experimental example are the same as the 21th one except that a polycarbonate substrate having a diameter of 130 mm with pregrooves is installed .

Result of measurement of recording-reproducing characteristics of the magnetooptical recording medium is as follows. A measuring instrument comprises an objective lens of 0.55 N.A. and a projector for outputting a laser beam of 780 nm wavelength. Power for recording is preset at 8 mW and linear velocity is 9 m/sec. Then, 6–15 MHz carrier signal is recorded in the recording layer with intervals of 1 MHz by using a field modulation system. The record-frequency dependency of C/N ratio is measured. The reproducing power is set so that C/N ratio is maximized. The applied field is ±150 Oe. The result is shown in Table 3.

Twenty Third Experimental Example

Targets of Si, Tb, Gd, Fe, Co and Al are installed in a DC magnetron sputtering equipment, and a polycarbonate resin substrate with pregrooves is held on a holder. Thereafter, air is vacuum-exhausted from a chamber to establish a high vacuum level of less than $1\times10^{-5}$ Pa by using a cryosorption pump.

Ar gas is introduced into the chamber while vacuum-exhausting air, until the level of 0.3 Pa of Ar gas is reached. Then, a SiN layer, which functions as an interference film, is deposited to a thickness of 830 Å on the surface of the substrate. A GdFeCo layer (thickness: 400 Å) is deposited as a readout layer, a TbFeCoAl layer (thickness: 100 Å) is deposited as an intermediate layer and a TbFeCo layer (thickness: 300 Å) is deposited as a recording layer. Then, another SiN layer as a protective film (thickness: 700 Å) is deposited. Thus, a magnetooptical recording medium of the present invention as shown in FIG. 18B is fabricated.

When the SiN layer is formed, $N_2$ gas is introduced in addition to the Ar gas and the deposition is performed by DC reactive sputtering. The GdFeCo and TbFeCo layers are formed by applying DC powers to targets of Gd, Fe, Co and Tb, respectively, and utilizing spontaneous sputtering. The compositions of those layers are controlled by adjusting the DC powers applied to the respective targets.

The composition of the GdFeCo readout layer is set so that its compensation and Curie temperatures are respectively 250° C. and over 310° C. The composition of the TbFeCoAl intermediate layer is adjusted so that its Curie temperature is 150° C. The composition of the TbFeCo recording layer is adjusted so that its Curie temperature is 210° C.

Result of measurement of recording-reproducing characteristics of the magnetooptical recording medium is as follows. A measuring instrument comprises an objective lens of 0.55 N.A. and a projector for outputting a laser beam of 780 nm wavelength. Power for recording is preset at 8.2 mW and linear velocity is 9 m/sec. Then, 6–15 MHz carrier signal is recorded in the recording layer with intervals of 1 MHz by using a field modulation system (record magnetic field: ±200 Oe). The record-frequency dependency of C/N ratio is measured. The result is shown in Table 3.

24th to 29th Experimental Examples.

Similarly, 24th to 29th experimental examples are shown in Table 3.

Third Comparative Experimental Example.

Conditions of the third comparative experimental example of a magnetooptical recording medium are the same as the 21th experimental example, except that compensation and Curie temperatures of the readout layer are respectively 280° C. and 300° C. The layered layers has the temperature dependency of residual $\theta_K$ as shown in FIG. 25. Then, the deposition is performed on the polycarbonate substrate, similar to the 22th experimental example. After the magnetooptical recording medium is thus fabricated, the record-frequency dependency of C/N ratio has similarly been inspected. The result is shown in Table 3.

TABLE 3

|  | readout layer | | intermediate layer | | recording layer | | C/N (dB) | | |
| --- | --- | --- | --- | --- | --- | --- | --- | --- | --- |
|  |  | thick. |  | thick. |  | thick. | mark length | | |
|  | comp. | (Å) | comp. | (Å) | comp. | (Å) | 0.3 μm | 0.4 μm | 0.5 μm |
| example 21, 22 | GdFeCo | 400 | non |  | TbFeCo | 400 | 33 | 43 | 46 |
| example 23 | GdFeCo | 400 | TbFeCoAl | 100 | TbFeCo | 300 | 32 | 41 | 44 |
| example 24 | GdFeCo | 350 | non |  | TbFeCo | 370 | 30 | 42 | 45 |
| example 25 | GdTbCo | 300 | non |  | TbFeCo | 400 | 30 | 41 | 44 |
| example 26 | GdFeCo | 400 | non |  | DyFeCo | 380 | 32 | 40 | 44 |
| example 27 | NdGdFeCo | 370 | non |  | TbFeCo | 400 | 30 | 42 | 46 |
| example 28 | GdFeCo | 400 | TbFeCoCu | 50 | TbFeCo | 450 | 32 | 42 | 45 |
| example 29 | GdFeCo | 360 | GdFeCo | 80 | TbFeCo | 300 | 35 | 44 | 46 |
| com. ex. 3 | GdFeCo | 400 | non |  | TbFeCo | 400 | 24 | 37 | 42 |

FOURTH EMBODIMENT

A preferred fourth embodiment according to the present invention will be described hereinafter.

A magnetooptical recording medium of the fourth embodiment is composed of at least three layers: a first magnetic layer, a second magnetic layer (a readout layer) and a third magnetic layer (a recording layer where information is to be stored). The first magnetic layer is composed of an in-plane magnetization film. The second magnetic layer has Curie temperature higher than the first magnetic layer, remains an in-plane magnetization film at room temperature and shifts into a perpendicular magnetization film when the temperature is raised. The third magnetic layer is composed of a a perpendicular magnetization film.

Figure 26A:
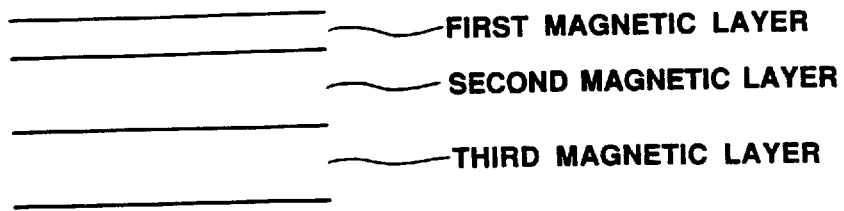
FIGS. 26A and 26B are schematic views showing the layer structures of magnetooptical recording media of a fourth embodiment.

The first, second and third magnetic layers are fabricated in the following manner, as shown in FIG. 26A.

The first layer is preferably composed of material which maintains a stable in-plane magnetic anisotropy until Curie temperature is reached, for example, rare-earth and iron group amorphous alloy, such as GdCo, GdFeCo, GdTbFeCo, GdDyFeCo and NdGdFeCo. Material, whose Curie temperature is in the vicinity of intermediate temperature at the time of reproduction, is preferable.

The second magnetic layer is preferably composed of rare earth and iron group amorphous alloy, such as GdCo, GdFeCo, GdTbFeCo, GdDyFeCo and NdGdFeCo, or such amorphous alloy to which non-magnetic element, such as Al, Si, Cu or the like, is added. Material, whose compensation temperature is between room temperature and Curie temperature, is preferable.

The third magnetic layer is preferably composed of material, which has a large perpendicular magnetic anisotropy and can stably maintain the magnetized state, for example, rare-earth and iron group amorphous alloy, such as TbFeCo, DyFeCo and TbDyFeCo; or garnet; or platinum group and iron group periodical structure layer, such as Pt/Co and Pd/Co; or platinum group and iron group alloy, such as PtCo and PdCo.

Further, elements for improving corrosion resistance, such as Cr, Ti, Pt and the like, may be added to those magnetic layers, respectively.

Dielectrics, such as SiN, $AlN_x$, $AlO_x$, $TaO_x$, $SiO_x$, at. el, may be formed in addition to those magnetic layers in order to improve interference effect. Material for improving thermal conductivity, such as Al, AlTi, AlCr, AlTa, Cu and the like, may be formed.

An intermediate layer for adjusting exchange coupling force or magnetostatic coupling force, or an auxiliary layer for assistance of recording or reproduction my be formed. A protecting coating, which is composed of the above-discussed dielectric or polymer resin, may be used as a protective film.

The following description deals with the principle of recording-reproducing process of the fourth embodiment. The first, second and third magnetic layers will hereinafter be referred to as auxiliary, readout and recording layers, respectively.

Figure 28:
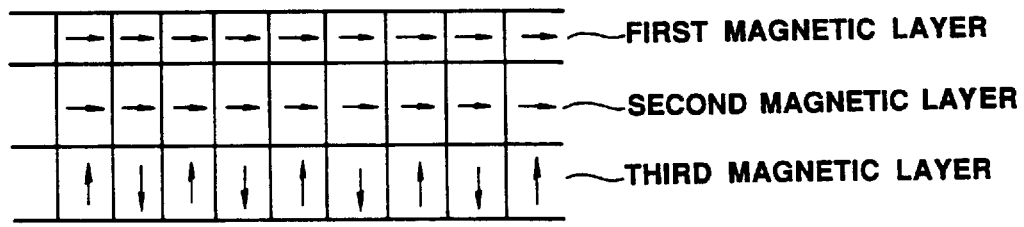
FIG. 28 is a schematic view illustrating the magnetized situation when information is recorded in an example of the magnetooptical recording medium of the fourth embodiment.

Referring to the FIG. 28, data signal is recorded in the recording layer of the magnetooptical recording medium of the fourth embodiment. One way of recording data signal in the recording layer is to modulate an external magnetic field while projecting a laser beam powerful enough to raise the temperature of the recording layer to over Curie temperature. Another way is to modulate a laser power while applying a magnetic field in a recording direction, after eliminating data. The other way is to modulate a laser power while applying an external magnetic field.

When the intensity of the laser beam is determined so that the temperature of a predetermined region within a beam spot is raised near to Curie temperature, considering the linear velocity of the recording medium, a record magnetic domain is formed which is less than the diameter of the laser beam spot. As a result, it is possible to record a signal having a periodicity less than the diffraction limit of light.

When reproducing the data signal, a readout laser beam is projected onto the recording medium. At this time, the temperature in the region, irradiated with the beam spot, rises. Since the medium moves at a constant speed, the temperature distribution on the recording medium has a shape extending along the moving direction of the recording medium. In this temperature distribution, a part of the irradiated portion within the beam spot is a high-temperature area.

As regards the direction of magnetization of a single magnetic thin film, it is known that a chief magnetization direction is determined by an effective perpendicular magnetic anisotropy constant $K\perp$ that is defined by the following equation:

$$K\perp = Ku - 2\pi Ms^2$$

where Ms is the saturation magnetization of a single magnetic thin film and Ku is a perpendicular magnetic anisotropy constant. The single magnetic thin film is a perpendicular magnetization film when $K\perp$ is positive, and an in-plane magnetization film when $K\perp$ is negative.

Figure 29:
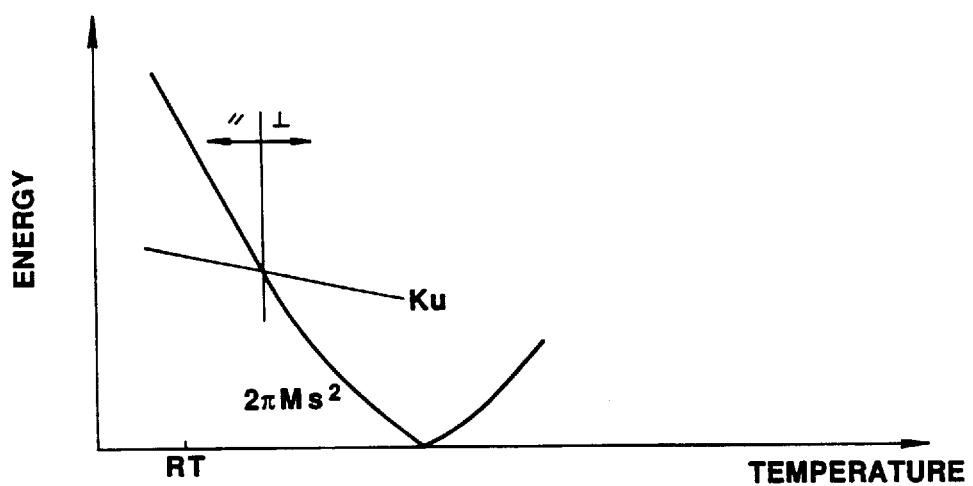
FIG. 29 is a graph illustrating temperature dependencies of demagnetizing field energy $2\pi Ms^2$ and perpendicular magnetic anisotropy energy Ku of a second magnetic layer of the magnetooptical recording medium of the fourth embodiment.

Here, $2\pi Ms^2$ is energy of demagnetizing field. Then, as shown in FIG. 29, at room temperature (RT), the following relation is satisfied:

$$Ku < 2\pi Ms^2, K\perp < 0,$$

Thus, the in-plane magnetization film is produced. On the other hand, temperature is raised during reproduction, and then the following relation is satisfied:

$$Ku > 2\pi Ms^2, K\perp > 0.$$

In other words, when the saturation magnetization of a single magnetic thin film Ms and perpendicular magnetic anisotropy constant Ku are preset so that the magnetic thin film is a perpendicular magetization film, only the highest-temperature point or region within the laser spot becomes a perpendicular magetization film to which magnetization in the recording layer can be transferred. Thus, high resolution can be achieved. In other words, information can be reproduced by detecting a reflective light of the laser beam, because the reflective light is influenced by magneto-optic effect of only a portion of the readout layer to which the magnetization has been transferred.

When the magnetic thin film and the perpendicular and in-plane magnetization films are layered directly or with an intermediate layer therebetween, Ku shifts in appearance since exchange coupling force, magnetostatic coupling force or the like acts from those films. However, if presetting the perpendicular magnetization temperature range of a single layer structure at a slightly higher or lower value, it is possible that the readout layer is an in-plane magnetization film at room temperature and shifts into a perpendicular magnetization film at raised temperatures even when the readout layer is layered along with other layers In the recording medium of the fourth embodiment, the auxiliary layer is also layered on the readout layer directly or with a intermediate layer being layered therebetween, in addition to the recording layer. The auxiliary layer remains an in-plane magnetization film in a range between room temperature and Curie temperature, and thus the magnetization direction of the readout layer is stably oriented in an in-plane direction due to exchange coupling force from the auxiliary layer, until the temperature of the recording medium reaches Curie temperature of the auxiliary layer.

Thus, if presetting Curie temperature of the auxiliary layer close to the transition temperature at which magnetization direction in the readout layer varies, the exchange coupling force from the auxiliary layer, which urges an in-plane magnetization orientation, will not act. Therefore, the detection region in the readout layer is easier to be oriented in a perpendicular magnetization direction.

Since the auxiliary layer is placed on the opposite side to the recording layer, that is, on the light incidence side, the auxiliary layer needs to have a thickness which is so thin that readout signal would not be degraded due to its light absorption and which is so thick that exchange coupling force to the readout layer would not be reduced. The thickness is preferably not more than 200 Å, more preferably not more than 100 Å, and most preferably not more than 60 Å. Further, the thickness is preferably not less than 20 Å.

The recording medium comprising the auxiliary layer can provide a clear boundary between an in-plane magnetization portion and a perpendicular magnetization portion in the readout layer, and improve C/N ratio. Moreover, since recorded information can be reproduced without any interference from adjacent bits in tracking and radial directions, it is possible to reproduce bits, recorded in higher linear recording density and higher track density, with good C/N ratio.

Further, this embodiment is described as a case of magnetic coupling due to exchange coupling interaction between the magnetic layers, but it is possible that the layers are magnetostatically coupled to each other.

Further, in order to conduct the transfer more clearly, an intermediate layer having different Curie temperature or the like may be formed.

The following is the description concerning experimental examples of the fourth embodiment.

30th Experimental Example

Targets of Si, Tb, Gd, Fe and Co are installed in a DC magnetron sputtering equipment, and a polycarbonate substrate is held on a holder. Thereafter, air is vacuum-exhausted from a chamber to establish a high vacuum level of less than $1 \times 10^{-6}$ Pa by using a cryosorption pump.

Figure 26B:
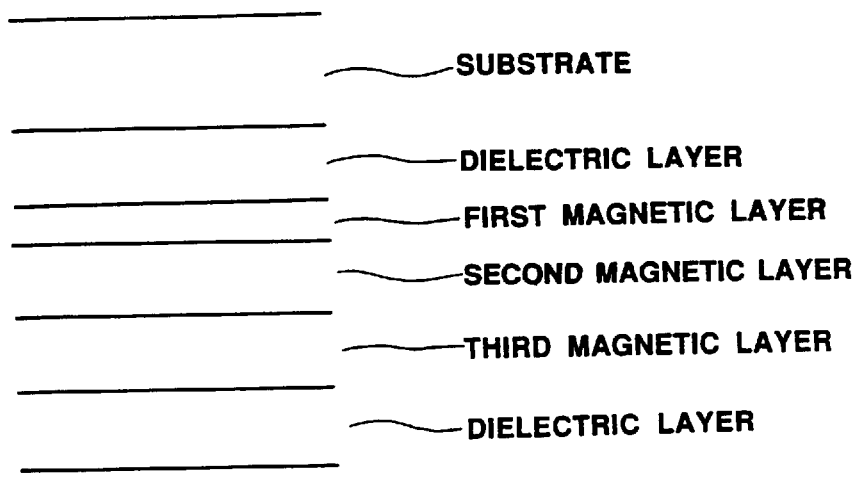
Figure 27:
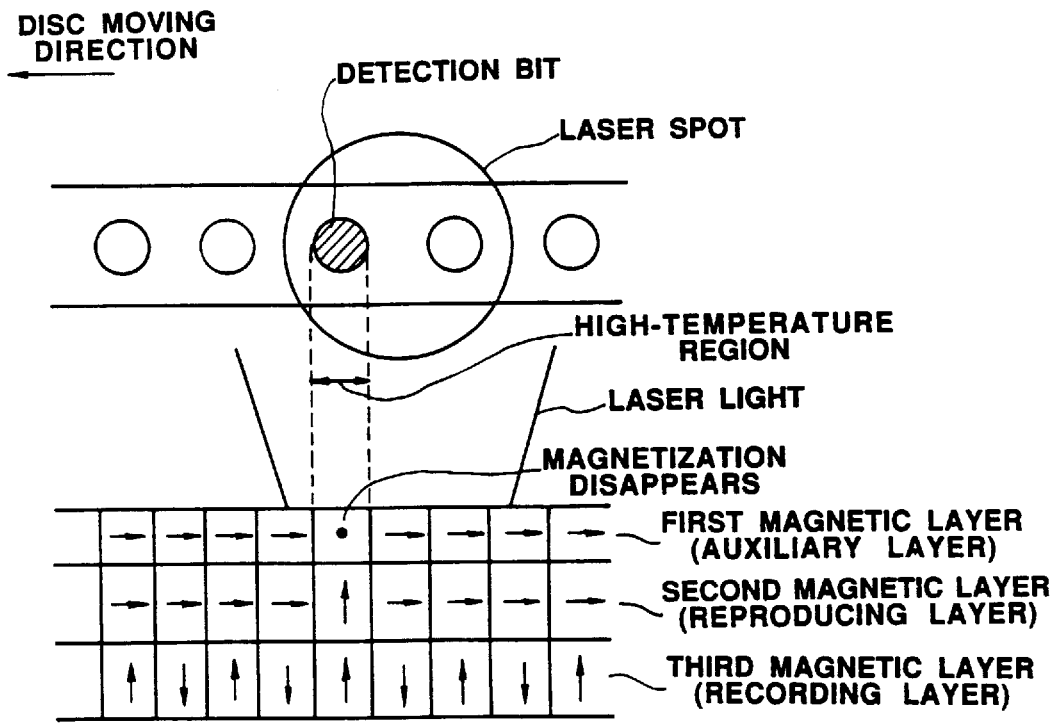
FIG. 27 is a schematic view illustrating a method of reproducing information by using the magnetooptical recording medium of the fourth embodiment.

Ar gas is introduced into the chamber while vacuum-exhausting air, until the level of 0.4 Pa of Ar gas is reached. Then, a SiN layer (an interference layer) is deposited to a thickness of 780 Å on the surface of the substrate. A GdCo layer (an auxiliary layer) is deposited, a GdFeCo layer (a recording layer) is deposited and a TbFeCo layer (a recording layer) is deposited. Then, another SiN layer (thickness: 700 Å) is deposited as a protective film. Thus, the layer structure as shown in FIG. 26B is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively. The compositions of those layers are controlled by adjusting DC powers applied to the respective targets.

The thickness of the GdCo auxiliary layer is 50 Å, and the composition thereof is set so that the layer is RE-rich from room temperature to Curie temperature.

The thickness of the GdFeCo readout layer is 400 Å, and the composition thereof is set so that its compensation and Curie temperatures are respectively 280° C. and over 350° C.

The thickness of the TbFeCo recording layer is 400 Å, and the composition thereof is set so that the layer is TM-rich at room temperature and its compensation and Curie temperatures are respectively less than room temperature and 220° C.

Figure 30A:
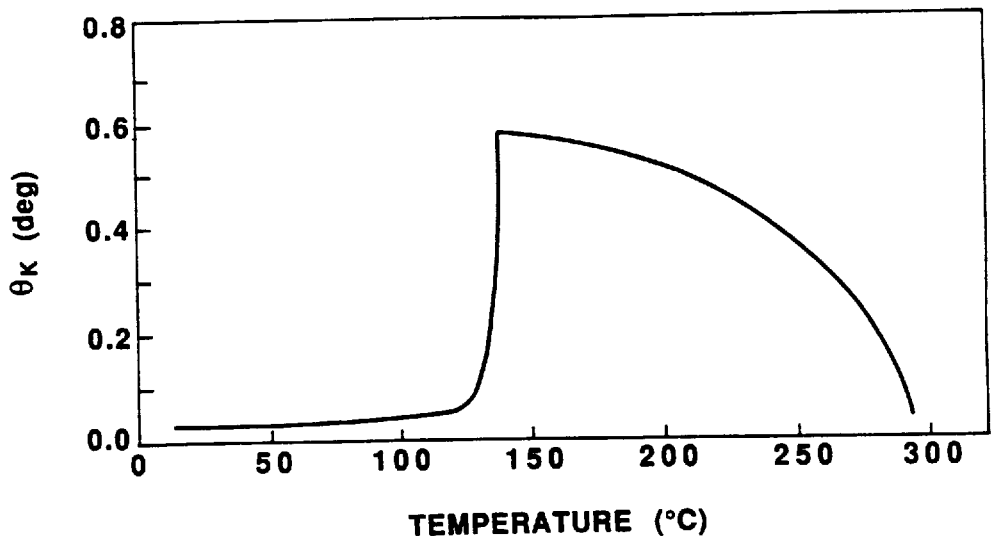
FIG. 30A is a graph illustrating the temperature dependency of a residual $\theta_k$ (when a magnetic field=0) of the magnetooptical recording medium of the fourth embodiment.

It has been found that Kerr effect appeares at about 140° C. and a perpendicular magnetization film is established as shown in FIG. 30A, by measuring the residual $\theta_k$ when magnetic field=zero with the temperature of the layered films being raised.

31th Experimental Example

Result of measurement of recording-reproducing characteristics of the magnetooptical recording medium, described in the 30th experimental example, is as follows. A measuring instrument comprises an objective of 0.55 N.A. and a projector for outputting a laser beam of 780 nm wavelength. Power for recording is preset at 8~10 mW and linear velocity is 9 m/sec (rotation speed: 2400 rpm and radius: 36 mm). Then, 5.8–15 MHz carrier signal is recorded in the recording layer by using a field modulation system (recording magnetic field: ±150 Oe). The record-frequency dependency of C/N ratio is measured. The readout power is set so that C/N ratio is maximized. The result is shown in Table 4.

TABLE 4

| | measurement result of C/N | | | | | | | |
|---|---|---|---|---|---|---|---|---|
| | auxiliary layer | | readout layer | | recording layer | | C/N (dB) | |
| | | thick. | | thick. | | thick. | mark length | |
| | comp. | (Å) | comp. | (Å) | comp. | (Å) | 0.3 μm | 0.4 μm | 0.5 μm |
| example 31 | GdFe | 50 | GdFeCo | 400 | TbFeCo | 400 | 33 | 43 | 46 |
| example 32 | GdCoAl | 30 | GdFeCo | 400 | TbFeCo | 300 | 30 | 42 | 45 |
| example 33 | GdCoSi | 40 | GdFeCo | 400 | DyFeCo | 400 | 32 | 40 | 44 |
| example 34 | GdFeCo | 40 | GdFeCo | 400 | TbFeCo | 400 | 32 | 42 | 45 |
| com. ex. 5 | — | | GdFeCo | 400 | TbFeCo | 400 | 24 | 37 | 42 |

32th Experimental Example

Thin films are deposited on a polycarbonate, similar to the experimental examples 30 and 31, and a magnetooptical recording medium is fabricated. The thus fabricated recording medium is evaluated under the same conditions.

A SiN layer (an interference layer) is deposited to a thickness of 780 Å on the surface of the substrate. A GdCo layer (an auxiliary layer) is deposited, a GdFeCo layer (a readout layer) is deposited and a TbFeCo layer (a recording layer) is deposited. Then, another SiN layer (thickness: 700 Å) is deposited as a protective film. Thus, the layer structure as shown in FIG. 26B is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively.

The thickness of the GdCoAl auxiliary layer is 30 Å, and the composition thereof is set so that the layer is RE-rich from room temperature to Curie temperature and the Curie temperature is approximately 130° C.

The thickness of the GdFeCo readout layer is 400 Å, and the composition thereof is set so that its compensation and Curie temperatures are respectively 270° C. and over 350° C.

The thickness of the TbFeCo recording layer is 300 Å, and the composition thereof is set so that the layer is TM-rich at room temperature and its compensation and Curie temperatures are respectively less than room temperature and 200° C.

The result of this experimental example is shown in Table 4.

33th Experimental Example

Thin films are deposited on a polycarbonate, similar to the experimental examples 30 and 31, and a magnetooptical recording medium is fabricated. The thus fabricated recording medium is evaluated under the same conditions.

A SiN layer (an interference layer) is deposited to the thickness of 780 Å on the surface of the substrate. A GdCo layer (an auxiliary layer) is deposited, a GdFeCo layer (a readout layer) is deposited and a DyFeCo layer (a recording layer) is deposited. Then, another SiN layer (thickness: 700 Å) is deposited as a protective film. Thus, the layer structure as shown in FIG. 26B is obtained.

When the SiN layer is formed, $N_2$ gas is introduced in addition to Ar gas and the deposition is performed by DC reactive sputtering of the Si target. The GdFeCo and TbFeCo layers are formed with applying DC powers to targets of Gd, Fe, Co and Tb, respectively.

The thickness of the GdCoSi auxiliary layer is 40 Å, and the composition thereof is set so that the layer is RE-rich from room temperature to Curie temperature and the Curie temperature is approximately 160° C.

The thickness of the GdFeCo readout layer is 400 Å, and the composition thereof is set so that its compensation and Curie temperatures are respectively 260° C. and over 350° C.

The thickness of the TbFeCo recording layer is 400 Å, and the composition thereof is set so that the layer is TM-rich at room temperature and its compensation and Curie temperatures are respectively less than room temperature and 200° C.

The result of this experimental example is shown in Table 4.

34th Experimental Example

Thin films are deposited on a polycarbonate, similar to the experimental examples 30 and 31, and a magnetooptical recording medium is fabricated. The thus fabricated recording medium is evaluated under the same conditions.

A SiN layer (an interference layer) is deposited to the thickness of 780 Å on the surface of the substrate. A GdFeCo layer (an auxiliary layer) is deposited, a GdFeCo layer (a readout layer) is deposited and a TbFeCo layer (a recording layer) is deposited. Then, another SiN layer (thickness: 700 Å) is deposited as a protective film. Thus, the layer structure as shown in FIG. 26B is obtained.

When the SiN layer is formed, $N_2$ gas is introduced in addition to Ar gas and the deposition is performed by DC reactive sputtering of the Si target. The GdFeCo and TbFeCo layers are formed with applying DC powers to targets of Gd, Fe, Co and Tb, respectively The thickness of the GdFeCo auxiliary layer is 40 Å, and the composition thereof is set so that the layer is RE-rich from room temperature to Curie temperature and the Curie temperature is approximately 160° C.

The thickness of the GdFeCo readout layer is 400 Å, and the composition thereof is set so that its compensation and Curie temperatures are respectively 220° C. and over 350° C.

The thickness of the TbFeCo recording layer is 400 Å, and the composition thereof is set so that the layer is TM-rich at room temperature and its compensation and Curie temperatures are respectively less than room temperature and 240° C.

The result of this experimental example is shown in Table 4.

Fourth Comparative Experimental Example

Thin films are deposited on a polycarbonate, similar to the experimental example 30, except that the auxiliary layer is removed, and a magnetooptical recording medium is fabricated. The thus fabricated recording medium is evaluated under the same conditions.

Figure 30B:
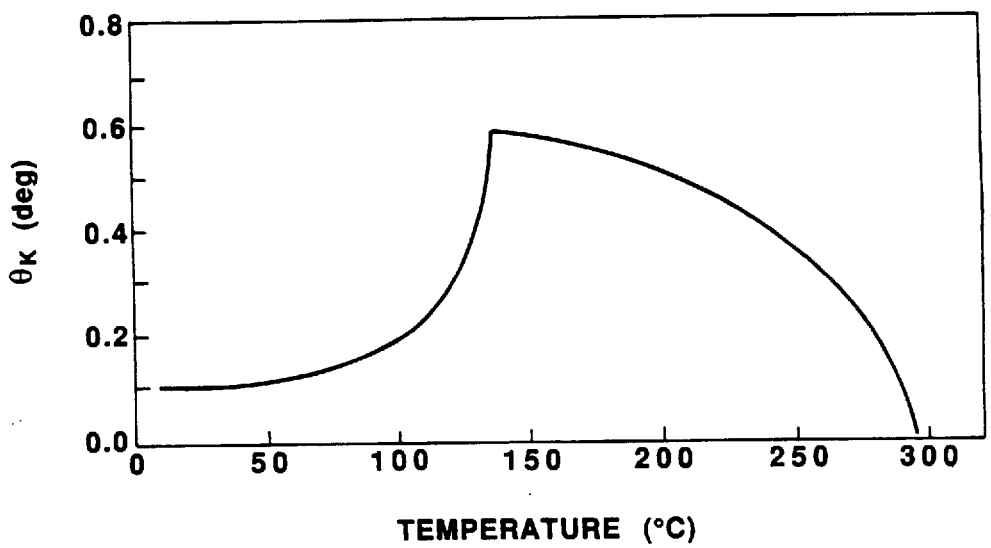
FIG. 30B is a graph illustrating the temperature dependency of a residual $\theta_k$ (when a magnetic field=0) of a magnetooptical recording medium of a comparative example.

The result is shown in FIG. 30B. It is known therefrom that $\theta_k$ at room temperature is reduced and the rise of $\theta_k$ during the increase of temperature is steep in the present invention, compared to the comparative example. Thus, it can be seen that super-resolution detecting effect is improved.

Fifth Comparative Experimental Example

Recording-reproducing characteristics are measured, similar to the comparative experimental example 4, by using the optomagnetic recording medium described in the comparative experimental example 4. The result is shown in Table 4.

FIFTH EMBODIMENT

A preferred fifth embodiment according to the present invention will be described hereinafter.

Figure 31:
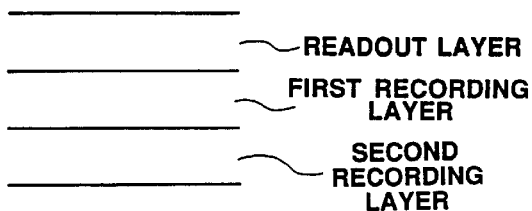
FIGS. 31A–31D are conceptual views showing layer structures of magnetooptical recording media of a fifth embodiment.
Figure 31:
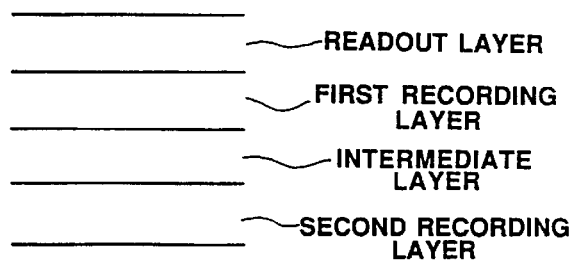
Figure 31:
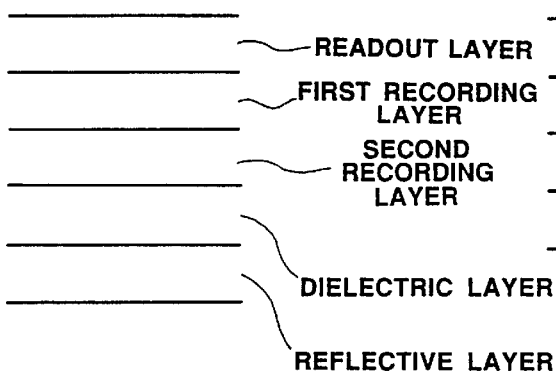
Figure 31:
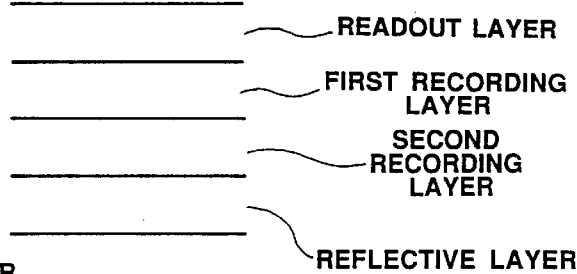

A magnetooptical recording medium of the fifth embodiment is mainly composed of a recording layer having a two-film structure and a readout layer formed on the recording layer directly or with an intermediate layer therebetween (see FIG. 31A). The recording layer, where information is to be stored, consists of second and third magnetic layers in each of which directions of sublattice magnetic moments are opposite to each other and which are respectively perpendicular magnetization films. The readout layer consists of a first magnetic layer which is an in-plane magnetization film at room temperature and shifts into a perpendicular magnetization film at raised temperatures.

With respect to the magnetization transfer process from recording layer to readout layer appearing in the recording medium, the following fact has been found by the Applicants.

In the magnetooptical recording medium having the above-discussed structure, Kerr rotation angle of the recording layer is zero in appearance. Therefore, when super-resolution, in which a plurality of recorded bits within a laser spot are independently recognized, is performed, magnetization out of the detection region of the recording layer would not be detected even if the laser light passes through the readout layer in the masked area. As a result, the total thickness of the medium can be thinned, and a reflection-layer structure can be adopted, thereby furthering the improvement of C/N due to enhancement effect. Further, such a structure is also advantageous in productivity.

The readout layer is preferably composed of, for example, rare-earth and iron group amorphous alloy, such as GdCo, GdFeCo, GdTbFeCo, GdDyFeCo and NdGdFeCo. Material having a small magnetic anisotropy or material whose compensation temperature is between room temperature and Curie temperature is preferable.

The recording layer is preferably composed of material which has a large perpendicular magnetic anisotropy and stably maintains the magnetized state, for example, rare earth and iron group amorphous alloy, such as TbFeCo, DyFeCo and TbDyFeCo; or garnet; or platinum group and iron group periodical structure layer, such as Pt/Co and Pd/Co; or platinum group and iron group alloy, such as PtCo and PdCo.

Further, elements for improving corrosion resistance, such as Cr, Al, Ti, Pt, Nb or the like, may be added to the readout and recording layers, respectively.

Dielectrics, such as $SiN_x$, $AlN_x$, $AlO_x$, $TaO_x$, $SiO_x$, at. el, may be formed in addition to the readout and recording layers in order to improve interference effect. Moreover, a reflective layer (see FIGS. 31C and 31D), or material for improving thermal conductivity, such as Al, AlTi, AlCr, AlTa, Cu and the like, may be formed.

An intermediate layer for adjusting exchange coupling force or magnetostatic coupling force (see FIG. 30B), or an auxiliary layer for assistance of recording or reproduction my be formed. A protecting coating, which is composed of the above-discussed dielectric or polymer resin, may be used as a protective film.

The structure of the recording layer will be described in more detail. The following is directed to a recording layer composed of ferrimagnetic rare-earth (RE) and iron group transition-metal (TM) alloy. When, for example, rare-earth element is dominant (RE rich) in the following description, this wording means that the sublattice magnetic moment of rare-earth element is larger than the sublattice magnetic moment of iron group transition-metal element.

In the following description, one of layers of the two-layer recording layer is referred to as a first recording layer and the other is referred to as a second layer.

When the first and second recording layers respectively have ferrimagnetism, the recording medium, in which element of dominant magnetization in the first and second recording layers is rare-earth element or iron group element, is called P-type, and the recording medium, in which element of dominant magnetization in the first recording layer is rare-earth element and that in the second recording layer is iron group element, or the recording medium of inverted type, is called A-type.

An intermediate layer may be formed for adjusting or collapsing exchange-coupling between first and second recording layers.

(1) A Type

The recording layer is composed of a magnetic layer (a first recording layer) in which rare-earth element is dominant at room temperature and which does not have compensation temperature between room temperature and Curie temperature, and a magnetic layer (a second recording layer) in which iron group transition metal is dominant at room temperature (i.e., which does not have compensation temperature between room temperature and Curie temperature).

(1) P Type

The recording layer is composed of a magnetic layer (a first recording layer) in which rare-earth element is dominant at room temperature and which has compensation temperature between room temperature and Curie temperature, and a magnetic layer (a second recording layer) in which rare-earth element metal is dominant at room temperature and which does not have compensation temperature between room temperature and Curie temperature.

In both of the cases (1) and (2), Curie temperatures (Tc) of the first and second recording layers do not need to be equal to each other, but it is desirable they are approximately equal. Further, in both of the cases (1) and (2), the first and second recording layers are interchangeable with each other.

Recording method of the fifth embodiment of the present invention will be described.

Figure 34A:
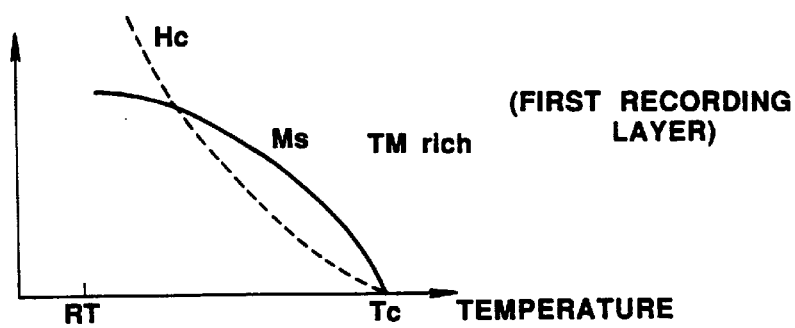
FIG. 34A is a graph illustrating the temperature dependencies of Ms and Hc of a first recording layer of two recording layers in an A type where neither the two recording layers have compensation temperature between room temperature and Curie temperature.
Figure 34B:
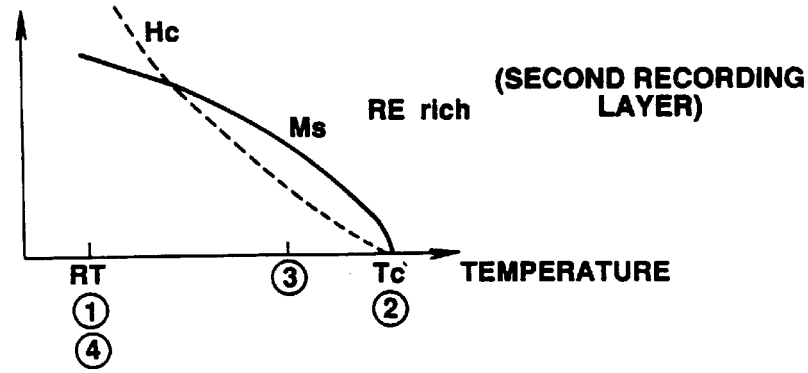
FIG. 34B is a graph illustrating the temperature depedencies of Ms and Hc of a second recording layer of the two recording layers.
Figure 34C:
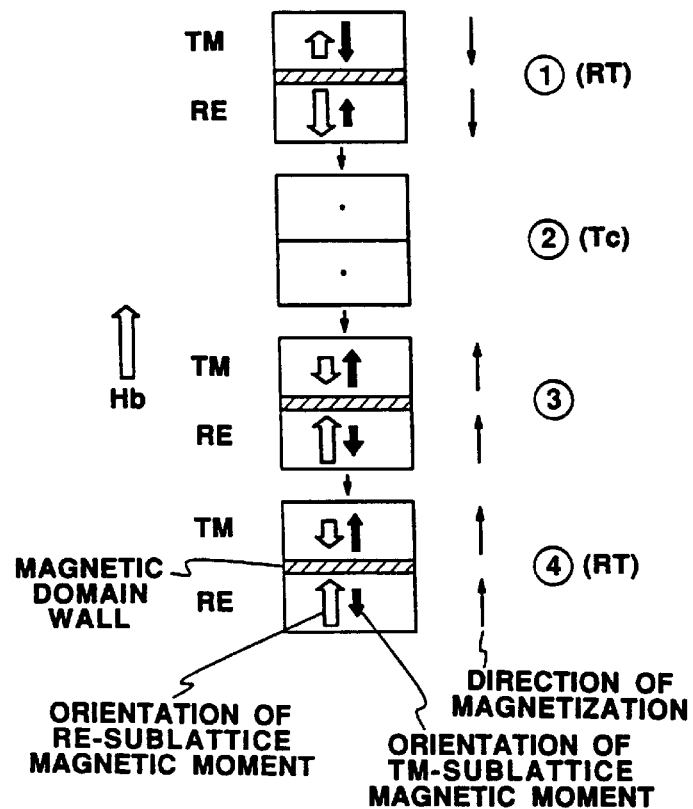
FIG. 34C is a schematic view illustrating a temperature-dependent change in the magnetized situation.

(1) Case of A Type (see FIG. 34)

The layers are partially heated from the state at room temperature, in which sublattice magnetic moments are opposite to each other (①), near to Curie temperature (②), by irradiation with a light spot. Then, an external magnetic field Hb is applied (or is being applied from the beginning), and magnetizations of the two layers are inverted (③). Thereafter, the layers are cooled to room temperature, so that the two layers are stabilized in respective states in which sublattice magnetic moments are inverted, compared to the state of ① (④).

At this time, it is necessary that the exchange coupling force is not greater than the magnetization inverting field (coercive force) so that the magnetic moment would not be re-inverted during the transition process from ③ to ④.

Figure 35A:
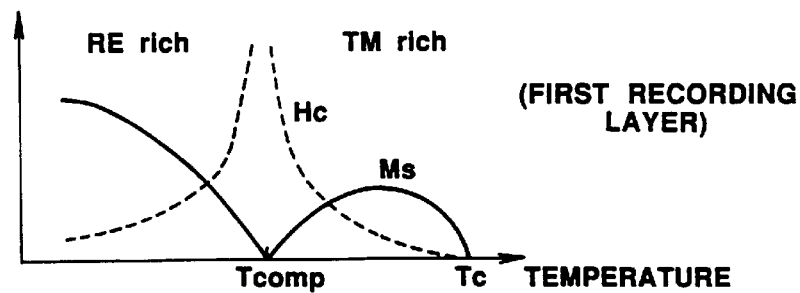
FIG. 35A is a graph illustrating the temperature dependencies of Ms and Hc of a first recording layer of two recording layers in a P type where only the first recording layer has compensation temperature between room temperature and Curie temperature.
Figure 35B:
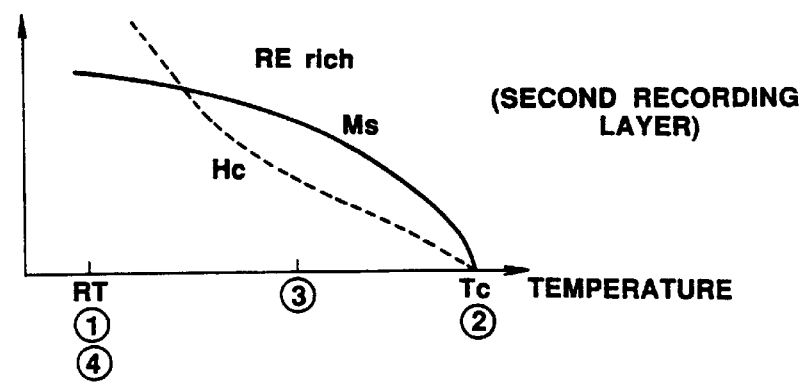
FIG. 35B is a graph illustrating the temperature depedencies of Ms and Hc of a second recording layer of the two recording layers.
Figure 35C:
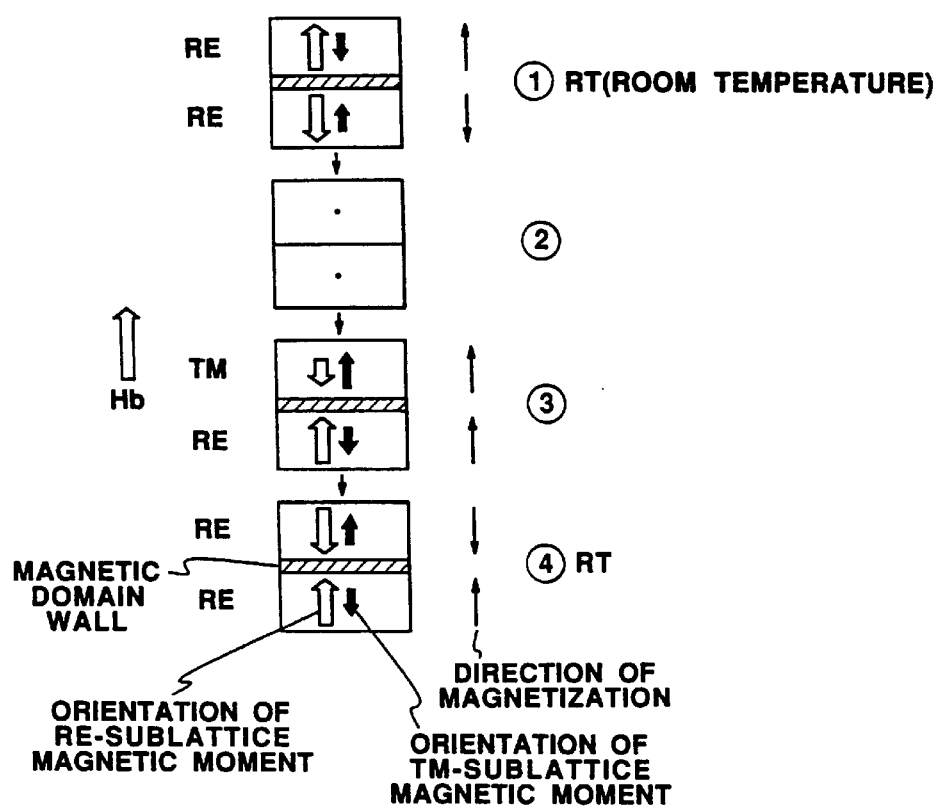
FIG. 35C is a schematic view illustrating a temperature-dependent change in the magnetized situation.

(2) Case of P Type (see FIG. 35)

The layers are partially heated from the state at room temperature, in which sublattice magnetic moments are opposite to each other (①), closely to Curie temperature (②). Then, an external magnetic field is applied (or is being applied from the beginning), and magnetizations of the two layers are inverted (③). Thereafter, the layers are cooled to room temperature, during which temperature passes compensation temperature, so that the two layers are stabilized in respective states in which sublattice magnetic moments are inverted, compared to the state of ①, and directions of total magnetizations are anti-parallel to each other (④).

At this time, it is necessary that the exchange coupling force is not greater than the magnetization inverting field (coercive force) so that the magnetic moment would not be re-inverted during the transition process from ③ to ④.

In the above recording methods of (1) and (2), when the intensity of the laser beam is set so that only the temperature of a predetermined region within a beam spot is raised close to Curie temperature, considering the linear velocity of the recording medium, a record magnetic domain, which is less than the diameter of the laser beam spot, can be formed. As a result, it is possible to record a signal having a periodicity less than the diffraction limit of light.

Characteristics of the recording layer will be described.

Between the first and second recording layers, sublattice magnetic moments are oriented opposite to each other. Therefore, the polarization plane of an incident light during data reproduction is rotated in a direction in the first recording layer and then rotated in an opposite direction in the next recording layer.

As a result, under particular conditions, the rotation angle in polarization plane of a reflective light becomes equal to the rotation angle in polarization plane of the incident light on the recording layer, and the light returns to a detector. Thus, Kerr rotation angle is not influenced by those recording layers.

Reproducing method of the fifth embodiment of the present invention will be described.

Figure 33:
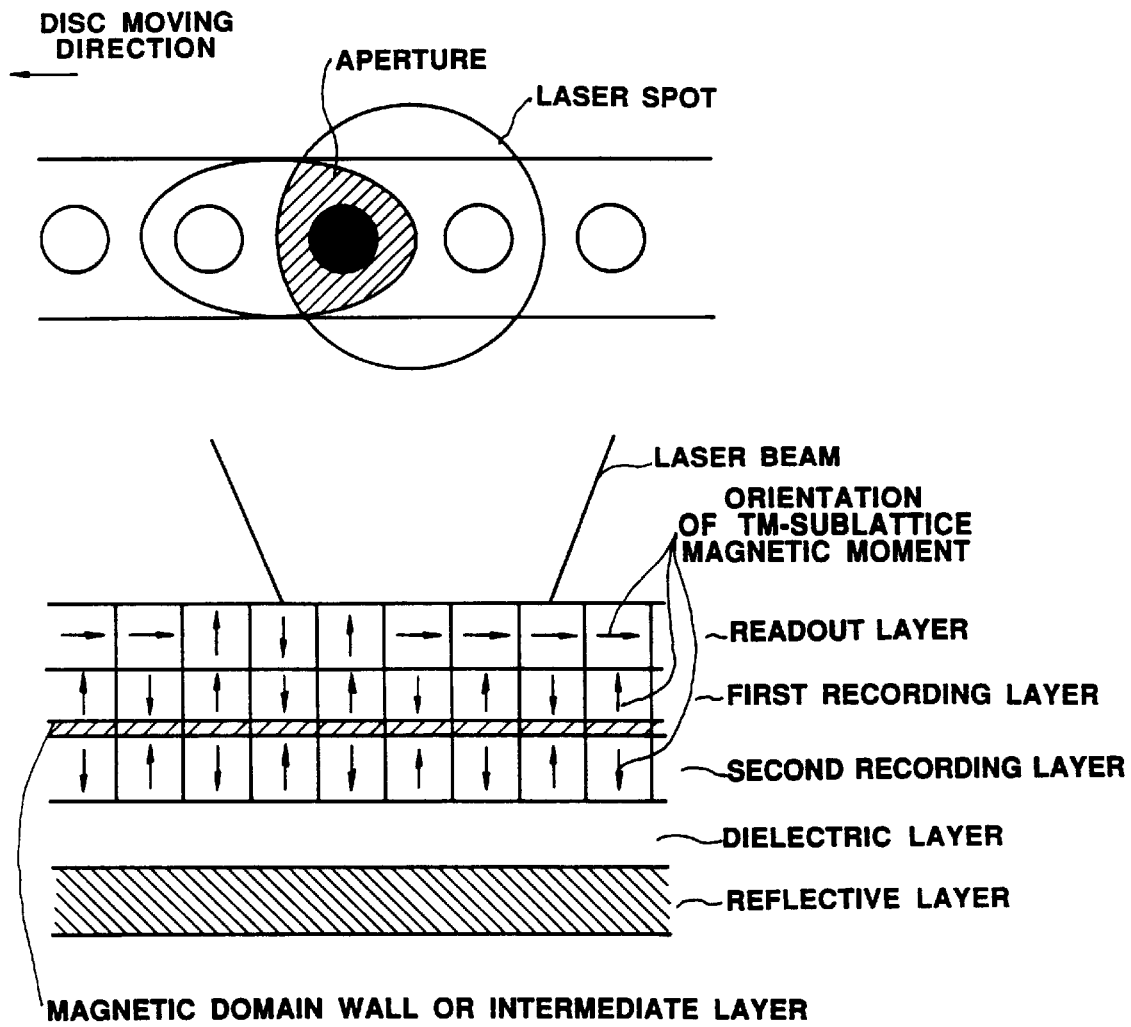
FIG. 33 is a schematic view illustrating a method of reproducing information by using the magnetooptical recording medium of the fifth embodiment.

As shown in FIG. 33, when a light spot is illuminated from the readout layer side during data reproduction, only a high-temperature portion of the readout layer within the light spot is changed into a perpendicular magnetization film. This is made possible by adjusting saturation magnetization Ms and perpendicular magnetization anisotropy Ku of the readout layer, considering the intensity of laser light during information reproduction. In this case, exchange coupling force acts from the recording layer on that portion of the readout layer where perpendicular magnetization film appears, and the direction of magnetization in that portion of the readout layer is aligned to a stable direction relative to a direction of magnetization based on data recorded in the recording layer.

Since a portion other than the high-temperature portion of the readout layer remains an in-plane magnetization film, the reflective light of light spot from the medium is subjected to magneto-optic effect of only the perpendicular magnetization film portion of the readout layer. Thus, polarization plane of the reflective light is changed according to the direction of magnetization. Therefore, information is reproduced by detecting the change in polarization plane of the reflective light.

The polarization plane of the reflective light is not greatly influenced by the portion of in-plane magnetization film. Since Kerr rotation angle is as a whole cancelled in the recording layer, light which is transmitted through the readout layer and reflected by the recording layer, or light which further passes through the recording layer and is reflected by the reflective layer, is sujected only to the rotation of polarization plane caused by the magneto-optical effect of the readout layer. Therefore, even if the incident light passes through the readout layer because of insufficient masking, magnetization in the recording layer would not be detected. Further, enhancement structure can be obtained by forming a reflective layer.

The fifth embodiment of the present invention is described in more detail by using the following experimental examples. The experimental examples are illustrative and not restrictive.

35th Experimental Example

Targets of Si, Tb, Gd, Fe, Co and Al are installed in a DC magnetron sputtering equipment, and a polycarbonate substrate with pregrooves is held on a holder. Thereafter, air is vacuum-exhausted from a chamber to establish a high vacuum level of less than $1 \times 10^{-5}$ Pa by using a cryosorption pump.

Ar gas is introduced into the chamber while vacuum-exhausting air, until the level of 0.4 Pa of Ar gas is reached. Then, a SiN layer (an interference layer) is deposited to a thickness of 850 Å onto the surface of the substrate. A GdFeCo layer (a readout layer) is deposited to a thickness of 400 Å, a TbFeCo layer (a first recording layer) is deposited to a thickness of 200 Å and a TbFeCo layer (a second recording layer) is deposited to a thickness of 200 Å. Then, another SiN layer (thickness: 700 Å) is deposited as a protective film. Thus, the layer structure as shown in FIG. 32A is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively.

The composition of the GdFeCo readout layer is set so that its compensation and Curie temperatures are respectively 280° C. and over 400° C.

The composition of the TbFeCo first recording layer is set so that the layer is RE rich at room temperature, there is no compensation temperature, Curie temperature is 220° C. and saturation magnetization at room temperature is approximately 100 emu/cc.

The composition of the TbFeCo second recording layer is set so that the layer is TM-rich at room temperature (compensation temperature is less than room temperature), Curie temperature is 220° C. and saturation magnetization at room temperature is approximately 100 emu/cc.

Result of measurement of recording-reproducing characteristics of the magnetooptical recording medium described in the twentieth experimental example is as follows.

A measuring instrument comprises an objective of 0.55 N.A. and a projector for outputting a laser beam of 780 nm wavelength. Power for recording is preset at 7~9 mW and linear velocity is 9 m/sec (rotation speed: 2400 rpm and radius: 36 mm). Then, 5.8–15 MHz carrier signal is recorded in the recording layer by using a field modulation system (recording magnetic field: ±150 Oe). The record-frequency dependency of C/N ratio is measured. The readout power is set so that C/N ratio is maximized (1.5~3 mW). The result is shown in Table 5.

36th Experimental Example

Thin films are deposited on a polycarbonate, similar to the experimental examples 35, and a magnetooptical recording medium having the following structure, thickness and composition is fabricated. The thus fabricated recording medium is evaluated under the same conditions.

A SiN layer (an interference layer) is deposited to a thickness of 820 Å on the surface of the substrate. A GdFeCo layer (a readout layer) is deposited to a thickness of 100 Å, a TbFeCo layer (a first recording layer) is deposited to a thickness of 68 Å and a TbFeCo layer (a second recording layer) is deposited to a thickness of 100 Å. Then, another SiN layer (thickness: 300 Å) is deposited as a protective film and an Al layer (thickness: 600 Å) is deposited as a reflective film. Thus, the layer structure as shown in FIG. 32B is obtained.

The composition of the GdFeCo readout layer is set so that its compensation and Curie temperatures are respectively 280° C. and over 400° C.

The composition of the TbFeCo first recording layer is set so that the layer is RE-rich at room temperature, there is no compensation temperature and Curie temperature is 220° C.

The composition of the TbFeCo second recording layer is set so that the layer is TM-rich at room temperature (compensation temperature: lower than room temperature) and Curie temperature is 220° C.

The result of this experimental example is shown in Table 5.

37th Experimental Example

Thin films are deposited on a polycarbonate, similar to the experimental examples 35, and a magnetooptical recording medium having the following structure, thickness and composition is fabricated. The thus fabricated recording medium is evaluated under the same conditions.

A SiN layer (an interference layer) is deposited to a thickness of 800 Å on the surface of the substrate. A GdFeCo layer (a readout layer) is deposited to a thickness of 100 Å, a TbFeCo layer (a first recording layer) is deposited to a thickness of 56 Å, a SiN layer (thickness: 50 Å) is deposited as an intermediate film and a TbFeCo layer (a second recording layer) is deposited to a thickness of 100 Å. Then, another SiN layer (thickness: 300 Å) is deposited as a protective film and a reflective film is deposited to a thickness of 600 Å. Thus, the layer structure as shown in FIG. 32C is obtained.

The composition of the GdFeCo readout layer is set so that its compensation and Curie temperatures are respectively 300° C. and over 400° C.

The composition of the TbFeCo first recording layer is set so that the layer is RE-rich at room temperature, there is no compensation temperature and Curie temperature is 200° C.

The composition of the GdFeCo intermediate layer is set so that its compensation and Curie temperatures are respectively below room temperature and over 150° C.

The composition of the TbFeCo second recording layer is set so that the layer is TM-rich at room temperature (compensation temperature: lower than room temperature) and Curie temperature is 150° C.

The result of this experimental example is shown in Table 5.

38th Experimental Example

Thin films are deposited on a polycarbonate, similar to the experimental examples 35, and a magnetooptical recording medium having the following structure, thickness and composition is fabricated. The thus fabricated recording medium is evaluated under the same conditions.

A SiN layer (an interference layer) is deposited to a thickness of 830 Å on the surface of the substrate. A GdFeCo layer (a readout layer) is deposited to a thickness of 200 Å, a TbFeCo layer (a first recording layer) is deposited to a thickness of 56 Å, a SiN layer (thickness: 10 Å) is deposited as an intermediate film and a TbFeCo layer (a second recording layer) is deposited to a thickness of 100 Å. Then, another SiN layer (thickness: 300 Å) is deposited as a protective film and an Al layer (a reflective film) is deposited to a thickness of 600 Å. Thus, the layer structure as shown in FIG. 32C is obtained.

The composition of the GdFeCo readout layer is set so that its compensation and Curie temperatures are respectively 290° C. and over 380° C.

The composition of the TbFeCo first recording layer is set so that its compensation and Curie temperatures are respectively 200° C. and 180° C.

The composition of the TbFeCo second recording layer is set so that the layer is TM-rich at room temperature (compensation temperature: lower than room temperature) and Curie temperature is 180° C.

The result of this experimental example is shown in Table 5.

39th Experimental Example

Thin films are deposited on a polycarbonate, similar to the experimental example 35, and a magnetooptical recording medium having the following structure, thickness and composition is fabricated. The thus fabricated recording medium is evaluated under the same conditions.

A SiN layer (an interference layer) is deposited to a thickness of 780 Å on the surface of the substrate. A GdFeCo layer (a readout layer) is deposited to a thickness of 200 Å, a TbFeCo layer (a first recording layer) is deposited to a thickness of 51 Å, a SiN layer (thickness: 20 Å) is deposited as an intermediate film and a TbFeCo layer (a second recording layer) is deposited to a thickness of 150 Å. Then, another SiN layer (thickness: 300 Å) is deposited as a protective film and an Al layer (a reflective film) is deposited to a thickness of 600 Å. Thus, the layer structure as shown in FIG. 32C is obtained.

The composition of the GdFeCo readout layer is set so that its compensation and Curie temperatures are respectively 270° C. and over 320° C.

The composition of the TbFeCo first recording layer is set so that its compensation and Curie temperatures are respectively 200° C. and 180° C.

The composition of the TbFeCo second recording layer is set so that the layer is TM-rich at room temperature (compensation temperature: lower than room temperature) and Curie temperature is 180° C.

The result of this experimental example is shown in Table 5.

40th Experimental Example

Thin films are deposited on a polycarbonate, similar to the experimental example 35, and a magnetooptical recording medium having the following structure, thickness and composition is fabricated. The thus fabricated recording medium is evaluated under the same conditions.

A SiN layer (an interference layer) is deposited to a thickness of 1000 Å on the surface of the substrate. A GdFeCo layer (a readout layer) is deposited to a thickness of 150 Å, a TbFeCo layer (a first recording layer) is deposited to a thickness of 47 Å, a SiN layer (thickness: 10 Å) is deposited as an intermediate film and a TbFeCo layer (a second recording layer) is deposited to a thickness of 60 Å. Then, another SiN layer (thickness: 300 Å) is deposited as a protective film and an Al layer (a reflective film) is deposited to a thickness of 600 Å. Thus, the layer structure as shown in FIG. 32C is obtained.

The composition of the GdFeCo readout layer is set so that its compensation and Curie temperatures are respectively 285° C. and over 350° C.

The composition of the TbFeCo first recording layer is set so that its compensation and Curie temperatures are respectively 200° C. and 180° C.

The composition of the TbFeCo second recording layer is set so that the layer is TM-rich at room temperature (compensation temperature: lower than room temperature) and Curie temperature is 180° C.

The result of this experimental example is shown in Table 5.

Sixth Comparative Experimental Example

Thin films are deposited on a polycarbonate, similar to the experimental example 35, and a magnetooptical recording medium having the following structure, thickness and composition is fabricated. The thus fabricated recording medium is evaluated under the same conditions.

A SiN layer (an interference layer) is deposited to a thickness of 850 Å on the surface of the substrate. A TbFeCo layer (a recording-readout layer) is deposited to a thickness of 800 Å. Then, another SiN layer (thickness: 700 Å) is deposited as a protective film. Thus, the layer structure as shown in FIG. 33B is obtained.

The composition of the TbFeCo recording-readout layer is set so that the layer is RE-rich at room temperature, compensation temperature is lower than room temperature and its Curie temperature is 200° C.

The result of this comparative experimental example is shown in Table 5.

Seventh Comparative Experimental Example

Thin films are deposited on a polycarbonate, similar to the experimental example 35, and a magnetooptical recording medium having the following structure, thickness and composition is fabricated. The thus fabricated recording medium is evaluated under the same conditions.

A SiN layer (an interference layer) is deposited to a thickness of 850 Å on the surface of the substrate. A GdFeCo layer (a readout layer) is deposited to a thickness of 400 Å and a TbFeCo layer (a recording layer) is deposited to a thickness of 400 Å. Then, another SiN layer (thickness: 700 Å) is deposited as a protective film. Thus, the layer structure as shown in FIG. 33B is obtained.

The composition of the GdFeCo readout layer is set so that the layer is TM-rich at room temperature (compensation temperature: lower than room temperature) and its Curie temperature is 360° C.

The composition of the TbFeCo recording layer is set so that the layer is RE-rich at room temperature, its compensation temperature is lower than room temperature and its Curie temperature is 190° C.

The result of this comparative experimental example is shown in Table 5.

TABLE 5

| f (MHz) | d (µm) | value of C/N ratio (dB) | | | | | | | |
|---|---|---|---|---|---|---|---|---|---|
| | | ex. 35 | ex. 36 | ex. 37 | ex. 38 | ex. 39 | ex. 40 | com. ex. 6 | com. ex. 7 |
| 15 | 0.30 | 26 | 28 | 30 | 32 | 34 | 35 | 8 | 15 |
| 12 | 0.38 | 37 | 38 | 38 | 37 | 38 | 38 | 12 | 22 |
| 10 | 0.45 | 42 | 42 | 43 | 43 | 43 | 43 | 30 | 35 |
| 8.0 | 0.57 | 44 | 44 | 44 | 44 | 44 | 44 | 42 | 42 |
| 5.8 | 0.78 | 48 | 48 | 48 | 48 | 48 | 48 | 48 | 48 |

(f: recording frequency,
d: recorded mark length)

In the fifth embodiment, the structure of the readout layer is the same as that of the first embodiment, but this can be the same as the structure of the readout layer of the second embodiment.

SIXTH EMBODIMENT

A preferred sixth embodiment according to the present invention, information recording and reproducing methods using this magnetooptical recording medium will be described hereinafter.

Figure 36:
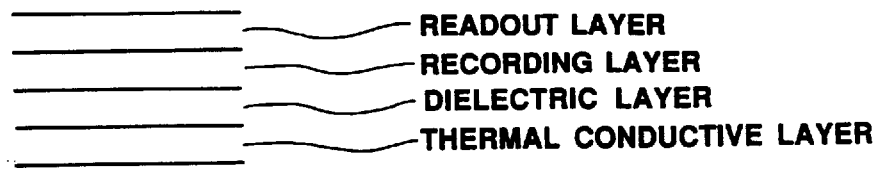
FIGS. 36A and 36B are conceptual views showing layer structures of magnetooptical recording media of a sixth embodiment.
Figure 36:

As shown in cross-sectional views of FIGS. 36A and 36B, a magnetooptical recording medium of the sixth embodiment is mainly composed of a readout layer (a second magnetic layer)which is an in-plane perpendicular magnetization film at room temperature and is changed to a perpendicular magnetization film at raised temperatures, a recording layer (a first magnetic layer) in which data is to be stored and which is a perpendicular magnetization film both at room temperature and raised temperatures, and a thermal conductive layer for desirably conducting heat which is layered directly or indirectly on the recording layer.

According to the above medium, a pit shape recorded in the recording layer during data recording can be prevented from having a crescent shape.

The reason that the recorded pit is likely to have a crescent shape in a conventional medium and the problem thereof will be explained.

Figure 39A:
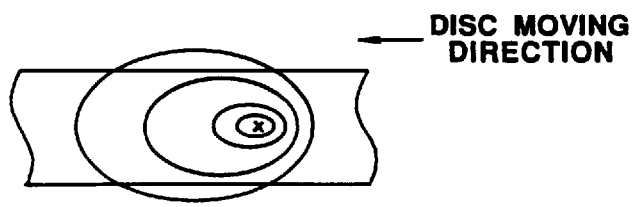
FIG. 39A is a graph illustrating isotherms of a conventional magnetooptical recording medium at the time of data recording.
Figure 39B:
FIG. 39B is a graph illustrating the pattern of record pits of a conventional magnetooptical recording medium.

When a field modulation recording is performed onto a magnetooptical recording medium disclosed in Japanese Patent Laid-open No. 3-93058, a recording layer is heated by a laser beam to over Curie temperature or compensation temperature, and in this state, an external magnetic field is applied with its polarity being changed according to recorded information. The recorded pit formed by the field modulation recording is likely to have an arcuate or crescent shape which has a sharp curve projecting toward the moving direction of the recording medium, as shown in FIG. 39B. This phenomenon results from heat-storing effect due to the fact that the thermal conductivity of the magnetic layer, composed of readout layer, recording layer and the like, is low. The isothermal distribution in the vicinity of a portion, where a laser beam is illuminated, has an elliptical shape which has a major axis along the moving direction of the laser beam, as shown in FIG. 39A. Moreover, the temperature of a trailing portion of the laser beam (a rear end portion in the moving direction) is high, so that the curvature of temperature distribution is sharp on the rear end side. Thus, the record pit shape also has a sharp arcuate or crescent shape.

Figure 41:
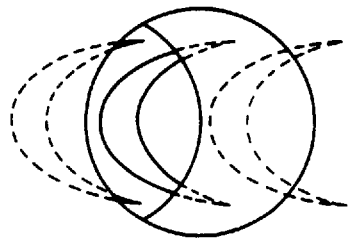
FIG. 41 is a schematic view showing the relation between record pits formed on a conventional magnetooptical recording medium and reproducable region where information can be reproduced by a laser beam.

When such record pit has a sharp crescent, there exist, in a high-temperature region which is a reproducable region of a readout laser beam, both opposite tail portions of a adjacent preceding record pit in addition to one record pit, as shown in FIG. 41. As a result, S/N or C/N of reproduced information is reduced. Thus, the proposed improvement of resolution is prevented.

Figure 38A:
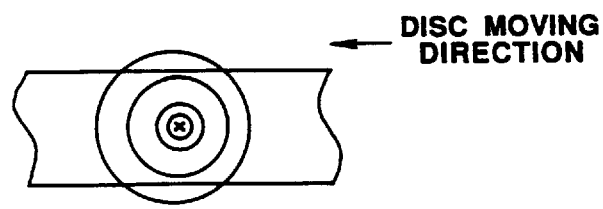
FIG. 38A is a graph illustrating isotherms of the sixth embodiment at the time of data recording.

In contrast, in the magnetooptical recording medium of the sixth embodiment of the present invention, since the thermal conductive layer is provided, the isothermal distribution curve has, due to its heat radiating effect, an isotropic circular shape as shown in FIG. 38A. Therefore, the record pit is prevented from having a sharp arcuate or crescent curve.

Concrete structure of the magnetooptical recording medium of the sixth embodiment is as follows.

The readout layer is preferably composed of, for example, rare-earth and iron group amorphous alloy, such as GdCo, GdFeCo, GdTbFeCo, GdDyFeCo and NdGdFeCo. Material having a small magnetic anisotropy or material, whose compensation temperature is between room temperature and Curie temperature, is desirable.

The recording layer is preferably composed of material which has a large perpendicular magnetic anisotropy, for example, rare earth and iron group amorphous alloy, such as TbFeCo, DyFeCo and TbDyFeCo; or garnet; or platinum group and iron group periodical structure layer, such as Pt/Co and Pd/Co; or platinum group and iron group alloy, such as PtCo and PdCo.

Further, elements for improving corrosion resistance, ouch as Cr, Al, Ti, Pt, Nb or the like, may be added to the readout and recording layers, respectively. The thermal conductive layer is desirably composed of Al, $AlN_x$, AlTa, AlTi, AlCr, Cu or the like.

Dielectrics, such as $SiN_x$, $AlN_x$, $AlO_x$, $TaO_x$, $SiO_x$, at. el, may be formed between the thermal conductive layer and recording layer as shown in FIG. 36A.

Information recording and reproducing methods of the sixth embodiment will be described.

Initially, data signal is recorded in the recording layer of the magnetooptical recording medium of the sixth embodiment. Recording is conducted by modulating an external magnetic field with a laser beam, powerful enough to raise the recording layer to over Curie temperature, being applied. At this time, as explained above, the shape of record pit will not be crescent due to the presence of the thermal conductive layer.

Figure 38B:
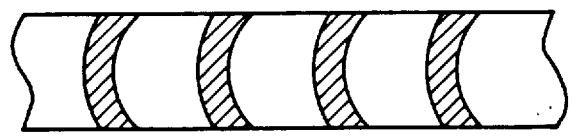
FIG. 38B is a graph illustrating the pattern of record pits of the sixth embodiment.

The record pit formed by the field modulation recording has a gentle curve as shown in FIG. 38B.

When a readout laser beam is applied to the medium to reproduce information, the temperature of a beam illumination portion is raised and the temperature distribution as shown in FIG. 38A appears.

As regards the direction of magnetization of a single magnetic thin film, it is known that a chief magnetization direction is determined by an effective perpendicular magnetic anisotropy constant $K\perp$ that is defined by the following equation:

$$K\perp = Ku - 2\pi Ms^2$$

where Ms is the saturation magnetization of a single magnetic thin film and Ku is a perpendicular magnetic anisotropy constant.

Here, $2\pi Ms^2$ signifies energy of demagnetizing field.

When the readout layer has compensation temperature, for example, between room temperature and Curie temperature, Ms is large at room temperature, and the following relation is satisfied:

$K\perp < 0$.

Thus, an in-plane magnetization film is produced. On the other hand, since temperature is raised during reproduction, $2\pi Ms^2$ is sharply reduced and Ku becomes larger larger than $2\pi Ms^2$. The following relation is thus satisfied:

$Ku > 0$.

Thus, a perpendicular magnetization film is produced. Here, Ku slightly decreases along with the rise of temperature, but its rate of reduction is generally small, compared to that of $2\pi Ms^2$.

When the readout layer and the recording layer are layered directly or with an intermediate layer therebetween, the temperature of a perpendicular magnetization region shifts toward a lower value, compared to a case where the readout layer and the recording layer are not layered, since exchange coupling force, magnetostatic coupling force or the like acts from the perpendicular magnetization film and thus Ku increases in appearance. However, if presetting the perpendicular magnetization temperature range in a single layer structure at a slightly higher value, it is possible that the readout layer is an in-plane magnetization film at room temperature and shifts into a perpendicular magnetization film at the high temperature even when the readout layer is layered along with the perpendicular magnetization layer.

If the saturation magnetization Ms and perpendicular magnetization anisotropy constant Ku of the readout layer are set, considering the intensity of laser light during information reproduction, so that only a high-temperature portion of the readout layer within the light spot is changed into a perpendicular magnetization film, only the high-temperature portion within the light spot becomes a perpendicular magnetization film and the other portion remains an in-plane magnetization film. In this case, exchange coupling force acts from the recording layer on that portion of the readout layer where perpendicular magnetization film appears, and the direction of magnetization in that portion of the readout layer is aligned to a stable direction relative to a direction of magnetization based on data recorded in the recording layer. Thus, data recorded in the recording layer is transferred to the readout layer. The transferred information is reproduced by detecting a reflective light of the light spot influenced by magneto-optic effect of the perpendicular magnetization film portion in the readout layer (in other words, magneto-optical effect of laser light reflected by the readout layer). In this case, magneto-optical effect is caused in the in-plane magnetization film portion of the readout layer within the light spot.

As discussed above, in the reproducing method using the magnetooptical recording medium of the sixth embodiment, no initializing magnetic field is needed, and even when the bit pitch is smaller than the diameter of laser beam, interference between codes is reduced and data is reproduced with high C/N.

Figure 40:
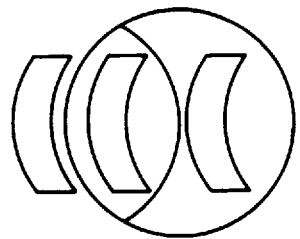
FIG. 40 is a schematic view showing the relation between record pits formed on the magnetooptical recording medium of the sixth embodiment and reproducable region where information can be reproduced by a laser beam.

Further, when the record pit formed in the magnetooptical recording medium is read out by a readout laser beam, only a single desired record pit, which is to be read out, is caused to be present within a reproducable window region of a readout laser beam spot of, for example, laser light, as shown in FIG. 40. Invasion of edge portions of adjacent record bits within the reproducable window region can be prevented.

Thus, improvements of S/N or C/N and reproduction resolution or resolving power can be achieved.

41th Experimental Example

Targets of Si, Tb, Gd, Fe, Co and Al are installed in a DC magnetron sputtering equipment, and a polycarbonate substrate of a diameter of 130 mm with pregrooves is held on a holder. Thereafter, air is vacuum-exhausted from a chamber to establish a high vacuum level of less than $1 \times 10^{-5}$ Pa by using a cryosorption pump.

Figure 37:
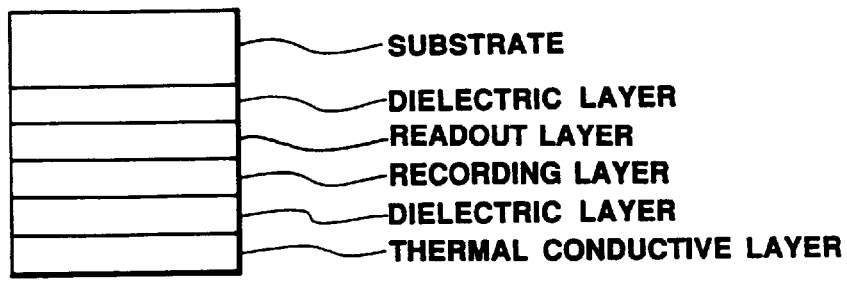
FIGS. 37A and 37B are conceptual views showing other layer structures of magnetooptical recording media of the sixth embodiment.
Figure 37:
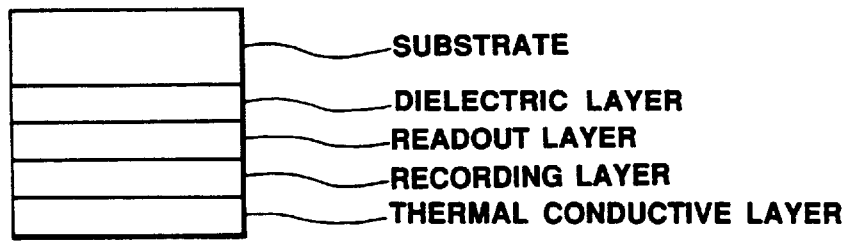

Ar gas is introduced into the chamber while vacuum-exhausting air, until the level of 0.4 Pa of Ar gas is reached. Then, a SiN layer (an interference layer) is deposited to a thickness of 800 Å on the surface of the substrate. A GdFeCo layer (a readout layer) is deposited to a thickness of 400 Å, a TbFeCo layer (a recording layer) is deposited to a thickness of 400 Å and another SiN layer (thickness: 300 Å) is deposited as an interference film. Then, an AlCr layer (thickness: 600 Å) is deposited as a thermal conductive layer. Thus, the layer structure as shown in FIG. 37A is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively.

The composition of the GdFeCo readout layer is set so that its compensation and Curie temperatures are respectively 280° C. and over 350° C.

The composition of the TbFeCo recording layer is set so that the layer is TM-rich at room temperature, compensation temperature is less than room temperature and Curie temperature is 210° C.

Result of measurement of recording-reproducing characteristics of the magnetooptical recording medium described in the 41th experimental example is as follows.

A measuring instrument comprises an objective of 0.55 N.A. and a projector for outputting a laser beam of 780 nm wavelength. Power for recording is preset at 8~10 mW and linear velocity is 9 m/sec (rotation speed: 2400 rpm and radius: 36 mm). Then, 5.8–15 MHz carrier signal is recorded in the recording layer by using a field modulation system (recording magnetic field: ±200 Oe). The record-frequency dependency C/N ratio is measured. The reproducing power is set so that C/N ratio is maximized.

The result is shown in Table 6.

42th Experimental Example

Targets of Si, Tb, Gd, Fe, Co and Al are installed in a DC magnetron sputtering equipment, and a polycarbonate substrate of a diameter of 130 mm with pregrooves is held on a holder. Thereafter, air is vacuum-exhausted from a chamber to establish a high vacuum level of less than $1 \times 10^{-5}$ Pa by using a cryosorption pump.

Ar gas is introduced into the chamber while vacuum-exhausting air, until the level of 0.4 Pa of Ar gas is reached. Then, a SiN layer (an interference layer) is deposited to a thickness of 800 Å on the surface of the substrate. A GdFeCo layer (a readout layer) is deposited to a thickness of 400 Å, a TbFeCo layer (a recording layer) is deposited to a thickness of 400 Å and an AlCr layer (thickness: 600 Å) is deposited as a thermal conductive layer. Thus, the layer structure as shown in FIG. 37A is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively.

The composition of the GdFeCo readout layer is set so that its compensation and Curie temperatures are respectively 280° C. and over 400° C.

The composition of the TbFeCo recording layer is set so that the layer is TM-rich at room temperature, compensation temperature is less than room temperature and Curie temperature is 220° C.

Result of measurement of recording-reproducing characteristics of the magnetooptical recording medium described in the 42th experimental example is as follows.

A measuring instrument comprises an objective of 0.55 N.A. and a projector for outputting a laser beam of 780 nm wavelength. Power for recording is preset at 8~10 mW and linear velocity is 9 m/sec (rotation speed: 2400 rpm and radius: 36 mm). Then, 5.8–15 MHz carrier signal is recorded in the recording layer by using a field modulation system (recording magnetic field: ±180 Oe). The record-frequency dependency of C/N ratio is measured. The readout power is set so that C/N ratio is maximized. The result is shown in Table 6.

Eighth Comparative Experimental Example

Targets of Si, Tb, Gd, Fe, Co and Al are installed in a DC magnetron sputtering equipment, and a polycarbonate substrate of a diameter of 130 mm with pregrooves is held on a holder. Thereafter, air is vacuum-exhausted from a chamber to establish a high vacuum level of less than $1 \times 10^{-5}$ Pa by using a cryosorption pump.

Ar gas is introduced into the chamber while vacuum-exhausting air, until the level of 0.4 Pa of Ar gas is reached. Then, a SiN layer (an interference layer) is deposited to a thickness of 800 Å on the surface of the substrate. A GdFeCo layer (a readout layer) is deposited to a thickness of 400 Å, a TbFeCo layer (a recording layer) is deposited to a thickness of 400 Å and another SiN layer (thickness: 300 Å) is deposited as a protective layer. Thus, the layer structure as shown in FIG. 37A is obtained.

When the SiN layer is formed, $N_2$ gas is introduced in addition to the Ar gas and the deposition is performed by DC reactive sputtering of the Si target. The GdFeCo and TbFeCo layers are formed with applying DC powers to targets of Gd, Fe, Co and Tb, respectively.

The composition of the GdFeCo readout layer is set so that its compensation and Curie temperatures are respectively 280° C. and over 400° C.

The composition of the TbFeCo recording layer is set so that the layer is TM-rich at room temperature, compensation temperature is less than room temperature and Curie temperature is 220° C.

Result of measurement of recording-reproducing characteristics of the magnetooptical recording medium described in the comparative experimental example is as follows.

A measuring instrument comprises an objective lens of 0.55 N.A. and a projector for outputting a laser beam of 780 nm wavelength. Power for recording is preset at 8~10 mW and linear velocity is 9 m/sec (rotation speed: 2400 rpm and radius 36 mm). Then, 5.8–15 MHz carrier signal recorded in the recording layer by using a field modulation system (recording magnetic field: ±180 Oe). The record frequency dependency of C/N ratio is measured. The readout power is set so that C/N ratio is maximized. The result is shown in Table 6.

TABLE 6

| | | value of C/N ratio (dB) | | |
|---|---|---|---|---|
| f (MHz) | d ($\mu$m) | ex. 41 | ex. 42 | com. ex. 8 |
| 15 | 0.30 | 30 | 32 | 22 |
| 12 | 0.38 | 41 | 43 | 34 |
| 10 | 0.45 | 44 | 44 | 40 |
| 8.0 | 0.57 | 46 | 45 | 44 |
| 5.8 | 0.78 | 49 | 50 | 48 |

In the sixth embodiment, the structure of the readout layer is the same as that of the first embodiment, but this can be the same as the structure of the readout layer of the second embodiment.

SEVENTH EMBODIMENT

The following description deals with a recording method of a seventh embodiment using the recording medium of the first embodiment and a magnetic field modulation system.

Information is recorded on the magnetooptical recording medium of the first embodiment by projecting a laser beam onto a record portion in the recording medium. The laser beam is a continuous-wave (cw) light and powerful enough to raise the temperature of the recording medium close to Curie temperature of the recording layer.

Figure 42:
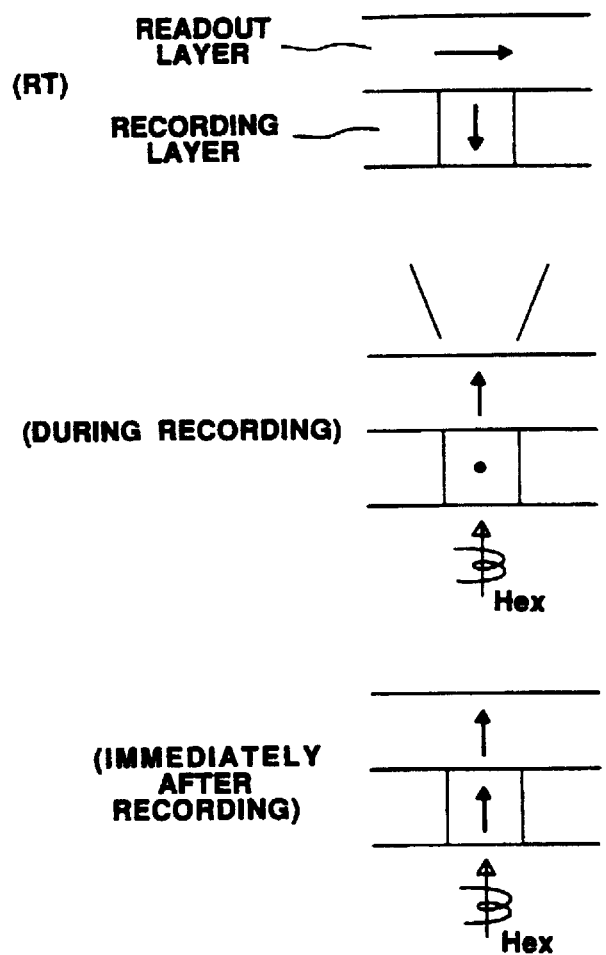
FIG. 42 is a schematic view illustrating an example of magnetization formed when information is recorded on the recording medium of the first embodiment by using a magnetic field modulation system.

At this time, magnetization in the readout layer becomes small, but does not disappear. A perpendicular magnetization film still remains and exchange coupling force is generated between the readout and recording layers. Magnetization in the recording layer disappears or becomes sufficiently small. When an external magnetic field, whose direction is modulated according to information, is applied in this state, magnetization in the readout layer is aligned toward the direction of an external magnetic field $H_{ex}$, as shown in FIG. 42.

Since the magnetic moment in the recording layer, which disappears or is sufficiently small, is influenced by exchange coupling force from the readout layer, the magnetic moment in the recording layer is likely to be directed toward the direction of external magnetic field, similar to the readout layer. This exchange coupling interaction functions, as a bias magnetic field directed toward the direction of the external magnetic field, for the magnetization in the recording layer. As a result, record bit can be formed.

Figure 43:
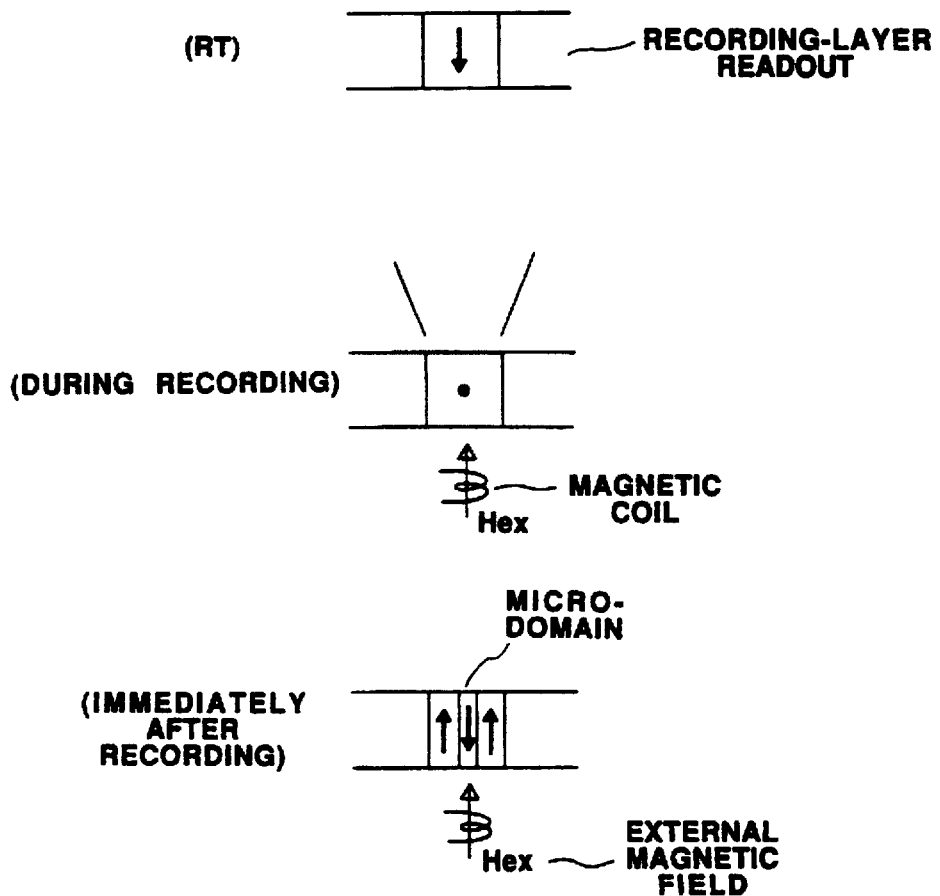
FIG. 43 is a schematic view illustrating magnetization formed when information is recorded on a recording medium, which has an ordinary single layer having large coercive force and low Curie temperature, by using a magnetic field modulation system.

As shown in FIG. 44, magnetic force lines generated by a magnetic head concentrate on a perpendicular magnetization film portion in the readout layer in the magnetooptical recording medium of the first embodiment of the present invention, in comparison with a conventional recording medium having a single magnetic film as shown in FIG. 45A or a conventional case where a readout layer is placed on the side of a magnetic coil as shown in FIG. 45B. Therefore, an effective magnetic field acting on record bits becomes large. Thus, it is possible to erase micro-domain (see FIG. 43) which causes noise at the time of magnetic field modulation, and effectively form record bits even by a weak external magnetic field.

The seventh embodiment of the present invention is described in more detail by the following experimental examples. The experimental examples are illustrative and not restrictive.

43th Experimental Example

A SiN layer (thickness: 1000 Å) is deposited on a polycarbonate substrate of a diameter of 130 mm with pregrooves, for obtaining interference effect and anti-oxidation, by using a magnetron sputtering apparatus. Then, a GdFeCo layer (a readout layer) is deposited to a thickness of 200 Å, a TbFeCo layer (a recording layer) is deposited to a thickness of 200 Å. Thereafter, another SiN layer (thickness: 300 Å) is deposited for enhancing anti-oxidation and interference effect, and an Al layer (thickness: 400 Å) is deposited as a thermal conductive layer. Those layers are consecutively grown without destroying vacuum. Thus, the layer structure of the seventh embodiment is obtained.

Information is recorded in this magnetooptical recording medium by using a magnetic field modulation system, and the data is reproduced. The intensity of a magnetic field for realizing C/N ratio of 49 dB is measured. The result is shown in Table 7.

Ninth Comparative Experimental Example

The structure of this comparative experimental example is the same as the 43th experimental example, except that a readout layer and a recording are layered in an inverted order. The intensity of a magnetic field for realizing C/N ratio of 49 dB is measured. The result is shown in Table 7.

Tenth Comparative Experimental Example

The structure of this comparative experimental example is the same as the 43th experimental example except a readout layer is removed. The intensities of a magnetic field for realizing C/N ratios of 30, 40 and 50 dB are measured. The result is shown in Table 7.

TABLE 7 layer structures and field intensities for achieving C/N ratios of 30, 40 and 50 dB

| layer st. (mag. layer) | C/N 30 dB | C/N 40 dB | C/N 50 dB |
|---|---|---|---|
| (sub.) readout layer/ rec. layer | 10 Oe | 50 Oe | 70 Oe |
| (sub.) rec. layer/ readout layer | 50 Oe | 80 Oe | 100 Oe |
| (sub.) rec. layer | 90 Oe | 100 Oe | 130 Oe |

EIGHTH EMBODIMENT

The following description deals with a verification method (confirmation of recorded data) which is performed with data being recorded in the magnetooptical recording medium of the first embodiment.

Figure 52:
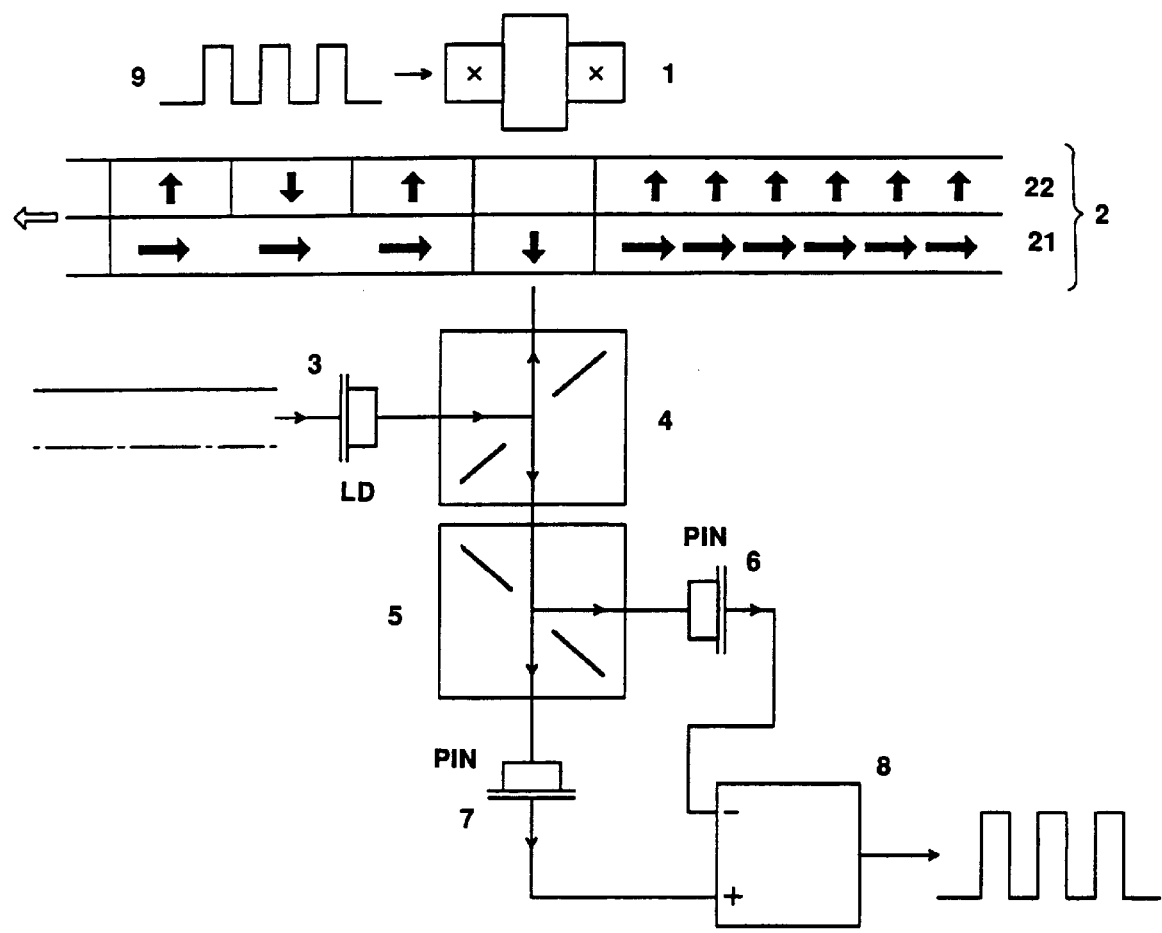
FIG. 52 is a view illustrating an equipment for implementing an eighth embodiment of the present invention.

FIG. 52 is block diagram illustrating an equipment for implementing the eighth embodiment. In FIG. 52, reference numeral 1 is a coil for applying an external magnetic field, reference numeral 2 is a recording medium, reference numeral 21 is a readout layer, reference numeral 22 is a recording layer, reference numeral 3 is a semiconductor laser, reference numeral 4 is a half-prism, reference numeral 5 is a polarization beam splitter, reference numerals 6 and 7 are photodiodes, reference numeral 8 is a differential amplifier. FIG. 52 shows an example in which the present invention is applied to a method wherein a cw laser beam is illuminated under an external magnetic field modulated according to record information 9.

An operation principle of the eighth embodiment is described hereinafter.

When a laser beam is projected on the recording medium 2, temperature of the medium increases and then magnetization in the recording layer 22 disappears. Magnetization in the readout layer 21, however, remains because its Curie temperature is high, but the magnetization decreases to be a perpendicular magnetization film and is inverted by an external magnetic field from the coil 1. After magnetization is generated in the recording layer, the magnetization is exchange-coupled to the magnetization in the readout layer and always takes a stable magnetization state through the same process, under given conditions, as shown in FIGS. 48, 49, 50 and 51. Therefore, if the magnetization inversion in the readout layer can be detected, it is possible to verify recorded information simultaneously with the recording of information.

This magnetization inversion in the readout layer is detected by photodiodes 6 and 7 as a change in the magneto-optic effect of a reflective light of the illuminated laser beam during recording, because the magnetization remains even at the time of data recording. The detected magnetization inversion is converted into a reproduced signal by the differential amplifier 8. An abnormal reproduced signal is output from the amplifier 8 when it is impossible to correctly record information due to defect, deterioration, corrosion or dust of the recording medium, trouble of a magnetooptical recording apparatus or the like. Therefore, also in such cases, it is possible to verify the recording at the same time with data recording.

The manner of change in magnetization during recording process will be described.

Figure 46:
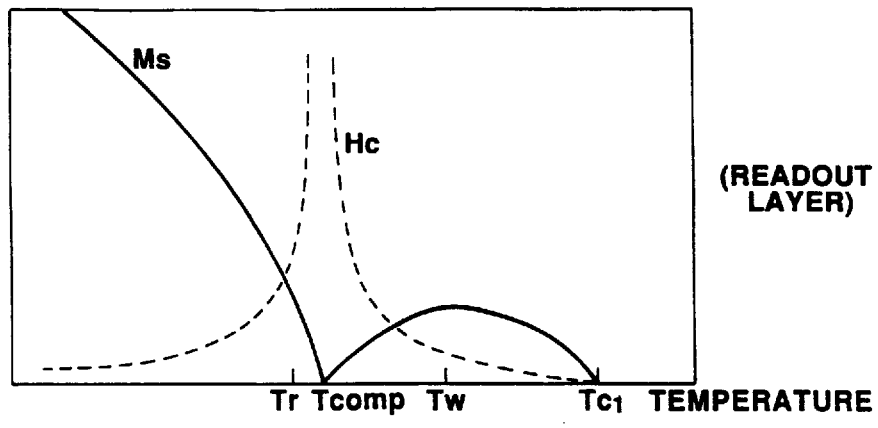
FIG. 46 is a graph illustrating an example of the temperature dependencies of saturation magnetization Ms and coercive force Hc of the readout layer in the recording medium of the first embodiment.
Figure 47:
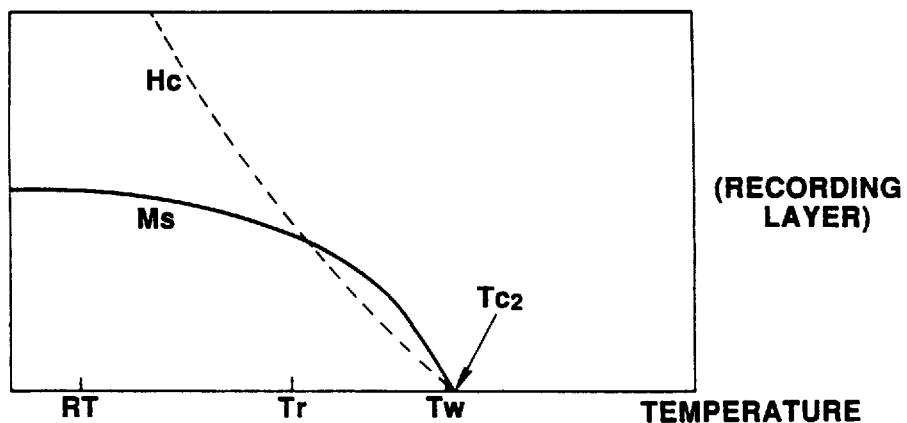
FIG. 47 is a graph illustrating an example of the temperature dependencies of saturation magnetization Ms and coercive force Hc of the recording layer in the recording medium of the first embodiment.

FIGS. 46 and 47 respectively show examples of temperature dependencies of saturation magnetization Ms and coercive force Hc of the first and second magnetic layers. $T_{coep}$ and $T_c$ respectively stand for compensation temperature and Curie temperature.

<A case where compensation temperature of the first magnetic layer is lower than Curie temperature of the second magnetic layer>

In the case of magnetic characteristics as shown in FIGS. 46 and 47, two cases of PA-type and AP-type (their definitions will be described hereinafter) can be considered since compensation temperature of the first magnetic layer is lower than Curie temperature of the second magnetic layer (see FIGS. 48 and 49).

P-type is defined by the fact that TM-sublattice or RE-sublattice magnetization is dominant in both of the first and second magnetic layers. A-type is defined by the fact that TM (iron group atom)-sublattice magnetization is dominant in the first and RE (rare-earth metal atom)-sublattice magnetization is dominant in the second magnetic layer, or vice versa. PA-type is defined, for example, by the fact that P-type is established at room temperature and A-type is established at high temperature. AP-type is defined, for example, by the fact that A-type is established at room temperature and P-type is established at high temperature. PP-type is defined, for example, by the fact that P-type is established both at room temperature and at high temperature. AA-type is defined, for example, by the fact that A-type is established both at room temperature and at high temperature.

Figure 48:
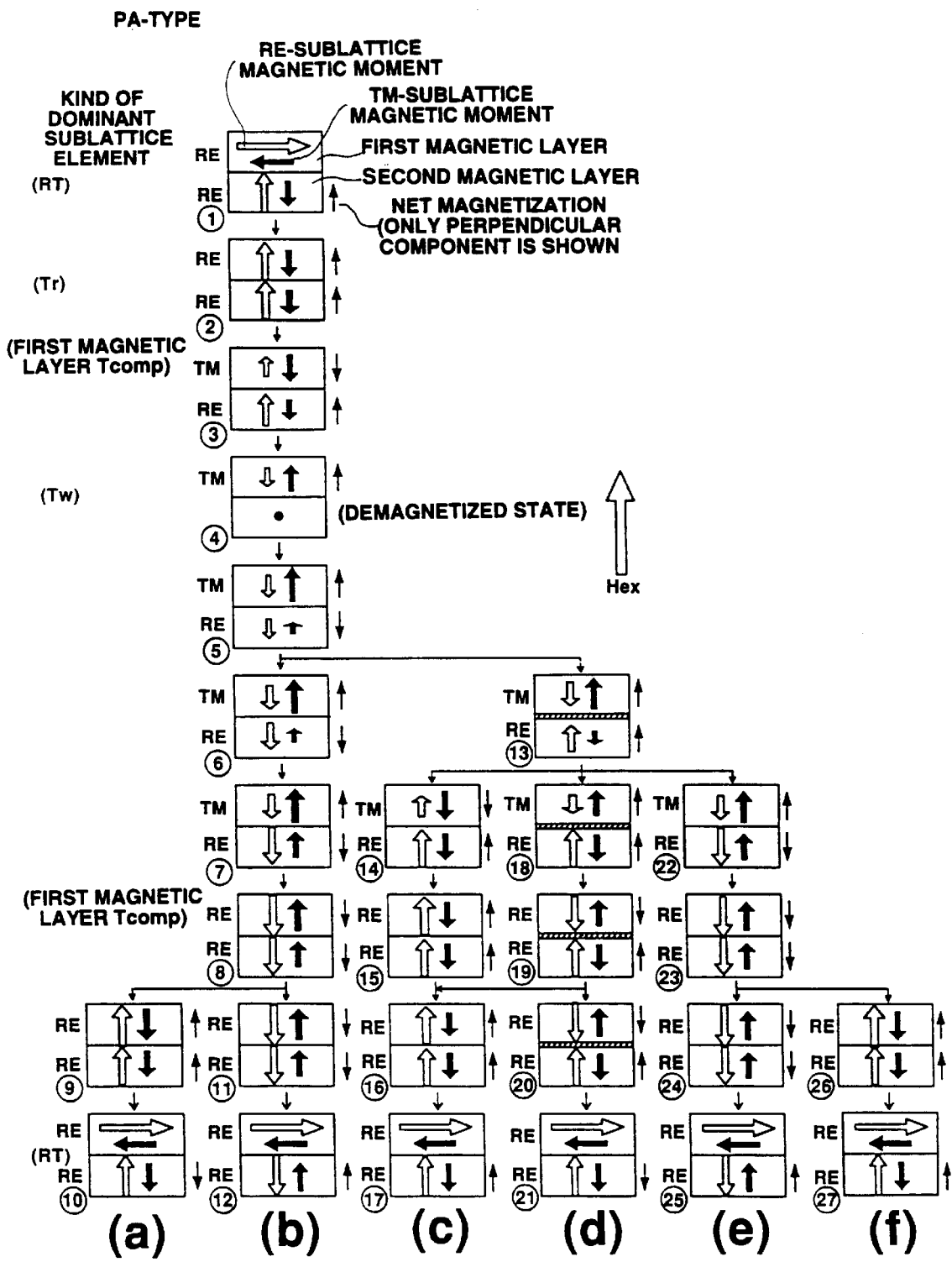
FIG. 48 is a schematic view illustrating states of sublattice magnetization and net magnetization at room temperature, information reproduction and information recording, where the structure of magnetic layer is PA-type.
Figure 49:
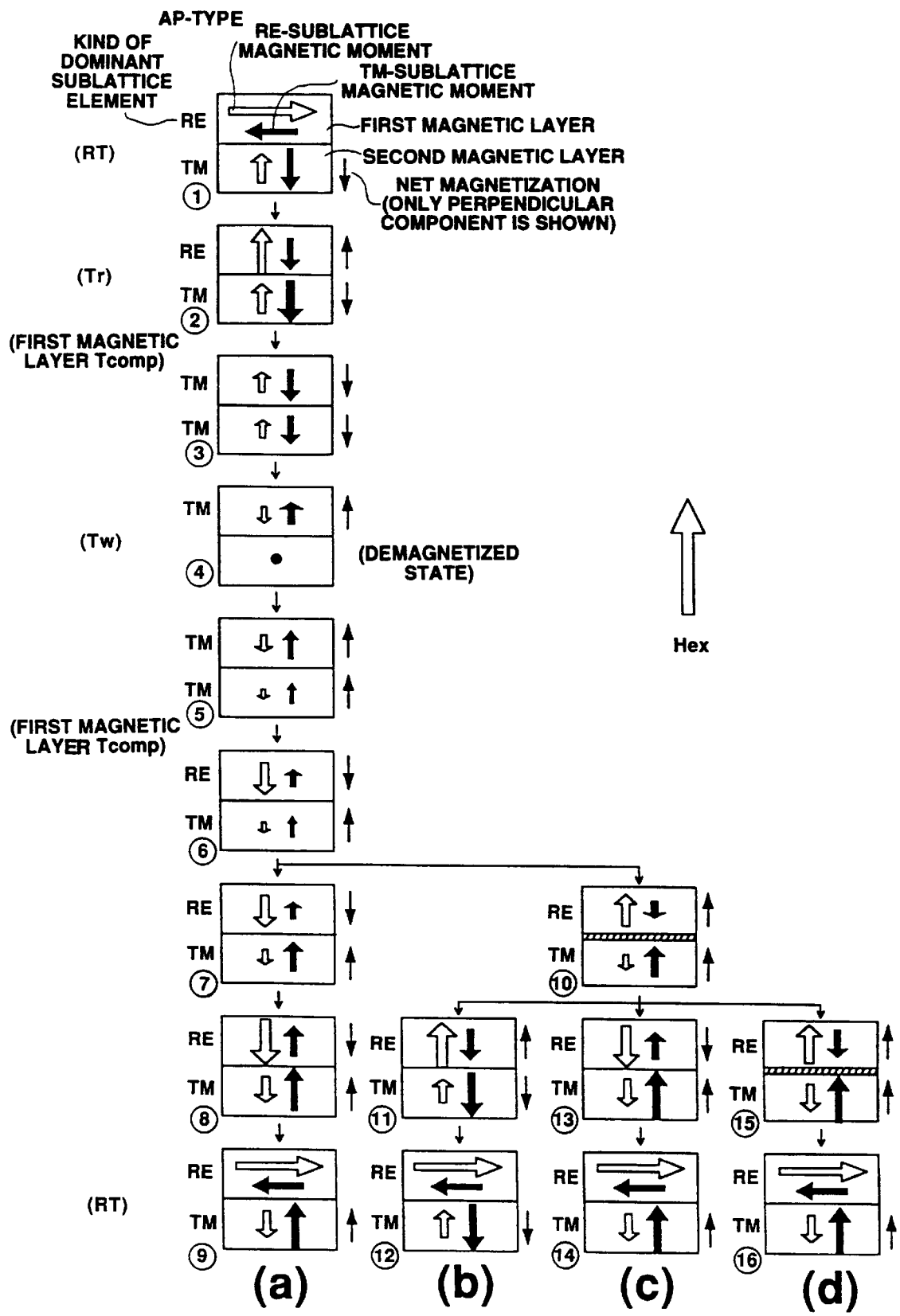
FIG. 49 is a schematic view illustrating states of sublattice magnetization and net magnetization at room temperature, information reproduction and information recording, where the the structure of magnetic layer is AP-type.

FIGS. 48 and 49 respectively illustrate changes in RE and TM-sublattice magnetizations appearing when temperature shifts from room temperature (RT) and again returns to readout temperature, through readout time (Tr) and recording time (Tw), under the condition that the first and second magnetic layers respectively exhibit magnetic characteristics of FIGS. 46 and 47 and are respectively PA-type and AP-type.

(PA-type; FIG. 48)

In PA-type, there is a possibility that interface magnetic domain walls appear between the first and second magnetic layers during recording. Therefore, in PA-type, there is a possibility that several different states ((a)~(f) in FIG. 48) occur at high temperature. However, the medium can always pass through a desired state if the relation among values of energy of interface magnetic domain walls, Zeeman energy and energy of coercive force is properly adjusted.

More detailed explanation is as follows. Where $\sigma_w$ is energy of interface magnetic domain walls, $h_1$ and $h_2$ are respectively thicknesses of the first and second magnetic layers and $M_{s1}$ and $M_{s2}$ are respectively saturation magnetizations of the first and second magnetic layers, effective bias magnetic fields $H_{w1}$ and $H_{w2}$, which are caused by exchange interaction coupling acting upon the first and second magnetic layers, are represented by the following formulae:

$$H_{w1} = \sigma_w/(2M_{s1}h_1) \quad (1),$$

$$H_{w2} = \sigma_w/(2M_{s2}h_2) \quad (2).$$

Further, where $H_{c1}$ and $H_{c2}$ are respectively magnetization inversion fields of the first and second magnetic layers and $H_{ex}$ is an external magnetic field, ⑤ always proceeds to ⑥, if the following relation is satisfied during ⑤ to ⑥, for example,:

$$⑤→⑥ \quad H_{c2} > H_{ex} - H_{w2} \quad (3),$$

and ⑧ always proceeds to ⑪ if the following relation is satisfied during ⑧ to , ⑪, for example,:

$$⑧→⑪ \quad H_{ex} < (M_{s1}h_1H_{c1} + M_{s2}h_2H_{c2})/(M_{s1}h_1 + M_{s2}h_2) \quad (4).$$

Thus, the path of (b) is established:

$$(\quad\quad\quad\quad\quad\quad b\quad\quad\quad\quad\quad\quad)$$
$$①→②→③→④→⑤→⑥→⑦→⑧→⑨→⑩→⑪→⑫,$$

even though the (b) involves branching points ⑤ and ⑧ at which other procession is possible. In brief, the path of (b) is always established if temperatures at respective stages satisfy those conditions.

Other paths are as follows:

(a) ①→②→③→④→⑤→⑥→⑦→⑧→⑨→⑩, (c) ①→②→③→④→⑤→⑬→⑭→⑮→⑯→⑰,

①→②→③→④→⑤→⑬→(18)→(19)→(16)→(17), (d) ①→②→③→④→⑤→⑬→(18)→(19)→(20)→(21), (e) ①→②→③→④→⑤→⑬→(18)→(23)→(24)→(25), (f) ①→②→③→④→⑤→⑬→(22)→(23)→(26)→(27).

Conditions at the branching points are represented by the following relations (5)~(13), and respective paths are always achieved if conditions according to respective processions are satisfied at branching points.

⑤ → ⑬     $H_{c2} < H_{ex} - H_{w2}$     (5),

⑬ → ⑭     $H_{c1} < H_{w1} - H_{ex}$     (6),

⑬ → (18)     $H_{c2} > H_{ex} - H_{w2}$     (7), and     $H_{c1} > H_{w1} - H_{ex}$     (8), ⑬ → (22)     $H_{c2} < H_{w2} - H_{ex}$     (9),

(19) → (16)     $H_{c1} < H_{w1} - H_{ex}$     (10),

(19) → (20)     $H_{c1} > H_{w1} + H_{ex}$     (11),

⑧ → ⑨ and (23) → (26)

$H_{ex} > (M_{s1}h_1H_{c1} + M_{s2}h_2H_{c2})/(M_{s1}h_1 + M_{s2}h_2)$     (12),

(23) → $H_{ex} < (M_{s1}h_1H_{c1} + M_{s2}h_2H_{c2})/(M_{s1}h_1 + M_{s2}h_1)$     (13).

(AP-type; FIG. 49)

In AP-type, there are the following paths:

(a) ①→②→③→④→⑤→⑥→⑦→⑧→⑨, (b) ①→②→③→④→⑤→⑥→⑩→⑪→⑫, (c) ①→②→③→④→⑤→⑥→⑩→⑬→⑭, (d) ①→②→③→④→⑤→⑥→⑩→⑮→(16).

Conditions at the branching points are represented by the following relations (14)~(19), and respective paths are always achieved if conditions according to respective processions are satisfied at branching points.

$(6) \to (10)$  $\quad H_{c1} < H_{ex} - H_{w1}$  (14), $(10) \to (11)$  $\quad H_{c2} < H_{w2} - H_{ex}$  (15), $(10) \to (13)$  $\quad H_{c1} < H_{ew1} - H_{ex}$  (16), $(10) \to (15)$  $\quad H_{c2} < H_{w2} - H_{ex}$  (17), and  $\quad H_{c1} < H_{ew1} - H_{ex}$  (18), $(6) \to (7)$  $\quad H_{c1} > H_{ex} - H_{w1}$  (19).

<A case where compensation temperature of the first magnetic layer is higher than Curie temperature of the second magnetic layer>

In this case (magnetic characteristics of the respective magnetic layers are not shown, two cases of AA-type and PP-type (see FIGS. 50 and 51) exist. In AA-type, as discussed above, there is a possibility that interface magnetic domain walls occur. However, a desired path can be always established if medium characteristics are designed in the following manner.

Figure 50:
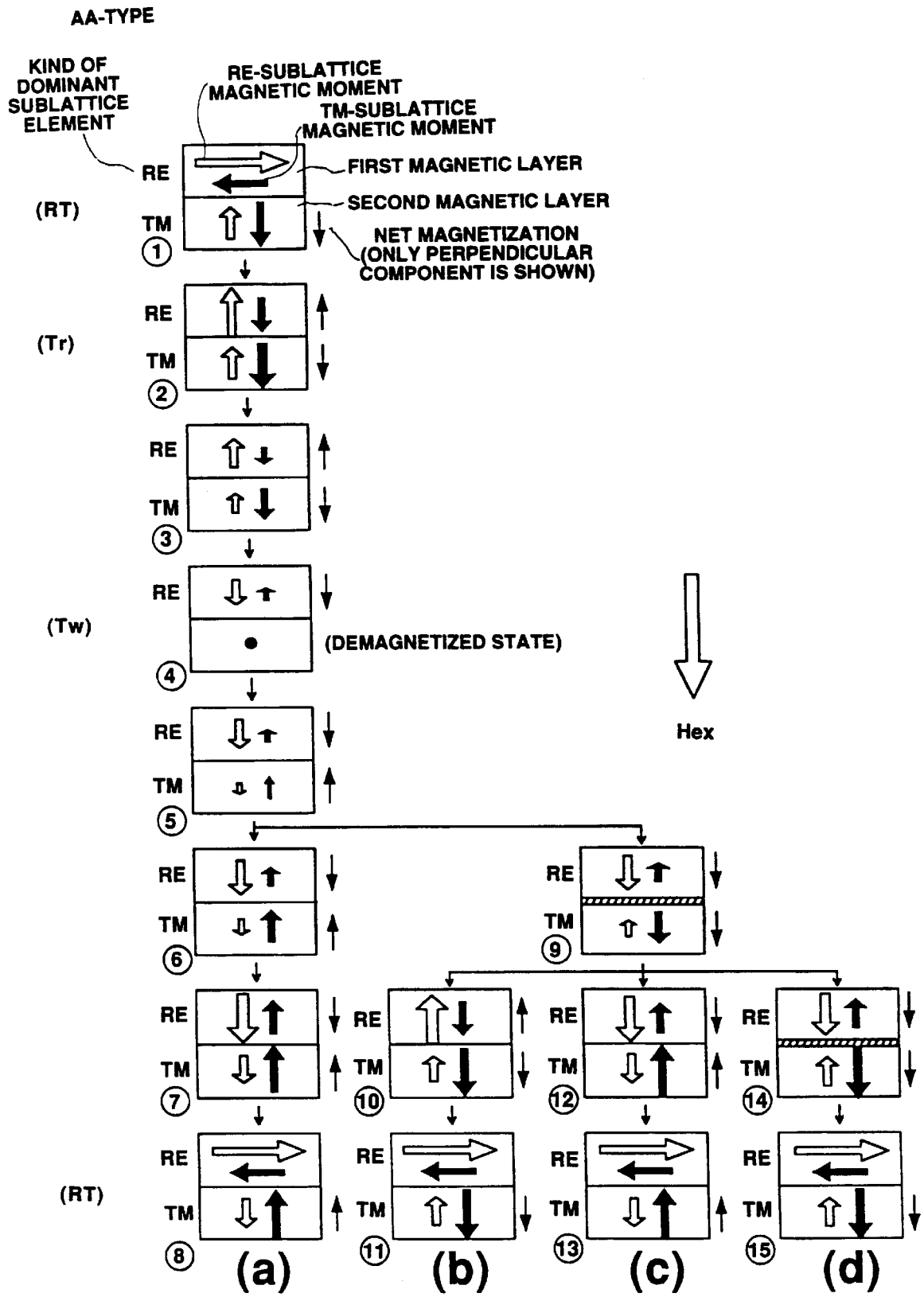
FIG. 50 is a schematic view illustrating states of sublattice magnetization and net magnetization at room temperature, information reproduction and information recording, where the structure of magnetic layer is AA-type.

(AA-type; FIG. 50)

In AA-type, there are the following paths (a)~(d):
(a) $(1) \to (2) \to (3) \to (4) \to (5) \to (6) \to (7) \to (8)$,
(b) $(1) \to (2) \to (3) \to (4) \to (5) \to (9) \to (10) \to (11)$,
(c) $(1) \to (2) \to (3) \to (4) \to (5) \to (9) \to (12) \to (13)$,
(d) $(1) \to (2) \to (3) \to (4) \to (5) \to (9) \to (14) \to (15)$, Conditions at the branching points are represented by the following relations (20)~(25), and respective paths are always achieved if conditions according to respective processions are satisfied at branching points.

$(5) \to (9)$  $\quad H_{c2} < H_{ex} - H_{w2}$  (20), $(9) \to (10)$  $\quad H_{c1} < H_{w2} - H_{ex}$  (21), $(9) \to (12)$  $\quad H_{c2} < H_{w2} - H_{ex}$  (22), $(9) \to (14)$  $\quad H_{c1} > H_{w1} - H_{ex}$  (23), and  $\quad H_{c2} > H_{w2} - H_{ex}$  (24), $(5) \to (6)$  $\quad H_{c2} > H_{ex} - H_{w2}$  (25).

Figure 51:
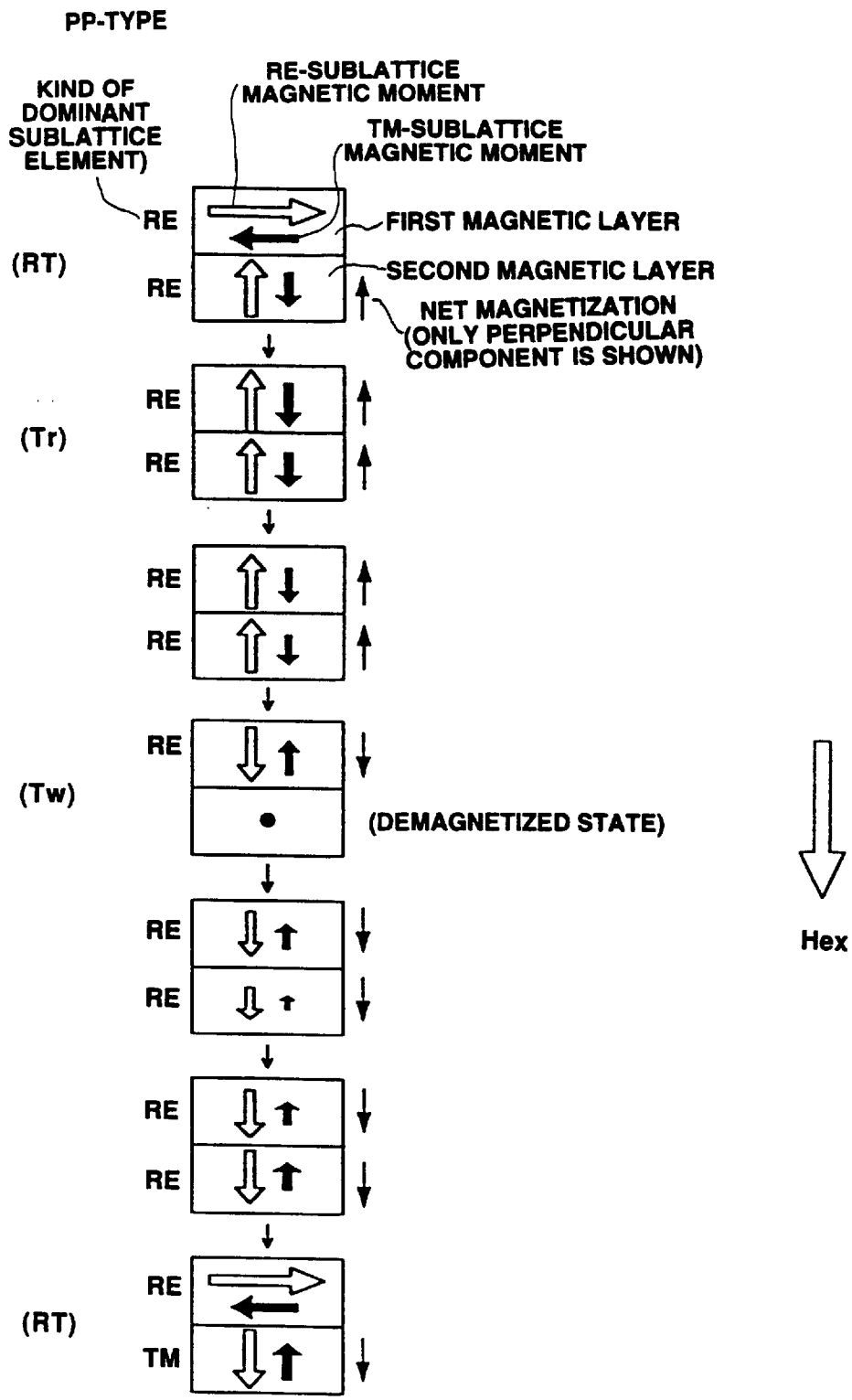
FIG. 51 is a schematic view illustrating states of sublattice magnetization and net magnetization at room temperature, information reproduction and information recording, where the structure of magnetic layer is PP-type.

In PP-type, a predetermined path is achieved irrespective of conditions (see FIG. 51).

Thus, it is easy to control values of external magnetic field, magnetization inversion field and exchange energy by adjusting contents of the layers and so foirth so that a predetermined path is always established and a stable magnetized state is achieved. Therefore, if magnetization inversion of the first magnetic layer is confirmed during recording, recording can be verified.

In PA-type, AP-type and AA-type, paths (i.e., paths of (c)~(f) in PA-type, paths of (b)~(d) in AP-type and paths of (b)~(d) in AA-type), during which interface magnetic domain walls appear, have many branching points and hence a lot of unstable factors. In contrast, paths (i.e., paths of (a) and (c) in PA-type, path of (a) in AP-type and path of (a) in AA-type), during which no interface magnetic domain walls appears, have only a few branching points since transfer is effected by the exchange coupling between first and second magnetic layers, and hence those paths are desirable since more accurate verification of recording can be performed.

Further, in PA-type, when the second magnetic layer, whose coercive force at room temperature is large, is used for stable maintenance of recorded data, the coercive force of the second magnetic layer is larger than the external magnetic field. As a result, magnetization inversion cannot be achieved in the first and second magnetic layers, and hence the path of (a) would not be realized. Therefore, in PA-type, the path of (b) is more desirable.

The following concretely explains materials of a readout layer and a recording layer of the recording medium in still more detail.

The readout layer is preferably composed of rare-earth and iron group amorphous alloy, such as GdCo, GdFeCo, TbFeCo. DyFeCo, GdTbFeCo, GdDyFeCo, TbDyFeCo, NdFeCo, NdGdFeCo, NdTbFeCo, NdDyFeCo and the like; or platinum group and iron group periodical-structure film, such as Pt/Co and Pd/Co; or platinum group and iron group alloy, such as PtCo and PdCo.

The recording layer is desirably composed of rare-earth and iron group amorphous alloy, such as TbFeCo, DyFeCo and TbDyFeCo.

Elements for improving corrosion resistance, such as Cr, Al, Ti, Pt and Nb, may be added to the readout layer and the recording layer, respectively.

The eighth embodiment of the present invention is described in more detail by the following experimental example. The experimental example is illustrative and not restrictive.

44th Experimental Example

A SiN layer (thickness: 900 Å) is deposited on a polycarbonate substrate of a diameter of 130 mm with pregrooves, for obtaining interference effect and anti-oxidation, by using a magnetron sputtering apparatus. Then, a GdTbCo layer (a readout layer) is deposited to a thickness of 400 Å, a TbFeCo layer (a recording layer) is deposited to a thickness of 400 Å. Thereafter, another SiN layer (thickness: 300 Å) is deposited for enhancing anti-oxidation and interference effect. Those layers are consecutively grown without destroying vacuum. Thus, the magnetooptical recording medium of the eighth embodiment is obtained.

The refractive index n of both the SiN layers is approx. 2.1, and contents of Tb, Fe and Co of the TbFeCo layer are respectively 21 at%, 72 at% and 7 at%.

The GdTbCo layer is set so that compensation temperature is 240° C. and Curie temperature is higher than 350° C.

Figure 53:
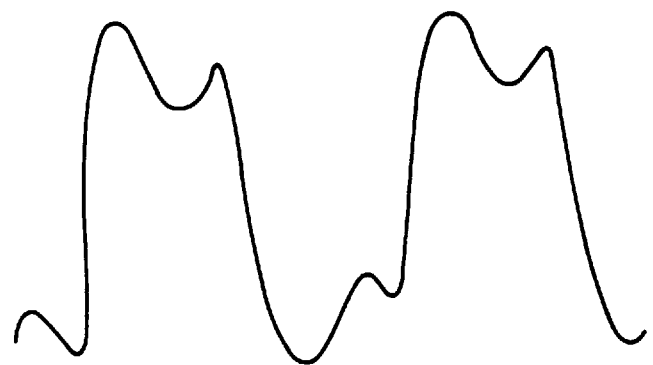
FIG. 53 is a view showing a detected wave form of reflective light of a recording laser beam projected onto a recording medium at the time of recording in the eighth embodiment.

3 MHz signal is recorded on the recording medium with a laser beam of 9 mW power, and then 1 MHz signal is recorded. During the recording of 1 MHz signal, the reflective light of the laser beam is detected and observed. As a result, a signal shown in FIG. 53 has been obtained. It has been found from FIG. 53 that the 1 MHz signal is clearly reproduced though the 3 MHz is contained therein.

Figure 54:
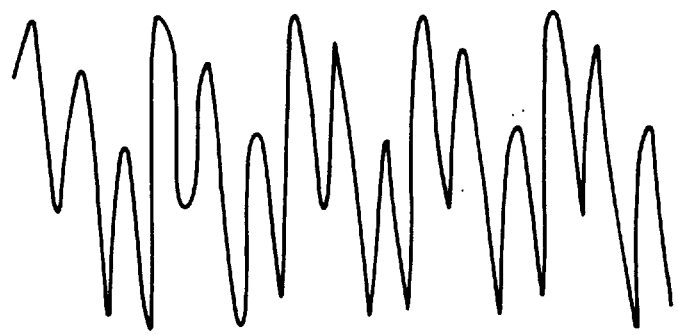
FIG. 54 is a view showing a detected wave form of reflective light of a recording laser beam projected onto a recording medium at the time of recording in the eighth embodiment.

Next, after 1 MHz signal is recorded, 3 MHz signal is recorded. During the recording of 3 MHz signal, the reflective light of the laser beam is detected and observed. As a result, a signal shown in FIG. 54 has been obtained. It has been found from FIG. 54 that the 3 MHz signal is clearly reproduced though modulated by 1 MHz.

While the present invention has been described with respect to what is presently considered to be the preferred embodiments, it is to be understood that the invention is not limited to the disclosed embodiments. The present invention is intended to cover various modifications and equivalent arrangements included within the sprit and scope of the appended claims.

What is claimed is:

1. A method of reproducing information in a magnetooptical recording medium which comprises a first magnetic layer, which has an in-plane magnetization at a first temperature range that disappears at a second temperature range that is higher than the first temperature range; a third magnetic layer having a perpendicular magnetization; a second magnetic layer, wherein the second magnetic layer is interposed between said first and third magnetic layers, has a Curie temperature higher than the temperatures of said first and third magnetic layers, and has an in-plane magnetization at the first temperature range that changes to a perpendicular magnetization at the second temperature range; and a substrate, wherein the substrate, and the first, second and third magnetic layers are disposed in the medium in this order: the substrate, the first magnetic layer, the second magnetic layer, and the third magnetic layer, said method comprising the steps of:

projecting a laser beam onto the substrate to create a light soot region;

changing only a high-temperature area in a light spot region of the first and second magnetic layer to a perpendicular magnetization film so that information recorded in the third magnetic layer is transferred through the second magnetic layer to the perpendicular magnetization film of the first magnetic layer; and detecting the information transferred to the first magnetic layer by using reflected light from the medium which is subjected to a magneto-optic effect of the perpendicular magnetization film of the first magnetic layer.

2. A method of recording information in a magnetooptical recording medium which comprises a first magnetic layer being an in-plane magnetization film at a first temperature range and a perpendicular magnetization film at a second temperature range that is higher than the first temperature range, a second magnetic layer composed of a perpendicular magnetization film at both the first temperature range and the second temperature range and storing information, and a substrate, wherein the substrate, and the first and second magnetic layers are disposed in the medium in this order: the substrate, the first magnetic layer, and the second magnetic layer, said method comprising the steps of:

projecting a laser beam onto the substrate to create a light spot region;

applying a magnetic field, wherein the magnetization direction of the magnetic field is modulated according to information, to a light spot region of the substrate so that magnetization of the first magnetic layer is oriented to the direction of the applied magnetic field; and transferring the magnetization of the first magnetic layer to the second magnetic layer to form a record bit.

3. A method of recording information according to claim 2, further comprising the step of detecting information from the record bit at the same time as the formation of the record bit by detecting reflected light of the light spot region from the medium.

4. A method of recording information in a magnetooptical recording medium which comprises a first magnetic layer, which has an in-plane magnetization at a first temperature range that disappears at a second temperature range that is higher than the first temperature range; a third magnetic layer having a perpendicular magnetization; and a second magnetic layer, wherein the second magnetic layer is interposed between said first and third magnetic layers, has a Curie temperature higher than the temperatures of said first and third magnetic layers, and has an in-plane magnetization at the first temperature range that changes to a perpendicular magnetization at the second temperature range, and a substrate, wherein the substrate, and the first, second and third magnetic layers are disposed in the medium in this order: the substrate, the first magnetic layer, the second magnetic layer, and the third magnetic layer, said method comprising the steps of:

projecting a laser beam onto the substrate to create a light spot region; and applying a magnetic field, wherein the magnetization direction of the magnetic field is modulated according to information, to a light spot region of the substrate so that a record bit is formed in the third magnetic layer.

* * * * *

UNITED STATES PATENT AND TRADEMARK OFFICE
CERTIFICATE OF CORRECTION

PATENT NO.  : 5,889,739

DATED       : March 30, 1999

INVENTOR(S) : NAOKI NISHIMURA, ET AL.

It is certified that error appears in the above-identified patent and that said Letters Patent is hereby corrected as shown below:

COLUMN 2:

Line 56, "later" should read --layer--.

COLUMN 8:

Line 46, "ay" should read --way--.

COLUMN 9:

Line 39, "as-the" should read --as the--;
Line 50, "Almost" should read --Most--; and
Line 61, "point within the" should be deleted.

COLUMN 10:

Line 45, "field The" should read --field. (new paragraph) The--.

COLUMN 12:

Line 63, "at. el," should read --et al.,--.

UNITED STATES PATENT AND TRADEMARK OFFICE
CERTIFICATE OF CORRECTION

PATENT NO. : 5,889,739

DATED : March 30, 1999

INVENTOR(S) : NAOKI NISHIMURA, ET AL.

It is certified that error appears in the above-identified patent and that said Letters Patent is hereby corrected as shown below:

COLUMN 13:

Line 27, "ith" should read --with--.

COLUMN 15:

Line 40, "film ." should read --film.--.

COLUMN 17:

Line 66, "at. el," should read --et al.,--.

COLUMN 21:

Line 17, "21th" should read --21st--.

COLUMN 22:

Line 29, "Examples." should read --Examples--;
Line 32, "Example." should read --Example--;
Line 36, "21th" should read --21st--; and
Line 41, "22th" should read --22nd--.

UNITED STATES PATENT AND TRADEMARK OFFICE
CERTIFICATE OF CORRECTION

PATENT NO. : 5,889,739

DATED : March 30, 1999

INVENTOR(S) : NAOKI NISHIMURA, ET AL.

It is certified that error appears in the above-identified patent and that said Letters Patent is hereby corrected as shown below:

COLUMN 23:

Line 9, "a" (second occurrence) should be deleted; and
    Line 38, "at. el," should read --et al.,--.

COLUMN 24:

Line 60, "layers" should read --layers.--.

COLUMN 26:

Line 23, "appeares" should read --appears--;
    Line 29, "31th" should read --31st--; and
    Line 59, "32th" should read --32nd--.

COLUMN 27:

Line 25, "33th" should read --33rd--.

COLUMN 29:

Line 29, "at. el," should read --et al.,--.

UNITED STATES PATENT AND TRADEMARK OFFICE
CERTIFICATE OF CORRECTION

PATENT NO. : 5,889,739

DATED : March 30, 1999

INVENTOR(S) : NAOKI NISHIMURA, ET AL.

It is certified that error appears in the above-identified patent and that said Letters Patent is hereby corrected as shown below:

COLUMN 37:

Line 1, "at. el," should read --et al.,--; and
Line 39, "larger" (second occurrence) should be deleted.

COLUMN 39:

Line 11, "42th" should read --42nd--; and
Line 43, "42th" should read --42nd--.

COLUMN 41:

Line 30, "43th" should read --43rd--;
Line 55, "43th" should read --43rd--; and
Line 64, "43th" should read --43rd--.

COLUMN 44:

Line 56, "(23)→" should read --(23)→(24)--.

UNITED STATES PATENT AND TRADEMARK OFFICE
CERTIFICATE OF CORRECTION

PATENT NO. : 5,889,739

DATED : March 30, 1999

INVENTOR(S) : NAOKI NISHIMURA, ET AL.

It is certified that error appears in the above-identified patent and that said Letters Patent is hereby corrected as shown below:

COLUMN 45:

Line 29, In (d), "," should read --.--; and
    Line 50, "foirth" should read --forth--.

COLUMN 47:

Line 17, "soot" should read --spot--; and
    Line 19, "layer" should read --layers--.

Signed and Sealed this

Twenty-eighth Day of December, 1999

Attest:

Q. TODD DICKINSON

Attesting Officer     Acting Commissioner of Patents and Trademarks